United States Patent
Xu et al.

(10) Patent No.: US 12,250,045 B2
(45) Date of Patent: *Mar. 11, 2025

(54) BEAM ACTIVATION AND DETERMINATION IN WIRELESS NETWORKS

(71) Applicant: Comcast Cable Communications, LLC, Philadelphia, PA (US)

(72) Inventors: Kai Xu, Herndon, VA (US); Hua Zhou, Vienna, VA (US); Esmael Hejazi Dinan, McLean, VA (US); Yunjung Yi, Vienna, VA (US); Ali Cagatay Cirik, Chantilly, VA (US); Hyoungsuk Jeon, Centreville, VA (US); Jonghyun Park, Syosset, NY (US); Nazanin Rastegardoost, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,643

(22) Filed: Jun. 28, 2023

(65) Prior Publication Data

US 2024/0154676 A1    May 9, 2024

Related U.S. Application Data

(63) Continuation of application No. 17/692,741, filed on Mar. 11, 2022, now Pat. No. 11,728,870.

(Continued)

(51) Int. Cl.
*H04L 5/12* (2006.01)
*H04B 7/06* (2006.01)
(Continued)

(52) U.S. Cl.
CPC ......... *H04B 7/0639* (2013.01); *H04B 7/0695* (2013.01); *H04L 5/0048* (2013.01); *H04W 72/046* (2013.01)

(58) Field of Classification Search
CPC ... H04B 7/0639; H04B 7/0695; H04L 5/0048; H04W 72/046
(Continued)

(56) References Cited

U.S. PATENT DOCUMENTS 10,856,316 B2    12/2020    Liou et al.
11,025,457 B2    6/2021    Tsai et al.
(Continued)

OTHER PUBLICATIONS

R1-2101644 3GPP TSG RAN WG1 #104-e, e-Meeting, Jan. 25-Feb. 5, 2021, Source: TCL, Title: Enhancements on Multi-Beam Operation.
(Continued)

*Primary Examiner* — Zewdu A Kassa
(74) *Attorney, Agent, or Firm* — Banner & Witcoff, Ltd.

(57) ABSTRACT

Beam determination and beam activation may be used in wireless communications. An initial (e.g., default) TCI state pool, of a plurality of TCI state pools, may be used to receive one or more messages indicating a second TCI state pool for communicating signals between a wireless device and a base station. The one or more messages may comprise an indication of a TCI state pair (e.g., an uplink TCI state and a downlink TCI state) of the second TCI state pool.

62 Claims, 39 Drawing Sheets

Related U.S. Application Data

(60) Provisional application No. 63/159,872, filed on Mar. 11, 2021.

(51) Int. Cl.
  *H04L 5/00* (2006.01)
  *H04W 72/044* (2023.01)

(58) Field of Classification Search
  USPC ............... 375/262, 261, 259, 219, 296, 316
  See application file for complete search history.

(56) References Cited

U.S. PATENT DOCUMENTS

| | | | |
|---|---|---|---|
| 11,096,211 | B2 | 8/2021 | Jung et al. |
| 11,115,973 | B2 | 9/2021 | Jin et al. |
| 2020/0280989 | A1 | 9/2020 | Shi et al. |
| 2021/0227530 | A1* | 7/2021 | Farag ................ H04L 5/0091 |
| 2021/0385832 | A1* | 12/2021 | Zhang ............... H04W 72/1263 |
| 2022/0248336 | A1* | 8/2022 | Matsumura ........... H04W 52/54 |

OTHER PUBLICATIONS

R1-2101597 3GPP TSG RAN WG1 #104-e, e-Meeting, Jan. 25-Feb. 5, 2021, Source: NTT Docomo, Inc, Title: Discussion on multi-beam operation.
R1- 2101446 3GPP TSG RAN WG1 #104-e, Jan. 25-Feb. 5, 2020, Source: Qualcomm Incorporated, Title: Enhancements on Multi-beam Operation.
R1-2101414 3GPP TSG-RAN WG1#104-e, e-Meeting, Jan. 25-Feb. 5, 2021, Source: Convida Wireless, Title: Multi-beam Enhancements.
R1-2101350 3GPP TSG-RAN WG1 Meeting #103-e, e-Meeting, Jan. 25-Feb. 5, 2021, Source: Apple Inc., Title: On Beam Management Enhancement.
R1-2101313 3GPP TSG-RAN WG1 Meeting #104-e, Online, Jan. 25-Feb. 5, 2021, Source: Ericsson, Title: Enhancements on Multi-beam Operation.
R1-2101186 3GPP TSG RAN WG1 #104-e, e-Meeting, Jan. 25-Feb. 5, 2021, Source: Samsung, Title: Multi-beam enhancements.
R1-2101092 3GPP TSG RAN WG1 #104-e, e-Meeting, Jan. 25-Feb. 5, 2021, Source: Xiaomi, Title: Enhancements on multi-beam operation.
R1-2101032 3GPP TSG RAN WG1 #104-e, e-Meeting, Jan. 25-Feb. 5, 2021, Source: CMCC, Title: Enhancements on multi-beam operation.
R1-2101023 3GPP TSG RAN WG1 #104-e, e-Meeting, Jan. 25-Feb. 5, 2021, Source: ASUSTeK, Title: Discussion on multi-beam operation.
R1-2101005 3GPP TSG RAN WG1 #104-e, e-Meeting, Jan. 25-Feb. 5, 2021, Source: Nokia, Nokia Shanghai Bell, Title: Enhancements on Multi-beam Operation.
R1-2100964 3GPP TSG RAN WG1 #104-e, e-Meeting, Jan. 25-Feb. 5, 2021, Source: Asia Pacific Telecom, FGI, Title: Discussion on Enhancements for Multi-beam Operation.
R1-2100949 3GPP TSG RAN WG1 #104-e, e-Meeting, Jan. 25-Feb. 5, 2021, Source: NEC, Title: Discussion on multi-beam operation.
R1-2100844 3GPP TSG RAN WG1#104e, E-meeting, Jan. 25-Feb. 5, 2021, Source: Sony, Title: Further enhancement on multi-beam operation.
R1- 2100783 3GPP TSG RAN WG1 #104-e, e-Meeting, Jan. 25-Feb. 5, 2021, Source: Spreadtrum Communications, Title: Enhancements on Multi-beam Operation.
R1-2100779 3GPP TSG RAN WG1 #104e, e-Meeting, Jan. 25-Feb. 5, 2021, Source: AT&T, Title: Enhancements on Multi-Beam Operations.
R1-2100737 3GPP TSG RAN WG1 #104-e, e-Meeting, Jan. 25-Feb. 5, 2021, Source: Fujitsu, Title: Enhancements on Multi-beam Operation.
R1-2100636 3GPP TSG RAN WG1 #104-e, e-Meeting, Jan. 25-Feb. 5, 2021, Source: Intel Corporation, Title: Enhancements to Multi-Beam Operation.
R1-2100618 3GPP TSG RAN WG1 #104-e, e-Meeting, Jan. 25-Feb. 5, 2021, Source: LG Electronics, Title: Enhancements on Multi-beam Operation.
R1-2100588 3GPP TSG RAN WG1 #104-e, e-Meeting, Jan. 25-Feb. 5, 2021, Source: MediaTek Inc., Title: Enhancement on multi-beam operation.
R1-2100534 3GPP TSG RAN WG1 #104-e, E-meeting, Jan. 25-Feb. 5, 2021, Source: Fraunhofer IIS, Fraunhofer HHI, Title: Enhancements on multi-beam operation.
R1-2100421 3GPP TSG RAN WG1 #104-e, e-Meeting, Jan. 25-Feb. 5, 2021, Source: vivo, Title: Further discussion on multi beam enhancement.
R1-2100343 3GPP TSG RAN WG1 #104-e, e-Meeting, Jan. 25-Feb. 5, 2021, Source: CATT, Title: Enhancements on multi-beam operation.
R1-2100285 3GPP TSG RAN WG1 #104-e, e-Meeting, Jan. 25-Feb. 5, 2021, Source: ZTE, Title: Enhancements on Multi-beam Operation.
R1-2100273 3GPP TSG RAN WG1 #104-e, e-Meeting, Jan. 25-Feb. 5, 2021, Source: Lenovo, Motorola Mobility, Title: Enhancements on Multi-beam Operation.
R1-2100208 3GPP TSG RAN WG1 #104-e, E-meeting, Jan. 25-Feb. 5, 2021, Source: Huawei, HiSilicon, Title: Enhancements on multi-beam operation.
R1-2100063 3GPP TSG RAN WG1 #104-e, e-Meeting, Jan. 25-Feb. 5, 2021, Source: InterDigital, Inc., Title: Discussions on Rel-17 beam management.
R1-2100044 3GPP TSG RAN WG1 #104-e, e-Meeting, Jan. 25-Feb. 5, 2021, Source: Futurewei, Title: Enhancement on multi-beam operation.
3GPP TS 38.331 V16.3.1 (Jan. 2021) 3rd Generation Partnership Project; Technical Specification Group Radio Access Network; NR; Radio Resource Control (RRC) protocol specification (Release 16).
3GPP TS 38.321 V16.3.0 (Dec. 2020) 3rd Generation Partnership Project; Technical Specification Group Radio Access Network; NR; Medium Access Control (MAC) protocol specification (Release 16).
3GPP TS 38.214 V16.3.0 (Sep. 2020) 3rd Generation Partnership Project; Technical Specification Group Radio Access Network; NR; Physical layer procedures for data (Release 16).
3GPP TS 38.213 V16.4.0 (Dec. 2020) 3rd Generation Partnership Project; Technical Specification Group Radio Access Network; NR; Physical layer procedures for control (Release 16).
R1-2008956 3GPP TSG RAN WG1 #103-e, e-Meeting, Oct. 26-Nov. 13, 2020, Source: MediaTek Inc., Title: Enhancements on Multi-beam Operation.
Aug. 1, 2022—EP Search Report—EP App. No. 22161638.6.

* cited by examiner

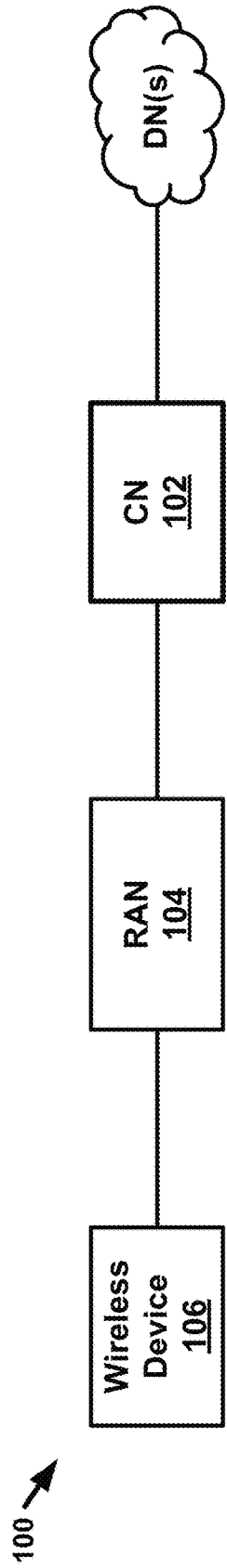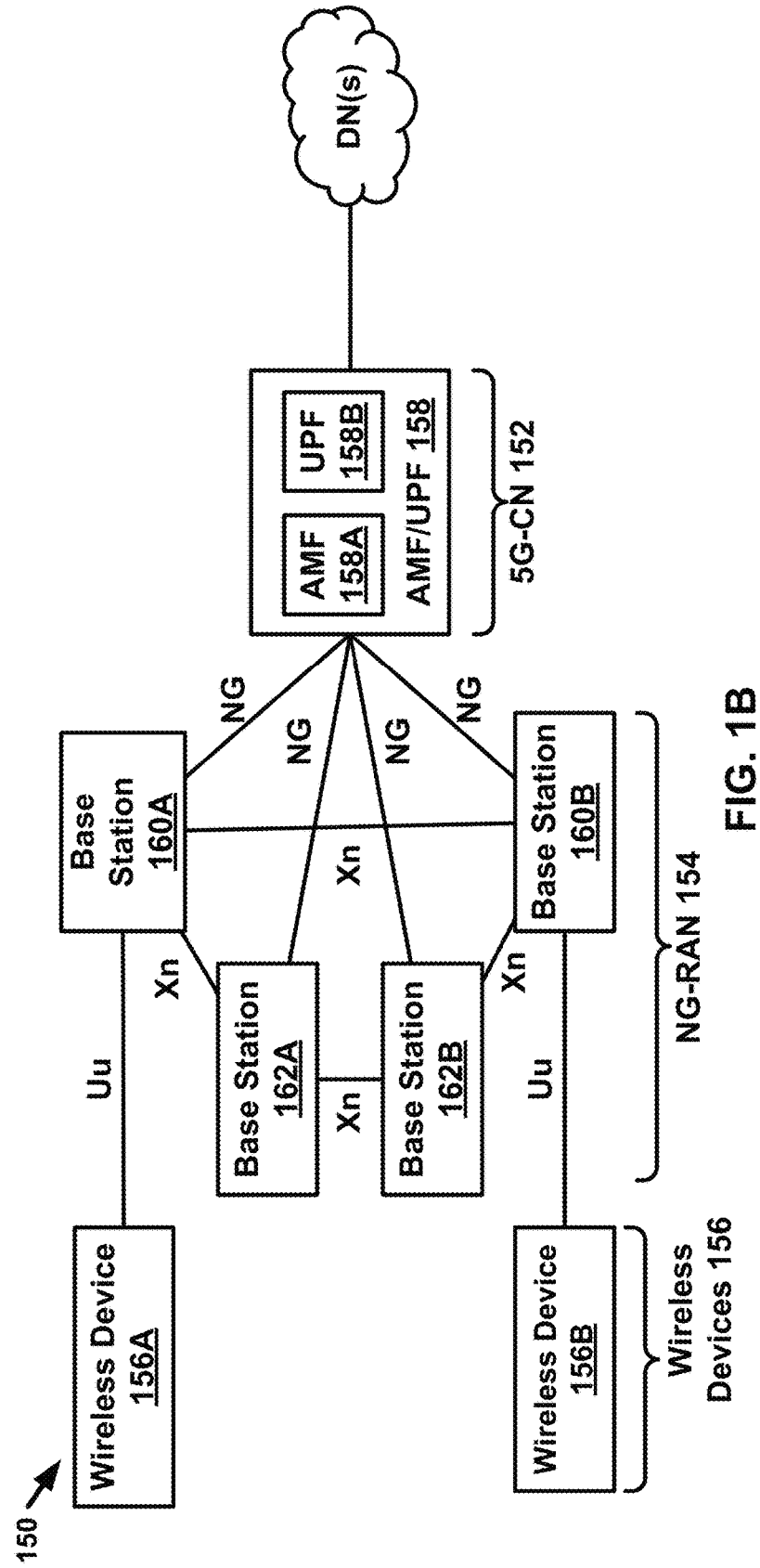

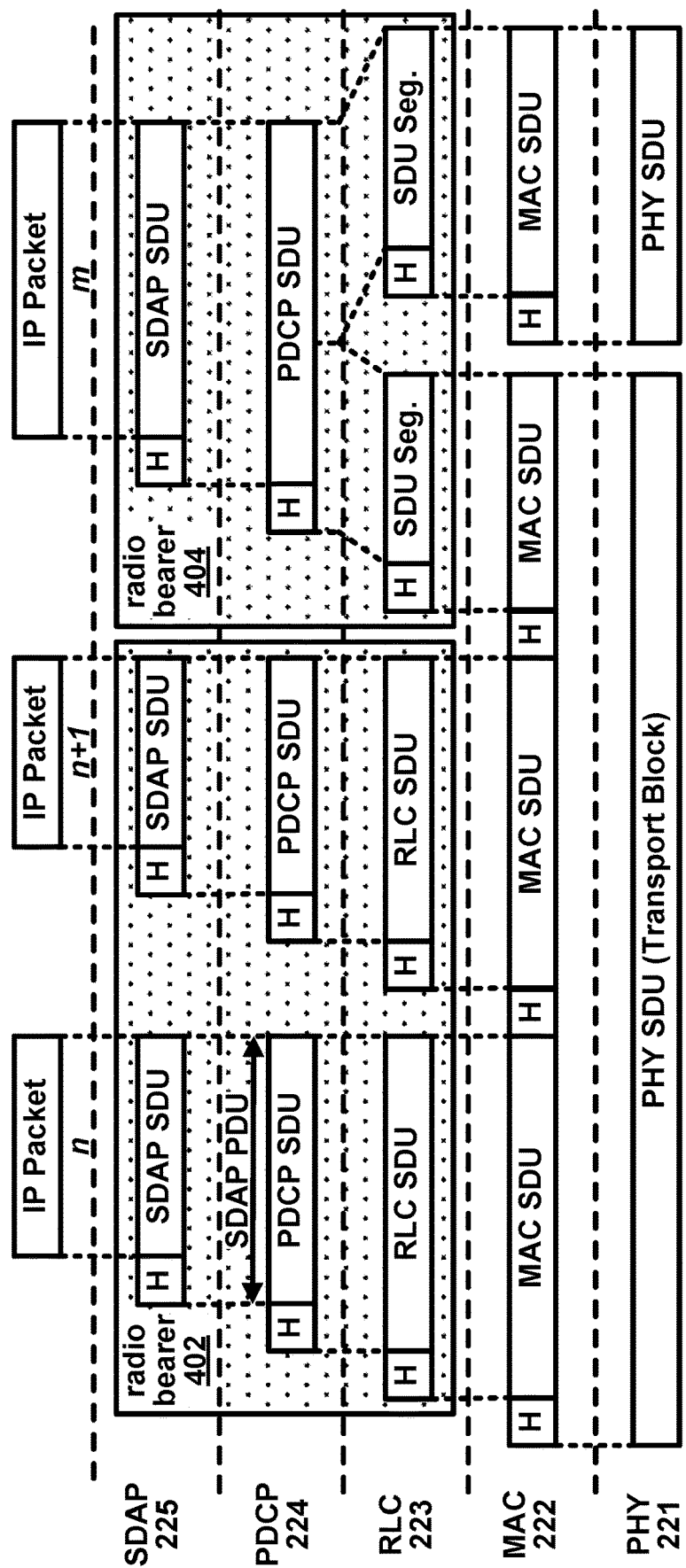
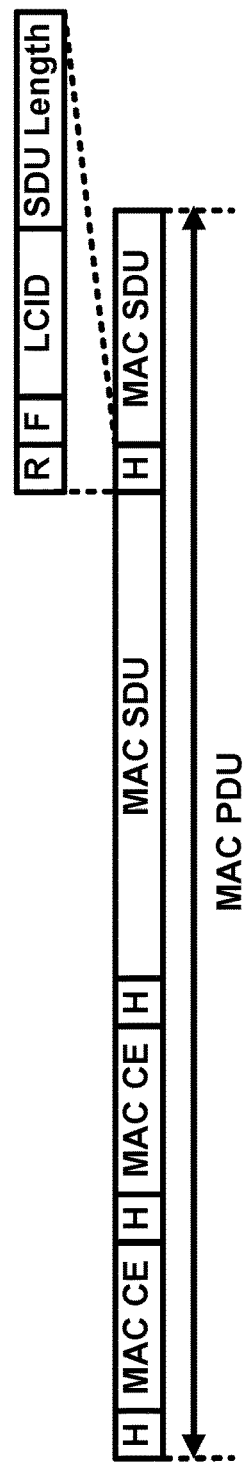
FIG. 4A
FIG. 4B

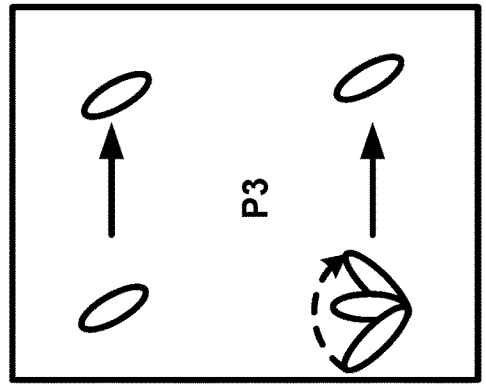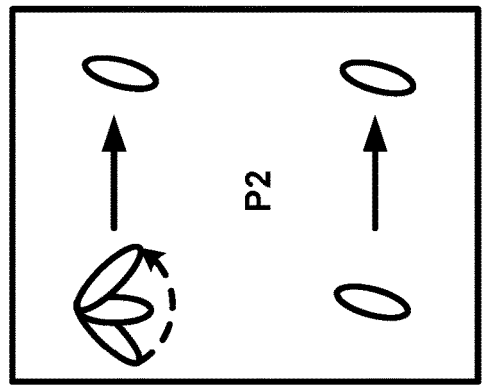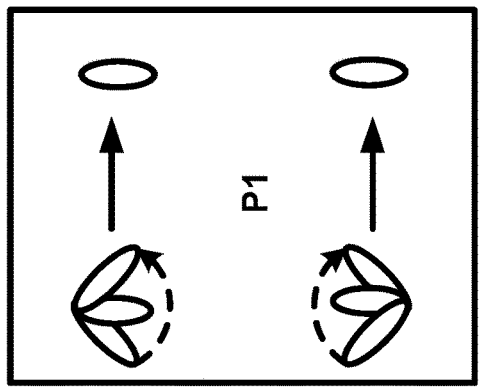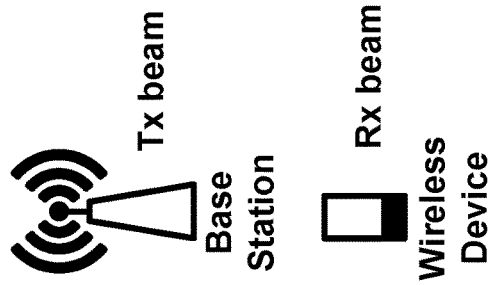
FIG. 12A
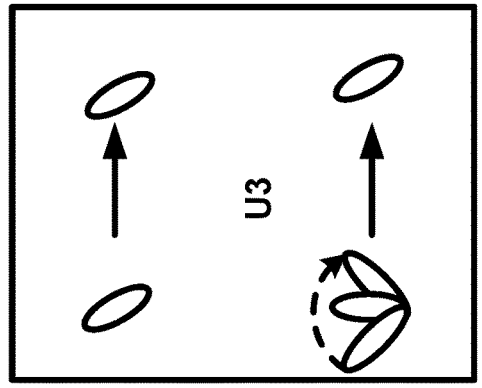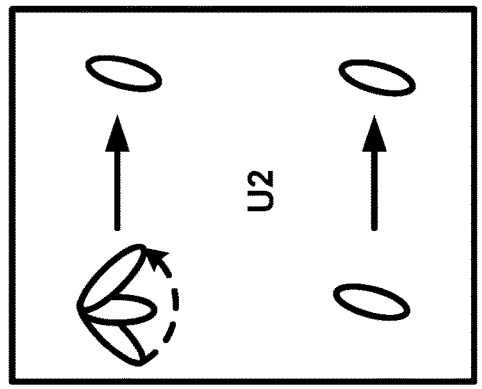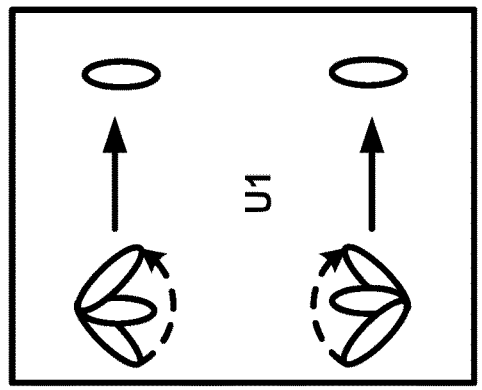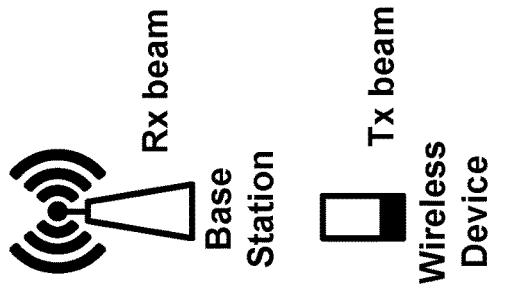
FIG. 12B

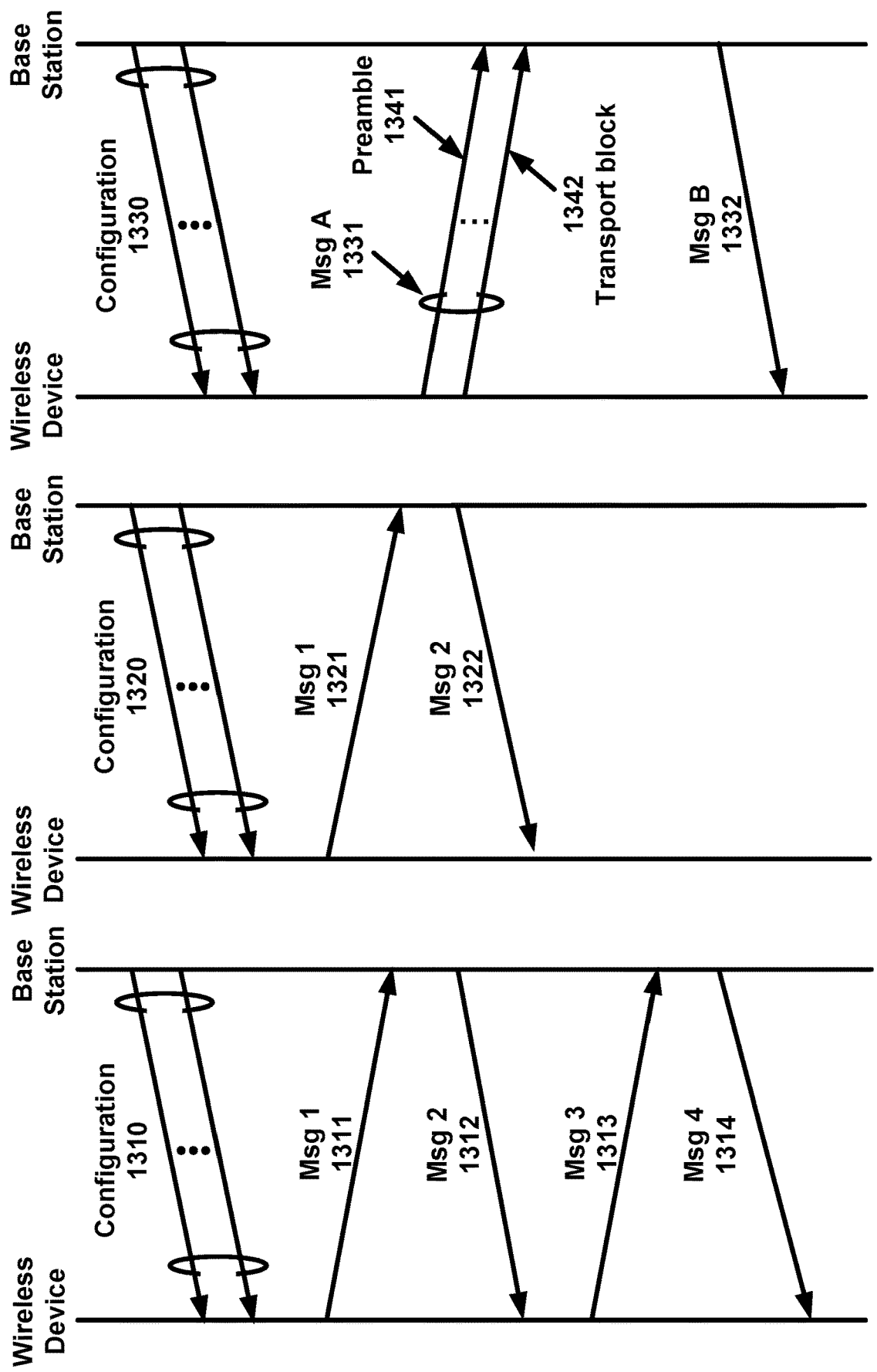

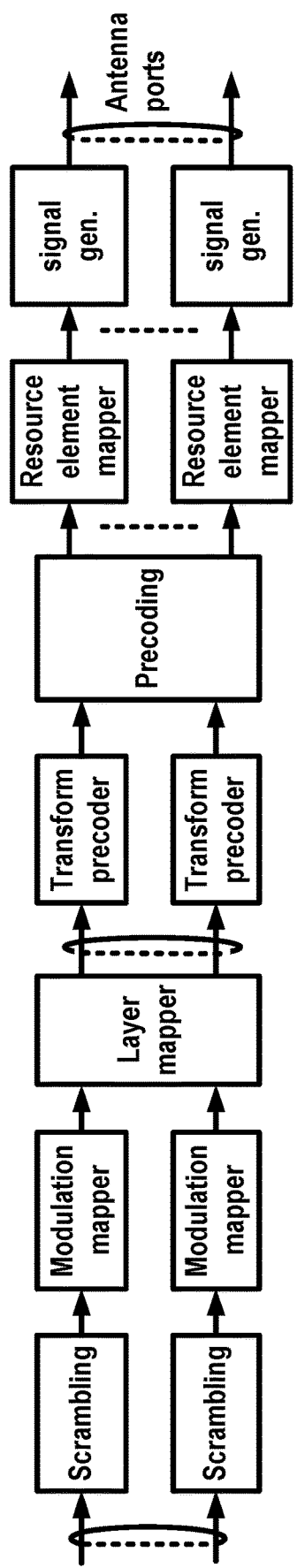
FIG. 16A
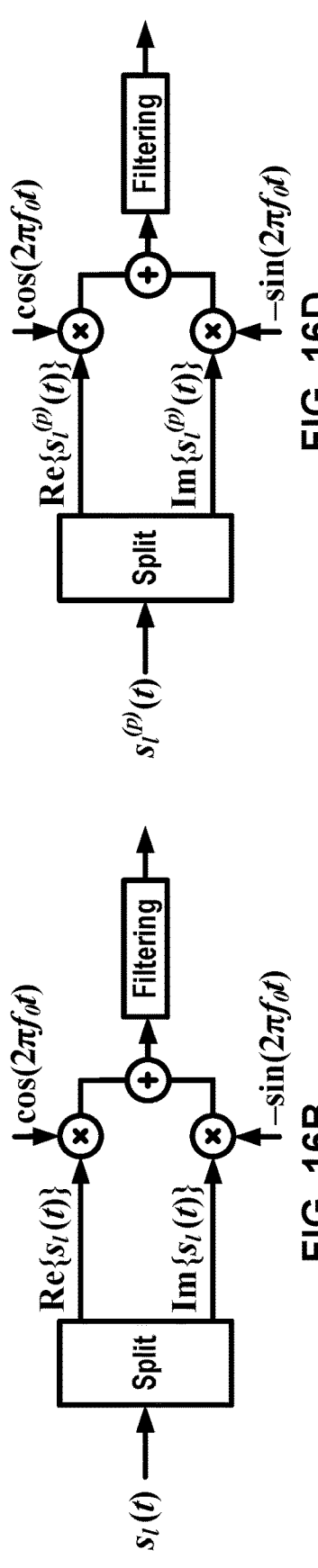
FIG. 16B
FIG. 16D
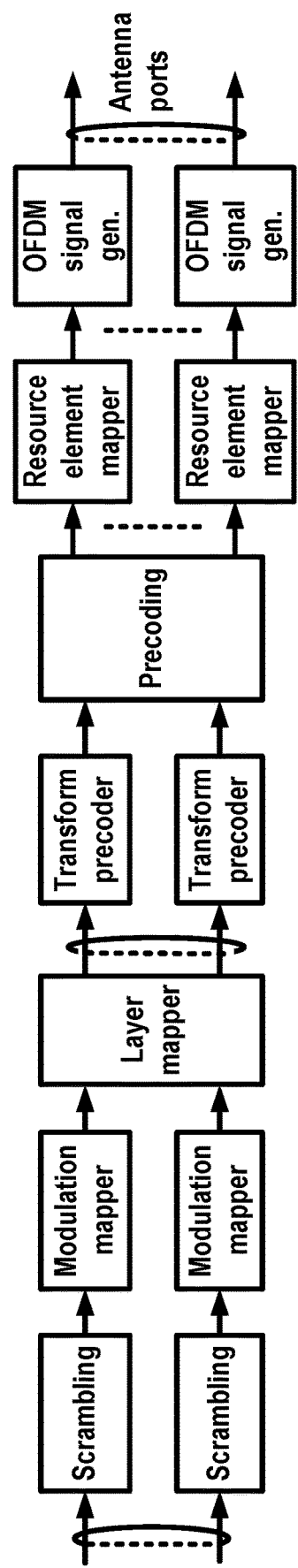
FIG. 16C

Receive configuration parameter(s) of a plurality of TCI state pools and a priority value for each of the plurality of TCI state pools
2250

Determine, based on the priority value, a first TCI state pool from the plurality of TCI state pools
2255

Receive, based on the first TCI state pool, one or more messages indicating a second TCI state pool from the plurality of TCI state pools
2260

Transmit and/or receive, based on the second TCI state pool, uplink signal(s) and/or downlink signal(s)
2265

FIG. 22B

```
┌─────────────────────────────────────────────────────────┐
│ Receive configuration parameter(s) of a plurality of TCI state pools │
│                          2350                           │
└─────────────────────────────────────────────────────────┘
                              │
                              ▼
┌─────────────────────────────────────────────────────────┐
│   Determine a first TCI state pool from the plurality of TCI state │
│                          pools                          │
│                          2352                           │
└─────────────────────────────────────────────────────────┘
                              │
                              ▼
┌─────────────────────────────────────────────────────────┐
│                   Send uplink signal(s)                 │
│                          2354                           │
└─────────────────────────────────────────────────────────┘
                              │
                              ▼
┌─────────────────────────────────────────────────────────┐
│  Switch from the first TCI state pool to a second TCI state pool │
│                          2356                           │
└─────────────────────────────────────────────────────────┘
                              │
                              ▼
┌─────────────────────────────────────────────────────────┐
│         Monitor PDCCH based on the second TCI state pool │
│                          2358                           │
└─────────────────────────────────────────────────────────┘
                              │
                              ▼
┌─────────────────────────────────────────────────────────┐
│  Receive DCI indicating one or more TCI states of the second TCI │
│                        state pool                       │
│                          2360                           │
└─────────────────────────────────────────────────────────┘
                              │
                              ▼
┌─────────────────────────────────────────────────────────┐
│ Transmit and/or receive, based on the one or more TCI states, │
│         uplink signal(s) and/or downlink signal(s)      │
│                          2365                           │
└─────────────────────────────────────────────────────────┘
```

FIG. 23B

BEAM ACTIVATION AND DETERMINATION IN WIRELESS NETWORKS

CROSS-REFERENCE TO RELATED APPLICATIONS

This application is continuation of U.S. application Ser. No. 17/692,741, filed on Mar. 11, 2022, which claims the benefit of U.S. Provisional Application No. 63/159,872, filed on Mar. 11, 2021. Each of the above-referenced application is hereby incorporated by reference in its entirety.

BACKGROUND

Beams may be used for wireless communications. A base station may communicate with a wireless device to activate a beam.

SUMMARY

The following summary presents a simplified summary of certain features. The summary is not an extensive overview and is not intended to identify key or critical elements.

Wireless communications may use one or more beams. One or more beams may be determined by a base station and/or by a wireless device. For example, a transmission configuration indicator (TCI) state pool may comprise one or more TCI states. Each TCI state may be associated with a beam. One or more TCI state pools may be indicated (e.g., via RRC signaling, a MAC CE, and/or DCI) for beam determination. However, a wireless device may not be able to determine which TCI state pool (e.g., a default TCI state pool) and/or which TCI state (e.g., a default TCI state of the default TCI state pool) is to be used to receive one or more messages indicating the TCI state pools. This may result in unreliable beam determinations, for example, due to a decrease in the detection performance of the one or more messages indicating TCI state pools and/or a decrease in the performance of the whole communication system. The wireless device and/or a base station may reduce a likelihood of such unreliability by determining an initial (e.g., default) TCI state pool, from a plurality of state pools, for receiving the one or more messages. Resources associated with the initial TCI state pool may be used to receive the one or more messages. The one or more messages (e.g., a MAC CE, and/or DCI) may comprise a bitfield indicating one or more TCI states of a second TCI state pool. The wireless device and/or the base station may communicate based on beams associated with the second TCI state pool, which may provide advantages such as improved reliability, and performance of beam determinations and/or more efficient use of communication resources.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 22B and FIG. 22C show example methods of determining TCI state pool(s).

FIG. 23B and FIG. 23C show example methods of switching procedures for TCI state pools.

DETAILED DESCRIPTION

Figure 2A:
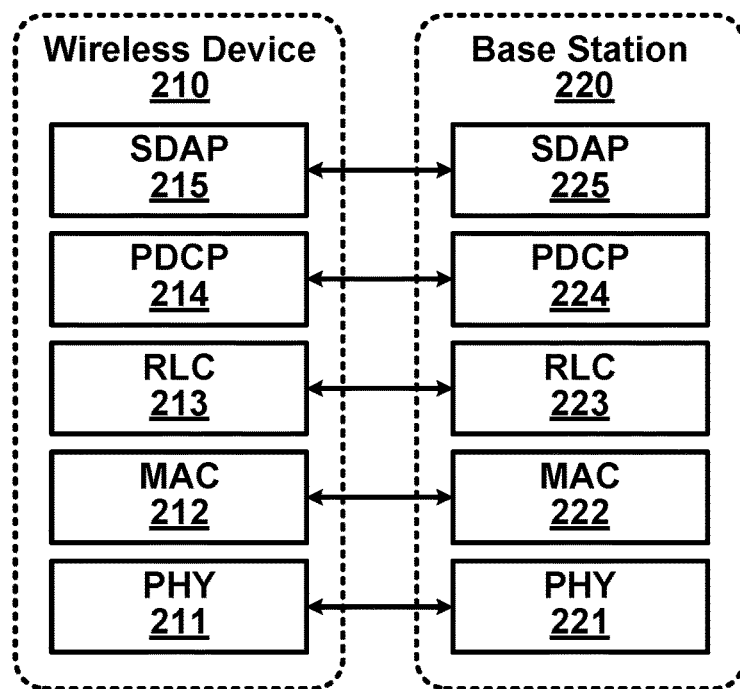
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
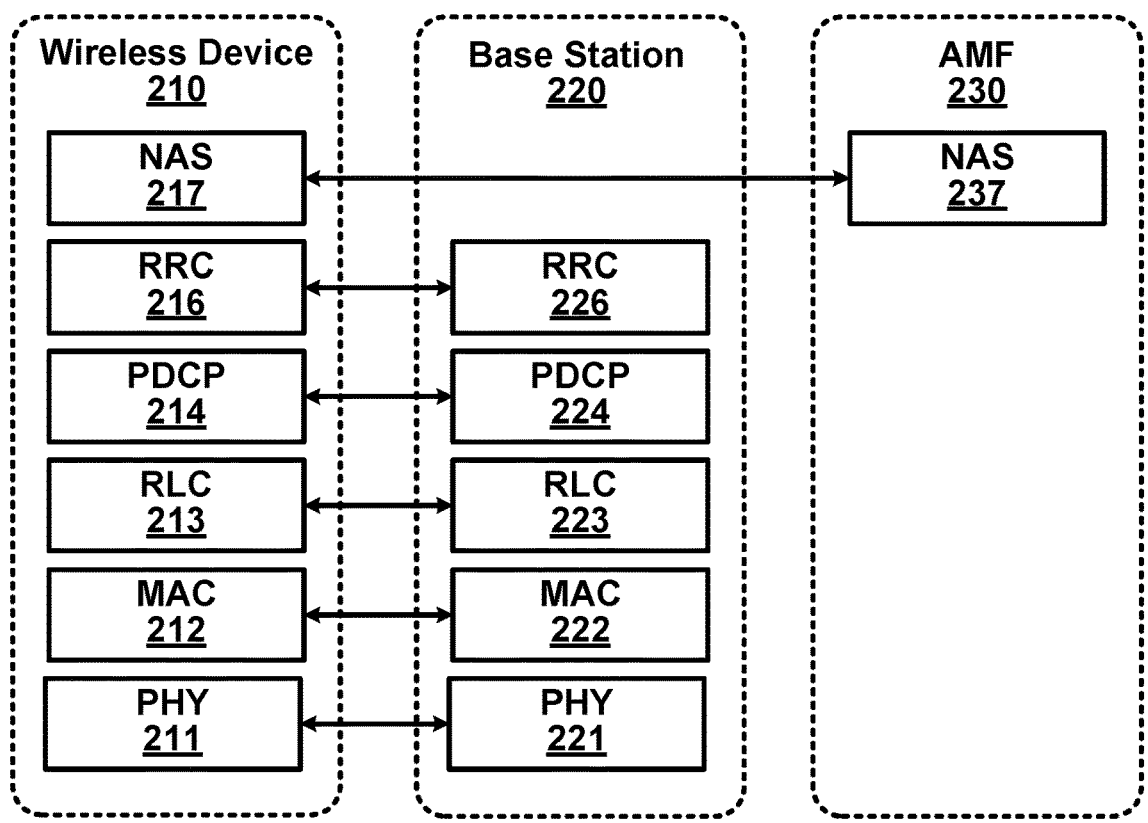
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
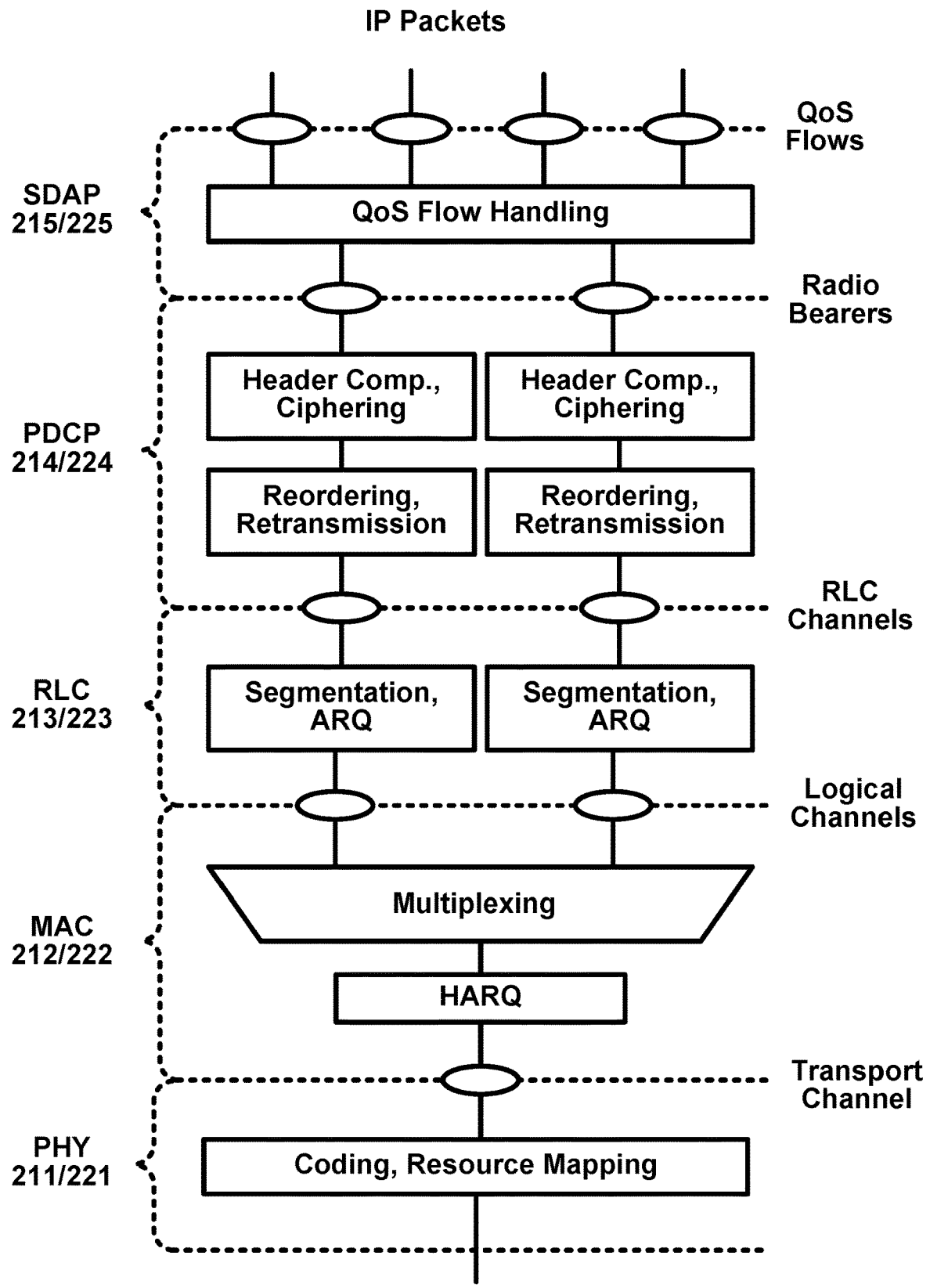
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
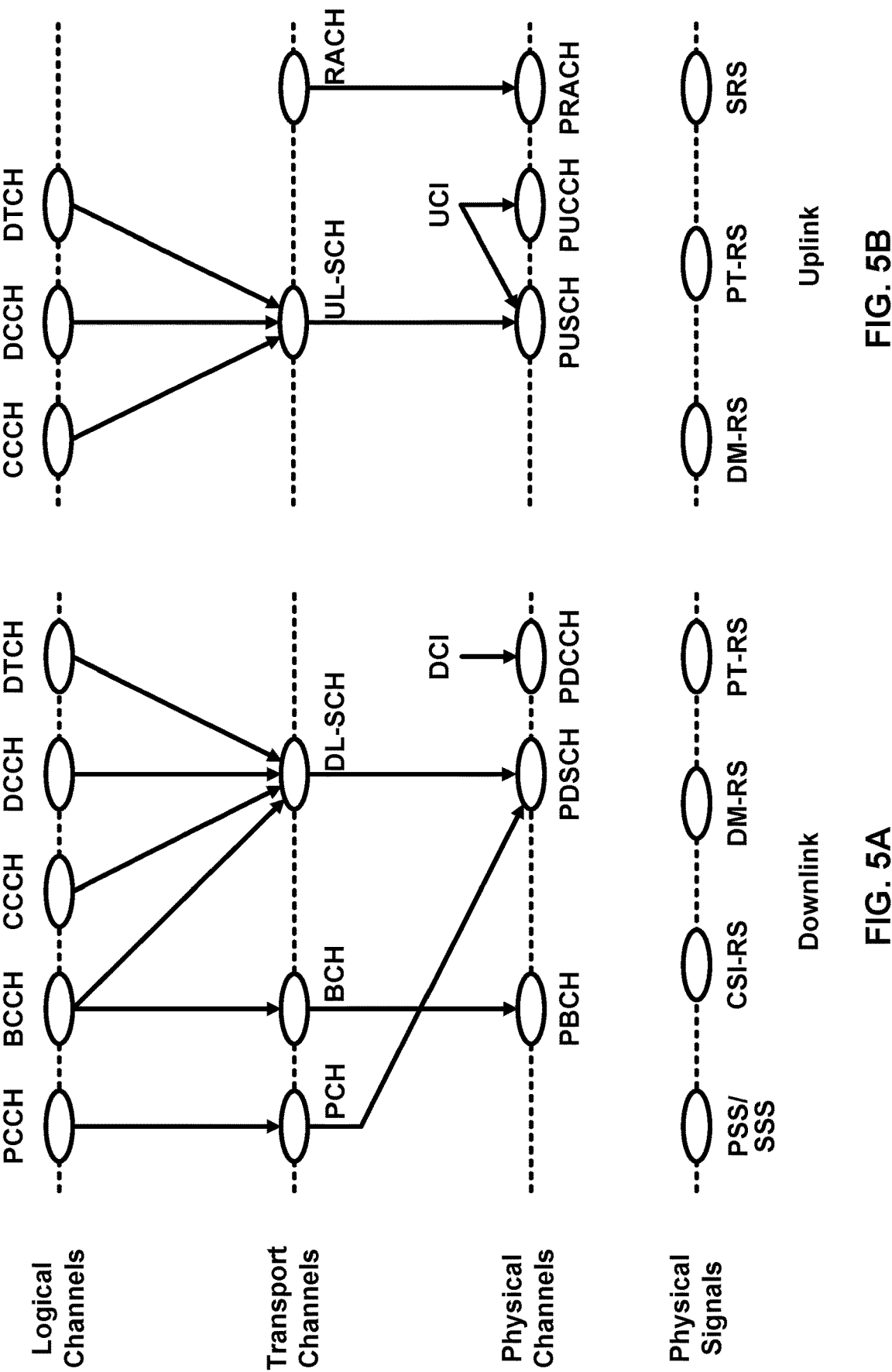
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
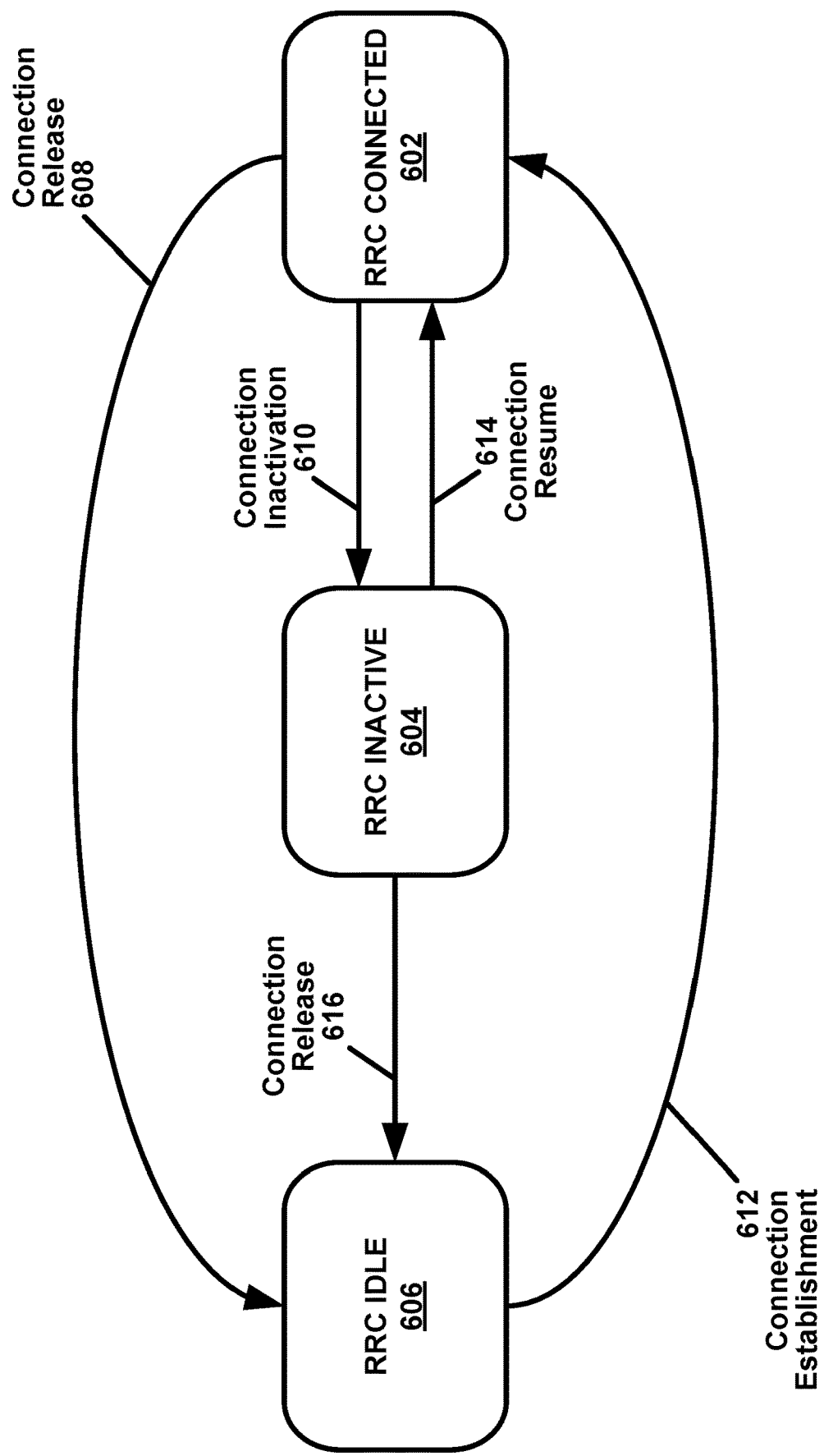
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
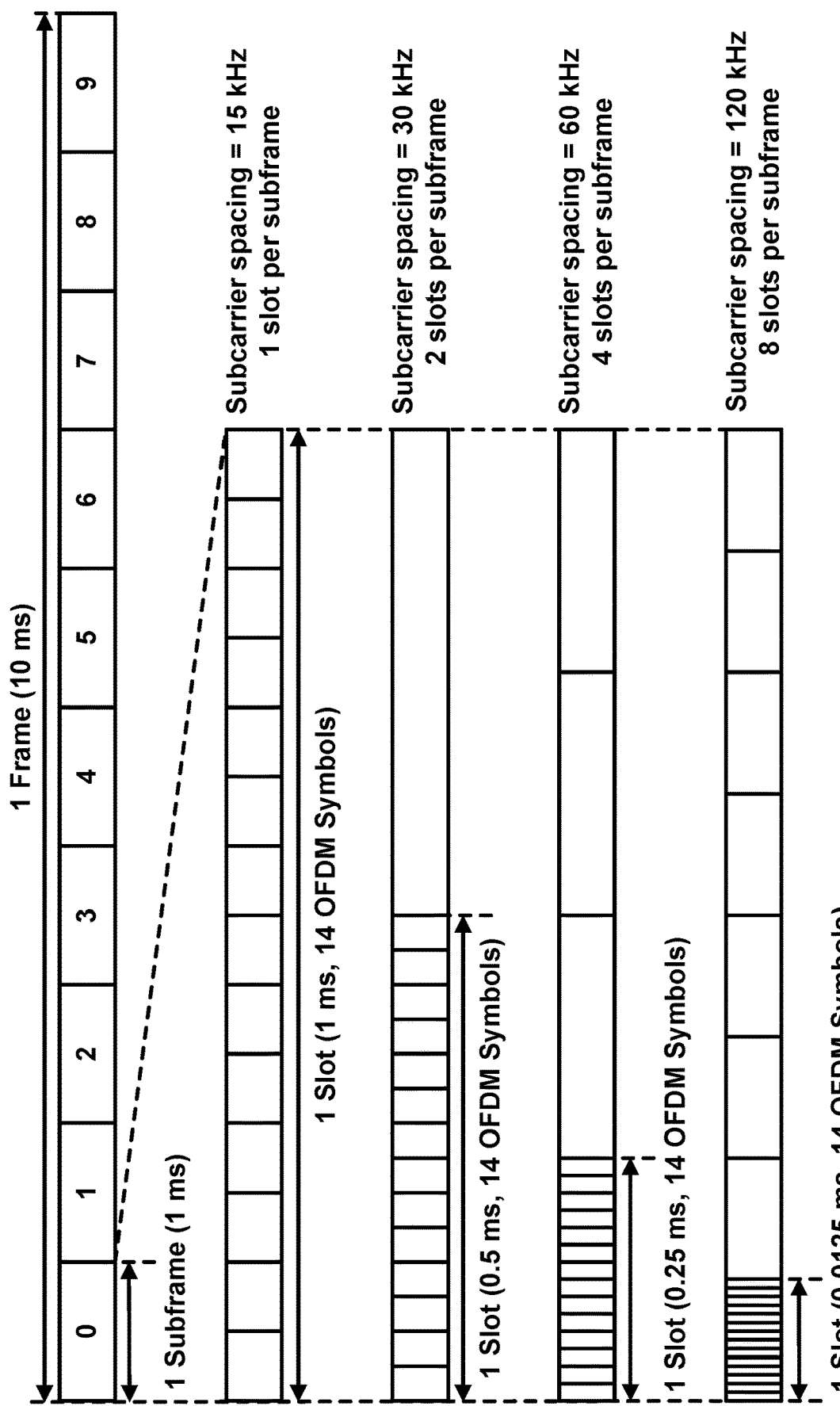
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
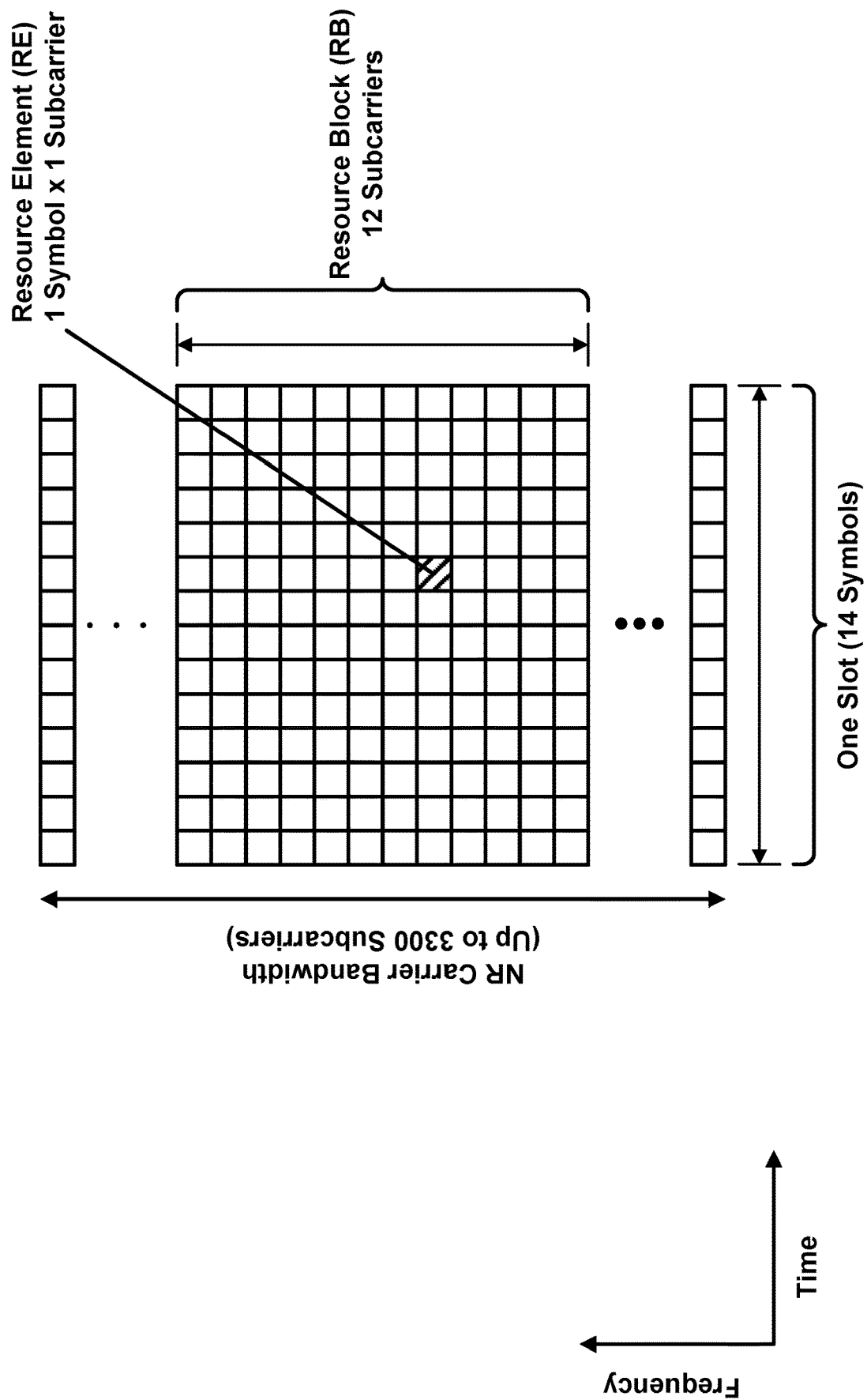
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
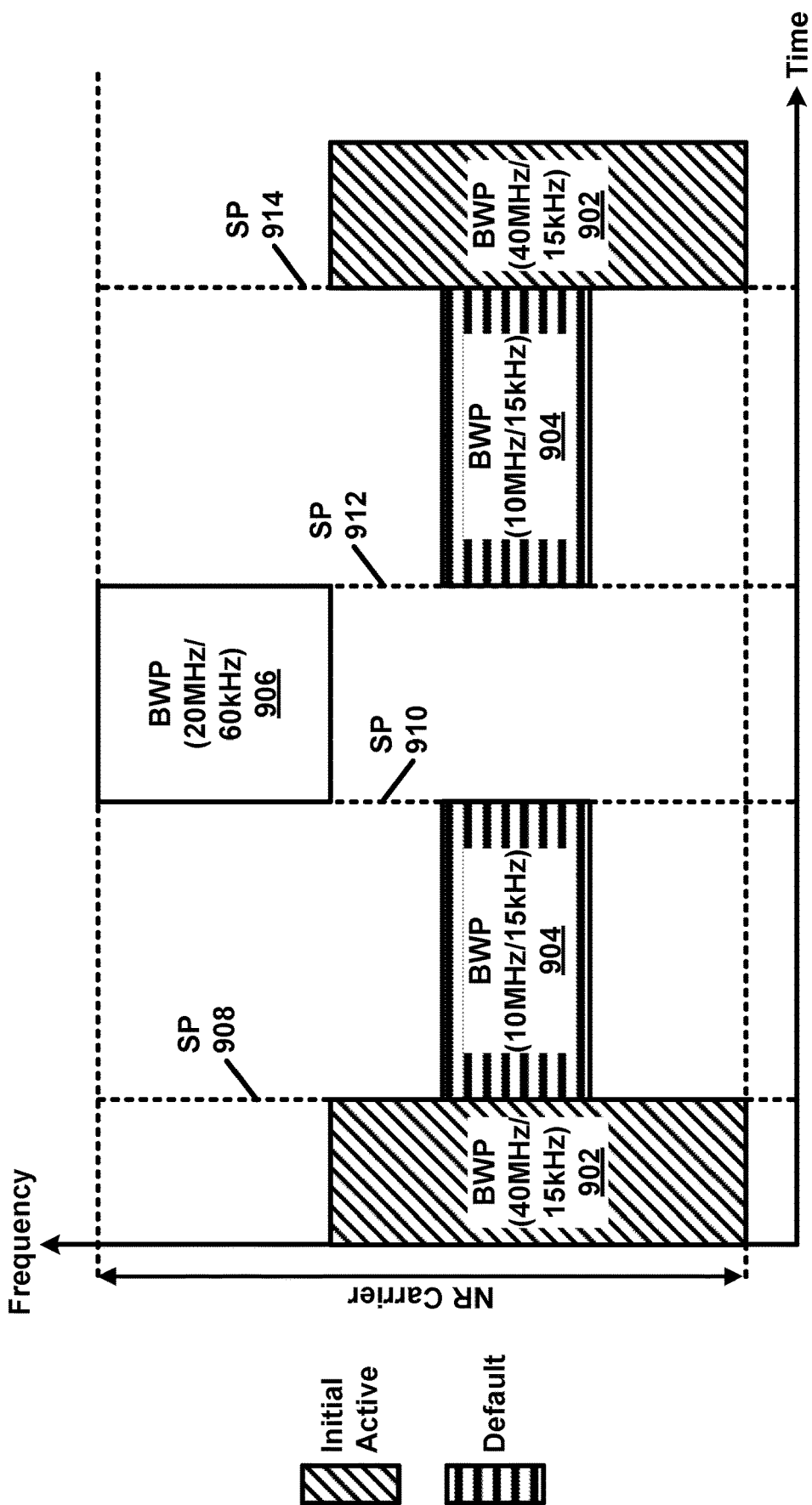
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
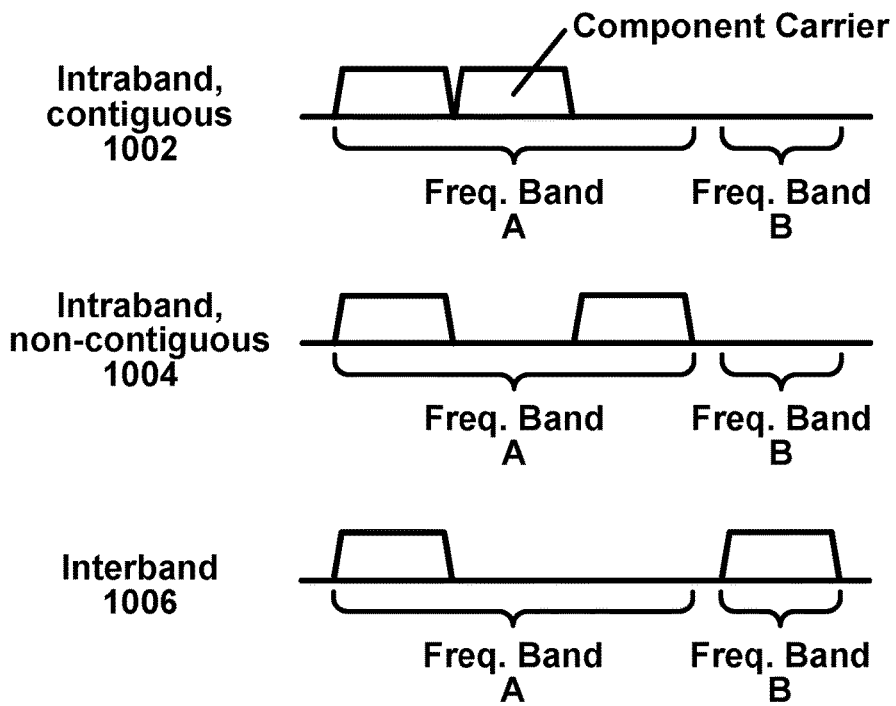
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling.

Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
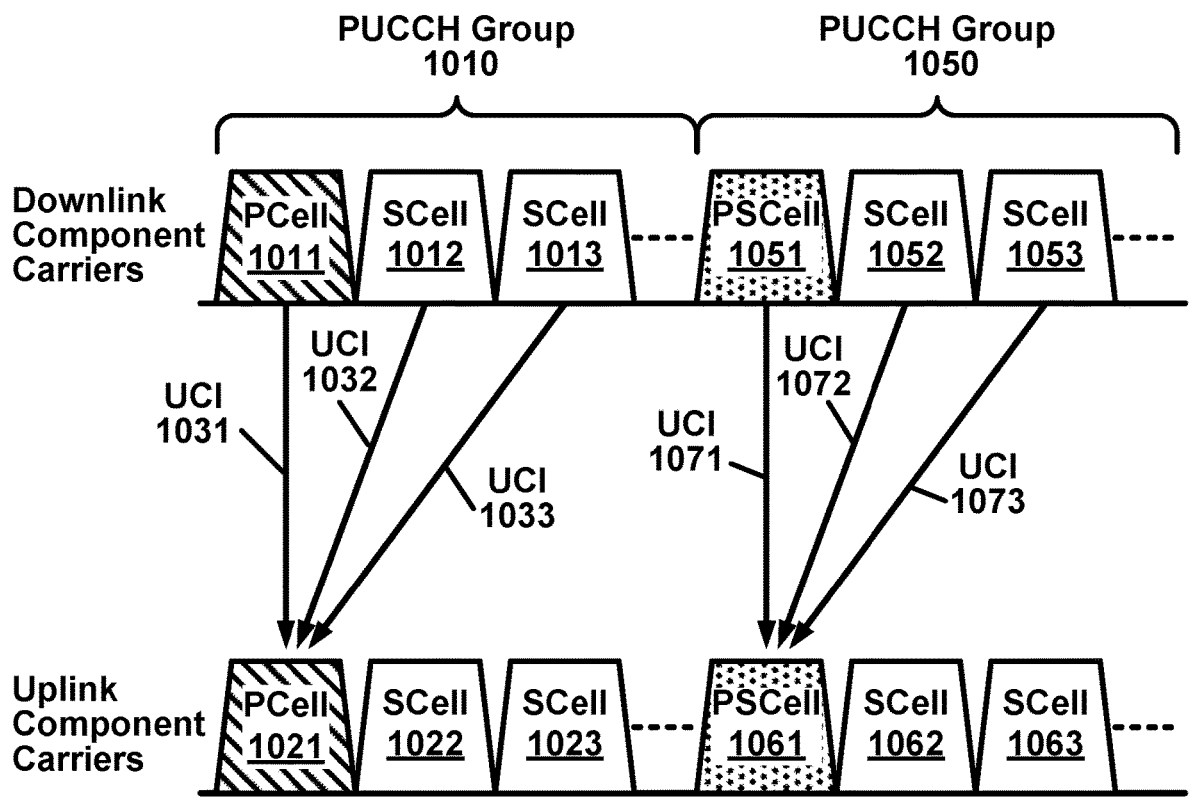
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
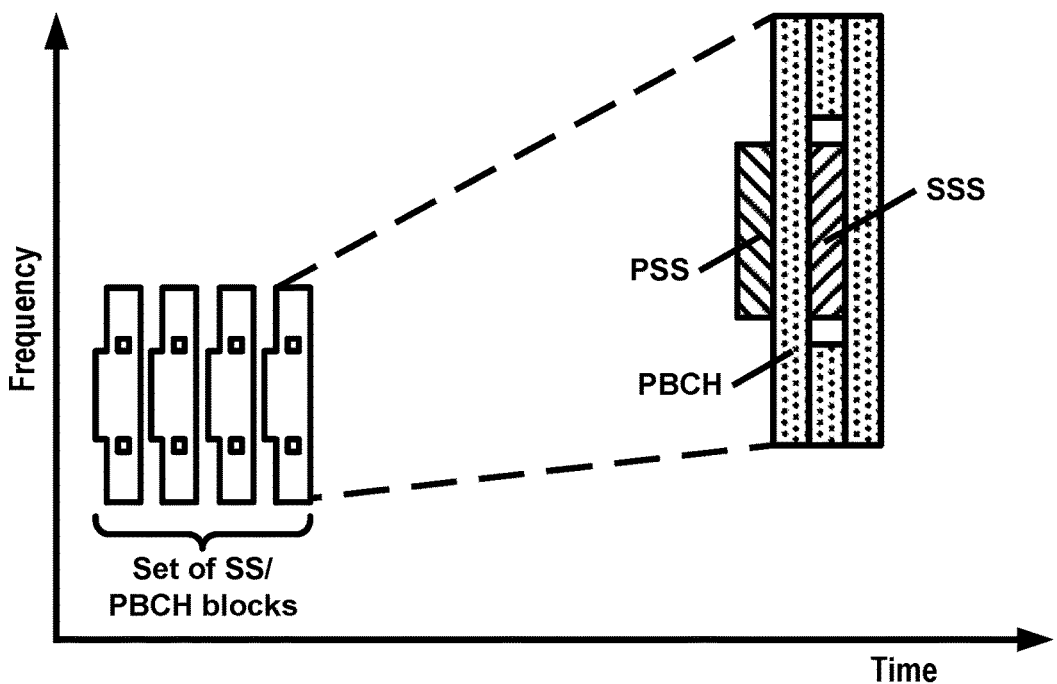
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow abase station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
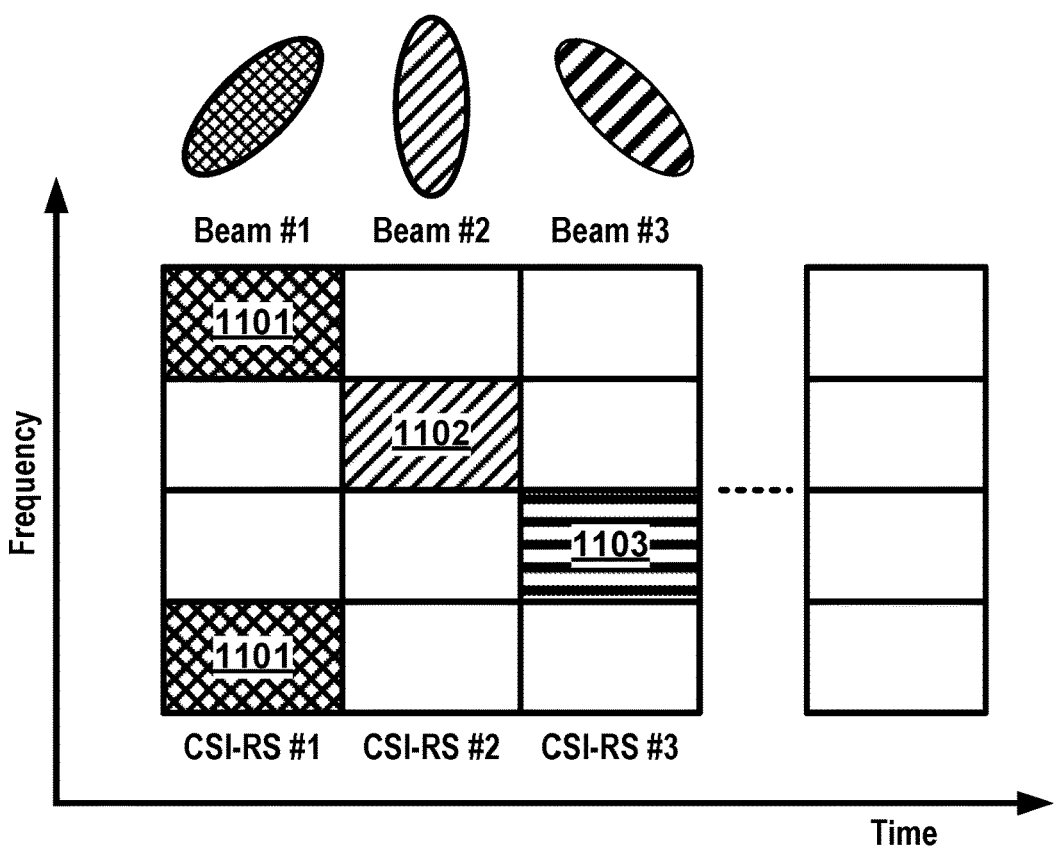
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/ comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/ comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
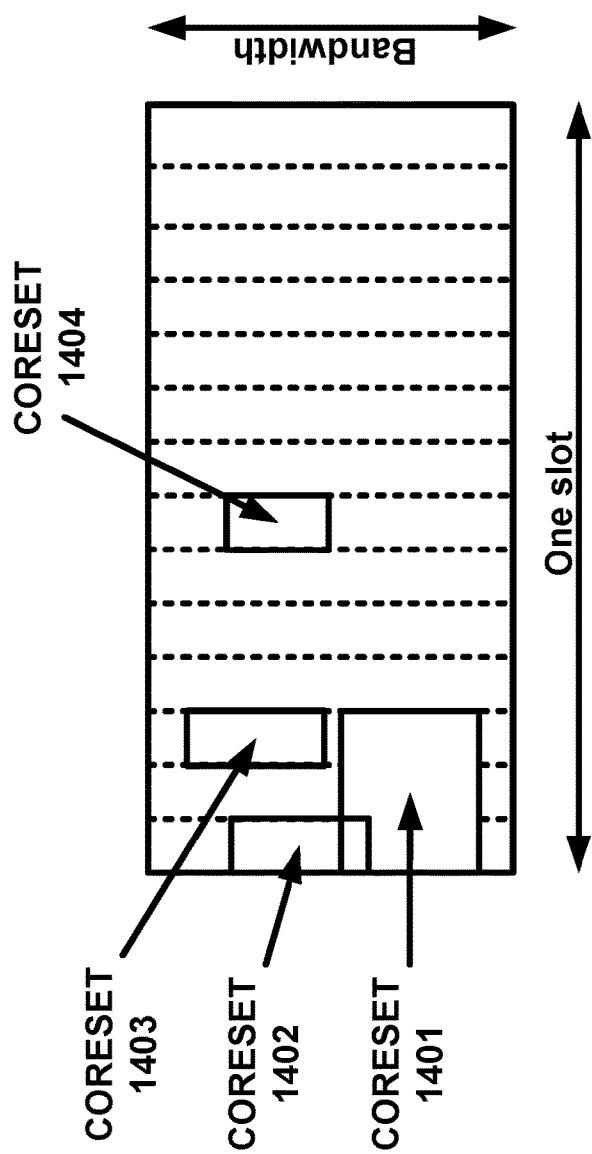
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
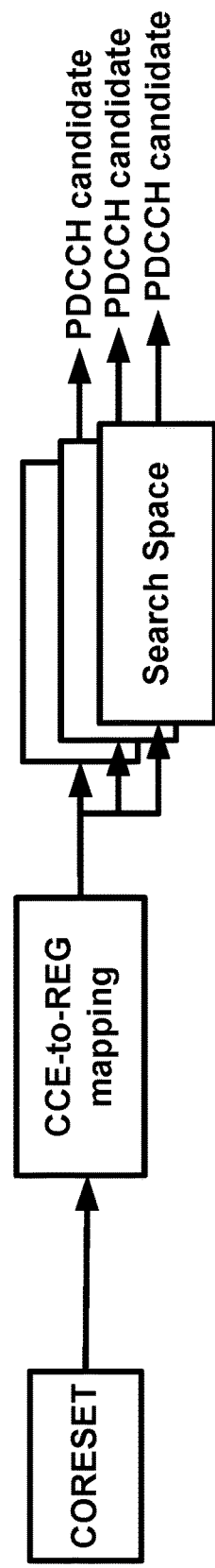
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
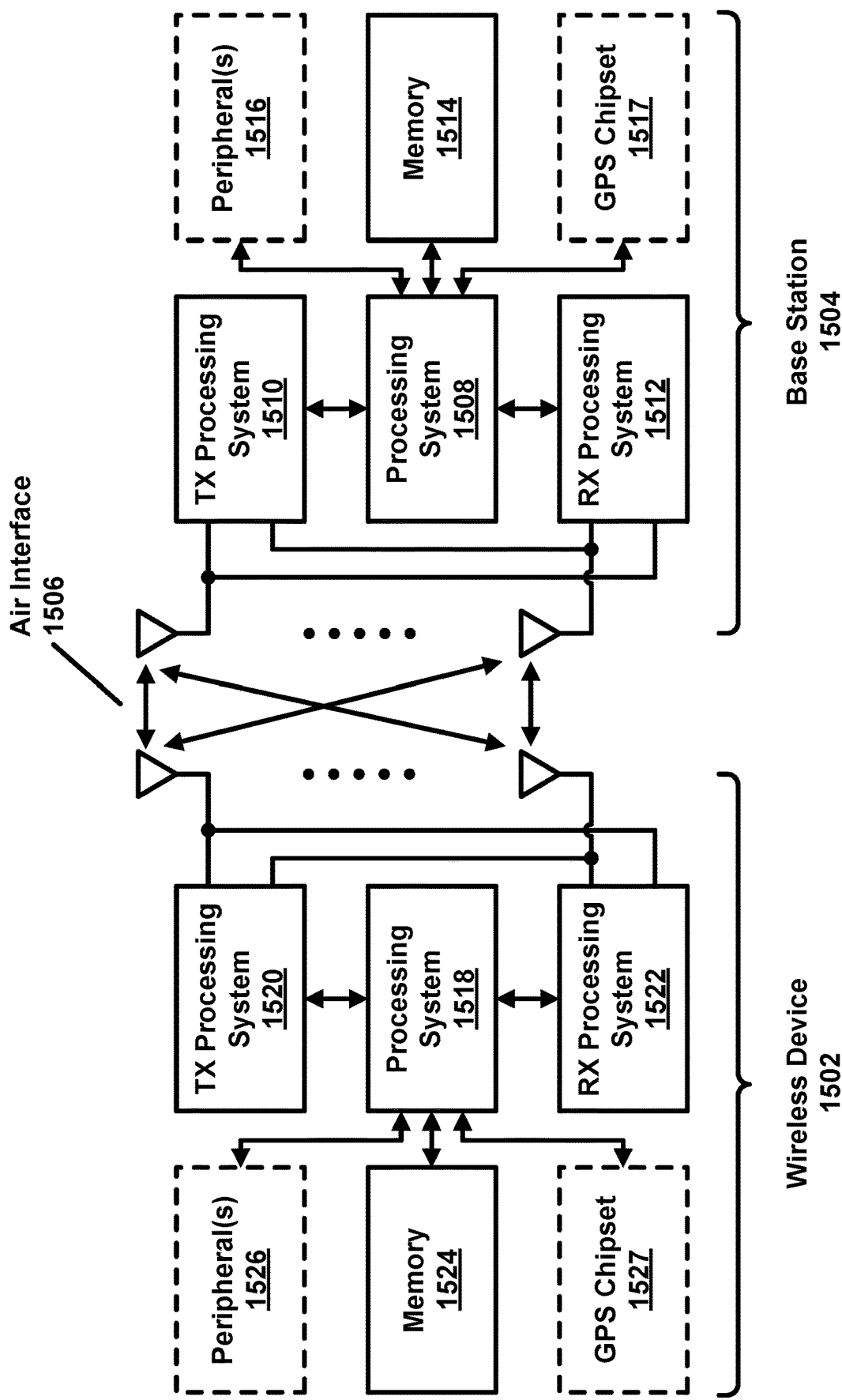
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
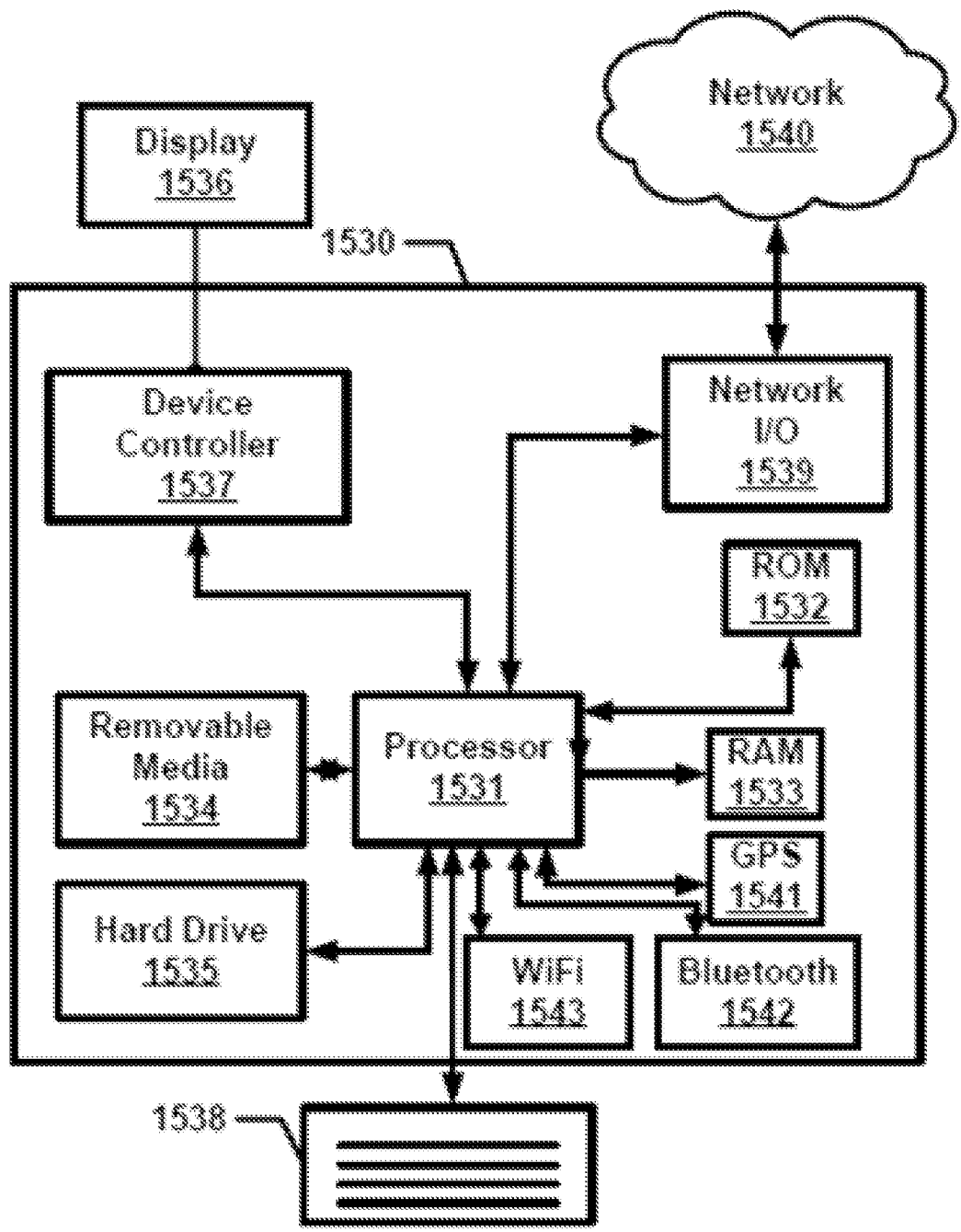
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency.

The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
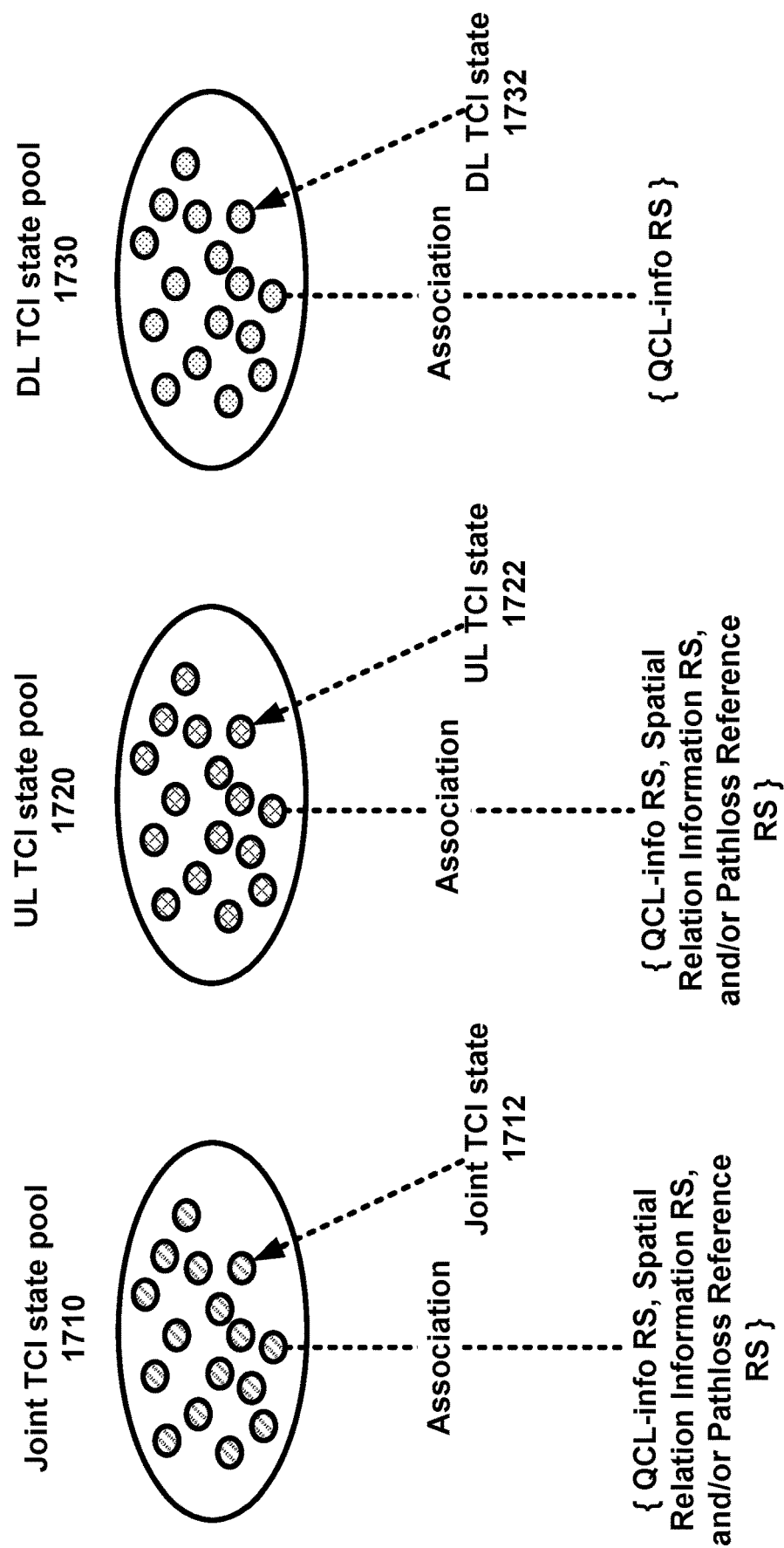
FIG. 17 shows an example of a plurality of TCI states and a plurality of TCI state pools.

FIG. 17 shows an example of a plurality of TCI states and a plurality of TCI state pools. As used herein, "TCI" may refer to "transmission configuration indication" and/or "transmission configuration indicator," which are generally understood to be interchangeable. The TCI state pools may comprise a joint TCI state pool (e.g., joint TCI state pool 1710) and/or separate TCI state pools. The TCI state pools may comprise an uplink TCI state pool (e.g., uplink TCI state pool 1720). The TCI state pools may comprise a downlink TCI state pool (e.g., downlink TCI state pool 1730). A TCI state pool (e.g., joint TCI state pool, UL TCI state pool, or DL TCI state pool) may be a TCI state group, a TCI state set, a TCI state list, or a TCI state sequence. The TCI state pool may comprise one or more TCI states. A joint TCI state pool may comprise, for example, one or more joint TCI states (e.g., joint TCI state 1712). At least one joint TCI state (e.g., each of the one or more joint TCI states) may be used, by a wireless device, for example, to determine a downlink spatial domain transmission filter of a reception of downlink signals (e.g., PDCCH, PDSCH, and/or CSI-RS). Additionally or alternatively, at least one joint TCI state may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools. Additionally or alternatively, the separate TCI state pools may comprise one or more downlink (DL) TCI state pools. A UL TCI state pool (e.g., UL TCI state pool 1720) may comprise one or more UL TCI states (e.g., UL TCI state 1722). At least one UL TCI state (e.g., each of the one or more UL TCI states) may be used, by the wireless device, for example, to determine an uplink spatial domain transmission filter of a transmission of uplink signals (e.g., PUCCH, PUSCH, and/or SRS).

A DL TCI state pool (e.g., DL TCI state pool 1730) may comprise, for example, one or more DL TCI states (e.g., DL TCI state 1732). At least one DL TCI state (e.g., each of the one or more DL TCI states) may be used, by the wireless device, for example, to determine a downlink spatial domain transmission filter of a reception for downlink signals (e.g., PDCCH, PDSCH, and/or CSI-RS). A TCI state (e.g., each TCI state of the TCI state pool, for example, joint TCI state pool, UL TCI state pool, or DL TCI state pool) may be referred to as a beam (and/or a spatial domain filter) used for a reception or a transmission by the wireless device. At least one joint TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions, by the wireless device, via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

A TCI state (e.g., each TCI state) of the joint TCI state pool may be associated with one or more parameters. For example, at least one TCI state (e.g., each TCI state) of the joint TCI state pool may be associated with a quasi-colocated information (QCL-info) reference signal (RS), a spatial relation information RS, and/or a pathloss reference RS (and/or a pathloss RS). At least one TCI state (e.g., each TCI state) of the joint TCI state pool may comprise a QCL-info RS, a spatial relation information RS, and/or a pathloss reference RS (and/or a pathloss RS). An information element of at least one TCI state (e.g., each TCI state) of the joint TCI state pool may be configured with, for example, the QCL-info RS, the spatial relation information RS, and/or the pathloss reference RS via RRC messages. An information element of at least one TCI state (e.g., each TCI state) of the joint TCI state pool may comprise, for example, the QCL-info RS, the spatial relation information RS, and/or the pathloss reference RS via RRC messages. The information element of at least one TCI state (e.g., each TCI state) of the joint TCI state pool may be configured with an association with the QCL-info RS, the spatial relation information RS, and/or the pathloss reference RS via RRC messages. The wireless device may determine, for example, the QCL-info RS, the spatial relation information RS, and/or the pathloss reference RS based on the association t of at least one TCI state (e.g., each TCI state). The wireless device may determine, for example, the QCL-info RS, the spatial relation information RS, and/or the pathloss reference RS based on the information element of at least one TCI state (e.g., each TCI state).

A TCI state (e.g., each TCI state of the UL TCI state pool) may be associated with one or more parameters. For example, at least one TCI state (e.g., each TCI state) of the UL TCI state pool may be associated with a QCL-info RS, a spatial relation information RS, and/or a pathloss reference RS (and/or a pathloss RS). At least one TCI state (e.g., each TCI state) of the UL TCI state pool may comprise a QCL-info RS, a spatial relation information RS, and/or a pathloss reference RS (and/or a pathloss RS). An information element of at least one TCI state (e.g., each TCI state) of the UL TCI state pool may be configured with, for example, the QCL-info RS, the spatial relation information RS, and/or the pathloss reference RS via RRC messages. An information element of at least one TCI state (e.g., each TCI state) of the UL TCI state pool may comprise, for example, the QCL-info RS, the spatial relation information RS, and/or the pathloss reference RS via RRC messages. The information element of at least one TCI state (e.g., each TCI state) of the UL TCI state pool may be configured with an association with the QCL-info RS, the spatial relation information RS, and/or the pathloss reference RS via RRC messages. The wireless device may determine the QCL-info RS, the spatial relation information RS, and/or the pathloss reference RS based on the association of at least one TCI state (e.g., each TCI state). The wireless device may determine the QCL-info RS, the spatial relation information RS, and/or the pathloss reference RS based on the information element of at least one TCI state (e.g., each TCI state). At least one TCI state (e.g., each TCI state) of the DL TCI state pool may be associated with one or more parameters. For example, at least one TCI state (e.g., each TCI state) of the DL TCI state pool may be associated with one or more QCL-info RSs. At least one TCI state (e.g., each TCI state) of the DL TCI state pool may comprise one or more QCL-info RSs. An information element of at least one TCI state (e.g., each TCI state) of the DL TCI state pool may be configured with, for example. the one or more QCL-info RSs via RRC messages. An information element of at least one TCI state (e.g., each TCI state) of the DL TCI state pool may comprise, for example, the one or more QCL-info RSs via RRC messages.

Figure 18:
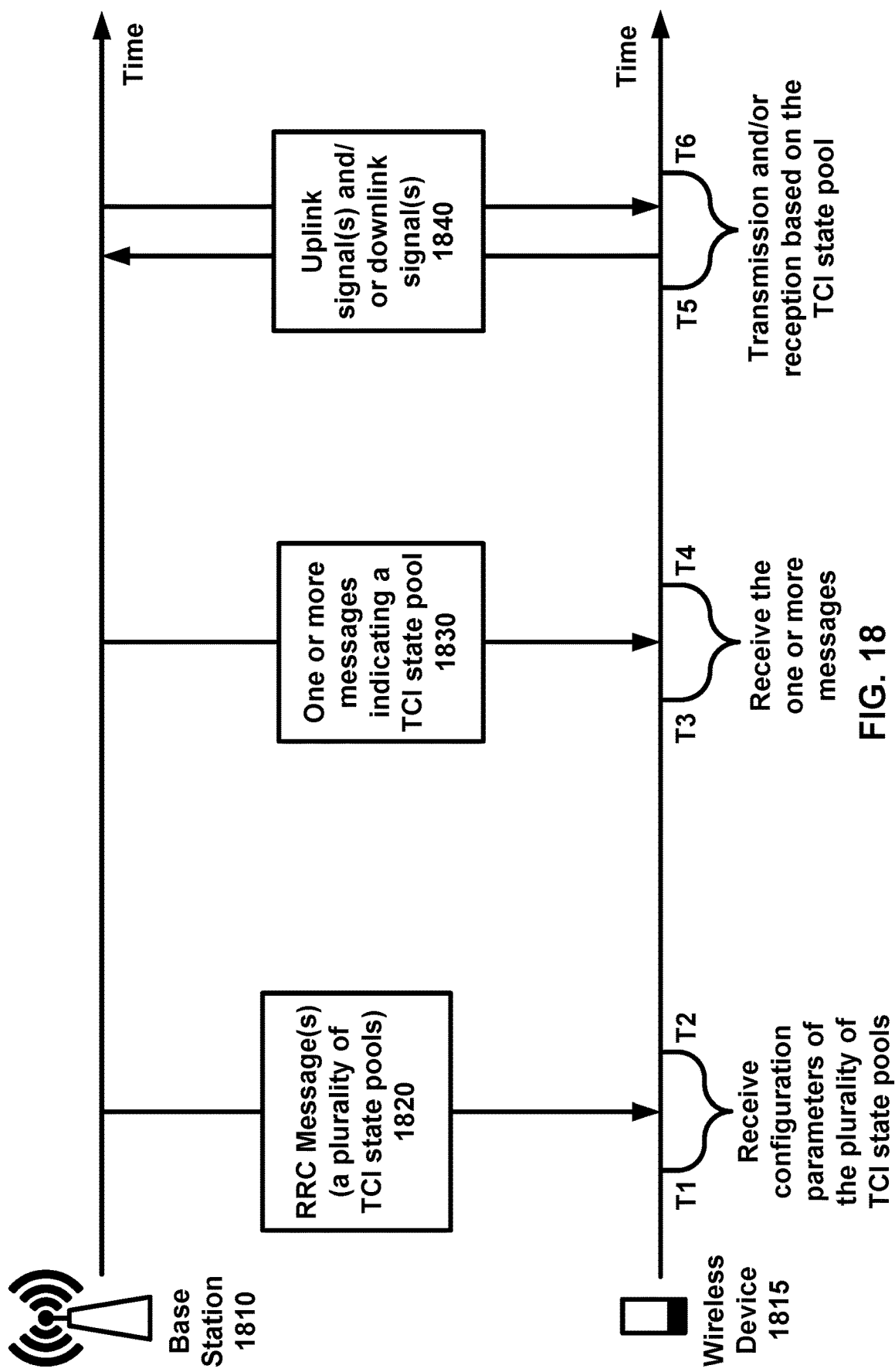
FIG. 18 shows a determination procedure of a TCI state pool.

FIG. 18 shows a determination procedure of a TCI state pool. A wireless device (e.g., wireless device 1815) may receive, from a base station (e.g., base station 1810), one or more RRC messages (e.g., between time T1 and T2). The one or more RRC messages may comprise configuration parameters. As shown in FIG. 18, the wireless device may receive, from the base station, one or more messages (e.g. RRC messages 1820) comprising configuration parameters. The base station may send (e.g., transmit), to the wireless device, one or more messages (e.g. RRC messages 1820) comprising configuration parameters, for example, between time T1 and T2. The configuration parameters may be received, from the base station, via RRC signaling. The one or more configuration parameters (e.g., RRC configuration parameters via RRC signaling or any other configuration parameters via any other signaling) may comprise one or more parameters. The configuration parameters, received by the wireless device may indicate a plurality of TCI state pools. The plurality of TCI state pools may comprise: one or more joint TCI state pools; one or more DL TCI state pools; and/or one or more UL TCI state pools. The wireless device may receive, from the base station, one or more messages (e.g., one or more messages 1830), for example, between time T3 and T4, as shown in FIG. 18. The base station may send (e.g., transmit), to the wireless device, one or more messages between time T3 and T4. The one or more messages (e.g., one or more messages 1830) may indicate a TCI state pool. The one or more messages may indicate a TCI state pool from the plurality of TCI state pools indicated via the configuration parameters. The one or more messages may comprise an RRC message. Additionally, the one or more messages may comprise a MAC CE. Additionally or alternatively, the one or more messages may comprise first DCI. The one or more messages may comprise first DCI, for example, via PDCCH.

DCI (e.g., the first DCI) may comprise a wireless device dedicated DCI. The first DCI may comprise a group common PDCCH, for example, a group common PDCCH targeting to multiple wireless devices. The wireless device may receive, from the base station, second DCI. The base station may send (e.g., transmit), to the wireless device, second DCI. The second DCI may indicate one or more TCI states from a TCI state pool. The second DCI may indicate, for example, one or more TCI states from the TCI state pool indicated by the one or more messages (e.g., one or more messages 1830). The wireless device may send (e.g., transmit), to the base station, uplink (UL) signal(s) based on the TCI state pool. The wireless device may send (e.g., transmit), to the base station, UL signal(s) based on the TCI state pool indicated by the one or more messages (e.g., one or more messages 1830), for example, between time T5 and T6 as shown in FIG. 18. The wireless device may send (e.g., transmit), to the base station, the UL signal(s) based on one or more TCI states from a TCI state pool. The wireless device may send (e.g., transmit), to the base station, the UL signal(s) based on one or more TCI states from the TCI state pool indicated by the one or more messages. The base station may receive, from the wireless device, UL signal(s) based on a TCI state pool. The base station may receive, from the wireless device, UL signal(s) based on the TCI state pool indicated by the one or more messages (e.g., one or more messages 1830), for example, between time T5 and T6, as shown in FIG. 18. The base station may receive, from the wireless device, UL signal(s) based on one or more TCI states from a TCI state pool. The base station may receive, from the wireless device, UL signal(s) based on one or more TCI states from the TCI state pool indicated by the one or more messages. The UL signals may comprise PUCCH, PUSCH, preamble via PRACH, and/or sounding channel (e.g., SRS transmission). The wireless device may receive, from the base station, downlink (DL) signal(s) based on a TCI state pool. The wireless device may receive, from the base station, DL signal(s) based on the TCI state pool indicated by the one or more messages (e.g., one or more messages 1830, for example, between time T5 and T6, as shown in FIG. 18. The wireless device may receive, from the base station, the DL signal(s) based on the one or more TCI states from a TCI state pool. The wireless device may receive, from the base station, the DL signal(s), for example, based on the one or more TCI states from the TCI state pool indicated by the one or more messages. The base station may send (e.g., transmit), to the wireless device, DL signal(s) based on a TCI state pool. The base station may send (e.g., transmit), to the wireless device, DL signal(s) based on the TCI state pool indicated by the one or more messages (e.g., one or more messages 1830, for example, between time T5 and T6, as shown in FIG. 18. The base station may send (e.g., transmit), to the wireless device, DL signal(s) based on the one or more TCI states from a TCI state pool. The base station may send (e.g., transmit), to the wireless device, DL signal(s), for example, based on the one or more TCI states from the TCI state pool indicated by the one or more messages. The DL signals may comprise PDCCH, PDSCH, and/or CSI-RS.

In at least some determination procedures of a TCI state pool, a wireless device may receive, from a base station, one or more RRC messages comprising configuration parameters. The configuration parameters may indicate a plurality of TCI state pools (e.g., one or more joint TCI state pools, one or more DL TCI state pools, and/or one or more UL TCI state pools). To communicate with the base station, the wireless device may receive one or more messages indicating a TCI state pool from the plurality of TCI state pools. The wireless device may send (e.g., transmit) UL signal(s) based on the indicated TCI state pool. The wireless device may receive DL signal(s) based on the indicated TCI state pool. The wireless device may receive, from the base station, a MAC CE activating one or more TCI states of the TCI state pool, for example, before the transmission of the UL signal(s) and/or reception of the DL signal(s). The base station may send (e.g., transmit), to the wireless device, a respective MAC CE activating the one or more TCI states, for example, for different TCI state pools (e.g., joint TCI state pool, DL TCI state pool, and UL TCI state pool).

In at least some determination procedures of a TCI state pool, TCI states of the TCI state pool may only be applied to a single channel, for example, one of a control channel or a data channel. The in ability of the wireless device to apply a TCI state to multiple channels may increase signaling overhead and power consumption to indicate a TCI state for different channels, thereby impacting signaling efficiency and the ability of the wireless device to reliably communicate with the base station. Beam activation and determination procedures may be enhanced, for example, by applying a TCI state to multiple channels (e.g., control channels and data channels), which may reduce signaling overhead and reduce power consumption. These enhanced beam activation and determination procedures may increase the performance of the communication system and/or signaling efficiency of beam activation and/or indication procedures, for example, by using one signaling instance to indicate a TCI state for multiple channels.

By implementing at least some technologies, the wireless device does not determine which TCI state pool, for example, a default TCI state pool or an initial TCI state pool, is to be used for receiving the one or more messages indicating the TCI state pool from the plurality of TCI state pools. By implementing at least some technologies, the wireless device may not determine one or more default TCI states, from the default TCI state pool (or the initial TCI state pool), to be used for the reception of the one or more messages. The inability of the wireless device to determine which TCI state pool (e.g., a default TCI state pool), is to be used for receiving the one or more messages indicating the TCI state pool from the plurality of TCI state pools may decrease the detection performance of the one or more messages and the performance of the whole communication system. The inability of the wireless device to reliably communicate with the base station, for example, to determine one or more default TCI states, from the default TCI state pool (or the initial TCI state pool) to be used for receiving the one or more messages, may decrease the detection performance of the one or more messages and the performance of the whole communication system. By implementing at least some technologies, the wireless device may receive a respective MAC CE activating the one or more TCI states for different TCI state pools. Receiving a respective MAC CE to activate the one or more TCI states for different TCI state pools may significantly increase signaling overhead and may increase the complexity and power consumption of signaling detection performed by the wireless device. Beam activation and determination procedures may be enhanced, for example, by reducing signaling overhead and reducing power consumption. These enhanced beam activation and determination procedures may increase the performance of the communication system and/or signaling efficiency of beam activation and/or indication procedures, for example, if using multiple TCI state pools (or with multiple TCI state groups, multiple TCI state sets, multiple TCI state lists, or multiple TCI state sequences).

As described herein, a wireless device and/or other devices (e.g., a base station) may overcome various deficiencies of at least some beam activation and determination procedures by using improved/enhanced communications. Improvements/enhancements may be achieved, for example, such that a wireless device may determine a first TCI state pool (e.g., a default TCI state pool, an initial TCI state pool) to be used for receiving the one or more messages indicating a second TCI state pool from a plurality of TCI state pools, for example, a plurality of TCI state pools indicated via configuration parameters. Improvements/enhancements may be achieved, for example, for wireless communications such that the wireless device may determine one or more default TCI states, from the default TCI state pool (or the initial TCI state pool) to be used for receiving the one or more messages. The wireless device may receive configuration parameters from a base station. The configuration parameters may indicate a plurality of TCI state pools. At least one TCI state pool (e.g., each TCI state pool), of the plurality of TCI state pools, may comprise one or more TCI states. At least one TCI state pool (e.g., each TCI state pool), of the one or more TCI state pools, may comprise a plurality of TCI states. The wireless device may determine, based on the configuration parameters, a first TCI state pool from the plurality of TCI state pools. The wireless device may receive, based on the first TCI state pool, one or more messages indicating a second TCI state pool from the plurality of TCI state pools. The wireless device may use, for example, a TCI state of the determined first TCI state to receive the one or more messages. The wireless device may send (e.g., transmit) one or more uplink signals based on the second TCI state pool. The wireless device may receive one or more downlink signals based on the second TCI state pool. By determining a first TCI state pool (e.g., a default TCI state pool) to be used for receiving the one or more messages indicating a second TCI state pool from the plurality of TCI state pools, the wireless device and base station avoid the unreliability of beam activation and/or determination procedures, for example, for multiple TCI state pools, and/or reduce signaling overhead and/or power consumption (e.g., signaling overhead and power consumption used for configuring a default TCI state pool), which may increase the performance of the communication system and/or signaling efficiency of beam activation and/or indication procedures.

A wireless device may receive configuration parameters from a base station. The configuration parameters may indicate a plurality of TCI state pools. At least one TCI state pool (e.g., each TCI state pool), of the plurality of TCI state pools, may comprise one or more TCI states. At least one TCI state pool (e.g., each TCI state pool), of the plurality of TCI state pools, may comprise a plurality of TCI states. The configuration parameters may indicate a first TCI state pool from the plurality of TCI state pools. The wireless device may receive, based on the first TCI state pool, one or more messages indicating a second TCI state pool from the plurality of TCI state pools. The wireless device may send (e.g., transmit) one or more uplink signals based on the second TCI state pool. The wireless device may receive one or more downlink signals based on the second TCI state pool.

A wireless device and/or other devices (e.g., a base station) may overcome various deficiencies of at least some beam determination procedures by using improved/enhanced communications. Improvements/enhancements may also be achieved, for example, for wireless communications such that the wireless device may determine a first TCI state pool (e.g., a default TCI state pool, an initial TCI state pool) to be used for receiving the one or more messages indicating a second TCI state pool from a plurality of TCI state pools, for example, by receiving a MAC CE indicating the first TCI state pool. The wireless device may receive configuration parameters from a base station. The configuration parameters may indicate a plurality of TCI state pools. At least one TCI state pool (e.g., each TCI state pool), of the plurality of TCI state pools, may comprise one or more TCI states. At least one TCI state pool (e.g., each TCI state pool), of the plurality of TCI state pools, may comprise a plurality of TCI states. The wireless device may receive a medium access control control element (MAC CE) indicating a first TCI state pool from the plurality of TCI state pools. The wireless device may receive, based on the first TCI state pool, one or more messages indicating a second TCI state pool from the plurality of TCI state pools. The wireless device may send (e.g., transmit) one or more uplink signals based on the second TCI state pool. The wireless device may receive one or more downlink signals based on the second TCI state pool.

A wireless device and/or other devices (e.g., a base station) may overcome various deficiencies of at least some beam determination procedures by using improved/enhanced communications. Improvements/enhancements may also be achieved, for example, for wireless communications such that the wireless device may determine a first TCI state pool (e.g., a default TCI state pool, an initial TCI state pool) to be used for receiving the one or more messages indicating a second TCI state pool from a plurality of TCI state pools, for example, by receiving a DCI indicating the first TCI state pool. The wireless device may receive configuration parameters from a base station. The configuration parameters may indicate a plurality of TCI state pools. At least one TCI state pool (e.g., each TCI state pool), of the plurality of TCI state pools, may comprise one or more TCI states. At least one TCI state pool (e.g., each TCI state pool), of the plurality of TCI state pools, may comprise a plurality of TCI states. The wireless device may receive downlink control information (DCI) indicating a first TCI state pool from the plurality of TCI state pools. The wireless device may receive, based on the first TCI state pool, one or more messages indicating a second TCI state pool from the plurality of TCI state pools. The wireless device may send (e.g., transmit) one or more uplink signals based on the second TCI state pool. The wireless device may receive one or more downlink signals based on the second TCI state pool.

A wireless device and/or other devices (e.g., a base station) may overcome various deficiencies of at least some beam determination procedures by using improved/enhanced communications. Improvements/enhancements may also be achieved, for example, for wireless communications such that the wireless device may determine a first TCI state pool (e.g., a default TCI state pool, an initial TCI state pool) to be used for receiving the one or more messages indicating a second TCI state pool from a plurality of TCI state pools, for example, by using priority values associated with the first TCI state pool. The wireless device may receive configuration parameters from a base station. The configuration parameters may indicate a plurality of TCI state pools. At least one TCI state pool (e.g., each TCI state), of the plurality of TCI state pools, may comprise one or more TCI states. At least one TCI state pool (e.g., each TCI state pool), of the plurality of TCI state pools, may comprise a plurality of TCI states. The configuration parameters may indicate a priority value for at least one TCI state pool (e.g., each TCI state pool) of the plurality of TCI state pools. The wireless device may determine a first TCI state pool, from the plurality of TCI state pools, based on the priority value of the first TCI state pool. The wireless device may receive, based on the first TCI state pool, one or more messages indicating a second TCI state pool from the plurality of TCI state pools. The wireless device may send (e.g., transmit) one or more uplink signals based on the second TCI state pool. The wireless device may receive one or more downlink signals based on the second TCI state pool.

A wireless device may receive configuration parameters from a base station. The configuration parameters may indicate a plurality of TCI state pools. At lease one TCI state pool (e.g., each TCI state pool), of the plurality of TCI state pools, may comprise one or more TCI states. At lease one TCI state pool (e.g., each TCI state pool), of the plurality of TCI state pools, may comprise a plurality of TCI states. The wireless device may determine, based on the configuration parameters, a first TCI state pool from the plurality of TCI state pools. The wireless device may send (e.g., transmit) an uplink signal. The uplink signal may comprise a MAC CE or a channel state information report. The wireless device may switch from the first TCI state pool to a second TCI state pool, of the plurality of TCI state pools, based on (e.g., in response to) the sending (e.g., transmitting) the uplink signal.

A wireless device and/or other devices (e.g., a base station) may overcome various deficiencies of at least some beam determination procedures by using improved/enhanced communications. Improvements/enhancements may be achieved, for example, for wireless communications such that the wireless device may receive DCI and/or a MAC CE comprising a bitfield with a codepoint indicating one or more first TCI states to be activated. The wireless device may receive configuration parameters from a base station. The configuration parameters may indicate a plurality of TCI state pools. At lease one TCI state pool (e.g., each TCI state pool), of the plurality of TCI state pools, may comprise one or more TCI states. At lease one TCI state pool (e.g., each TCI state pool), of the plurality of TCI state pools, may comprise a plurality of TCI states. The wireless device may receive a MAC CE comprising a bitfield. The bitfield may activate one or more first TCI states. At least one bit (e.g., each bit) of the bitfield may indicate one or more second TCI states, of the one or more first TCI states, from one or more TCI state pools of the plurality of TCI state pools. The wireless device may receive an RRC message, the MAC CE (or a second MAC CE), and/or DCI activating (and/or enabling) the one or more TCI state pools. The wireless device may receive a second DCI indicating one or more third TCI states of the one or more first TCI states. The wireless device may send (e.g., transmit) uplink signals based on the one or more third TCI states. The wireless device may receive downlink signals based on the one or more third TCI states. By receiving DCI and/or a MAC CE comprising a codepoint indicating one or more first TCI states to be activated, the wireless device and base station may avoid the unreliability of beam activation procedures, and/or may reduce signaling overhead and power consumption, which may reduce overhead, increase the performance of the communication system and increase signaling efficiency of beam activation procedures.

Figure 19A:
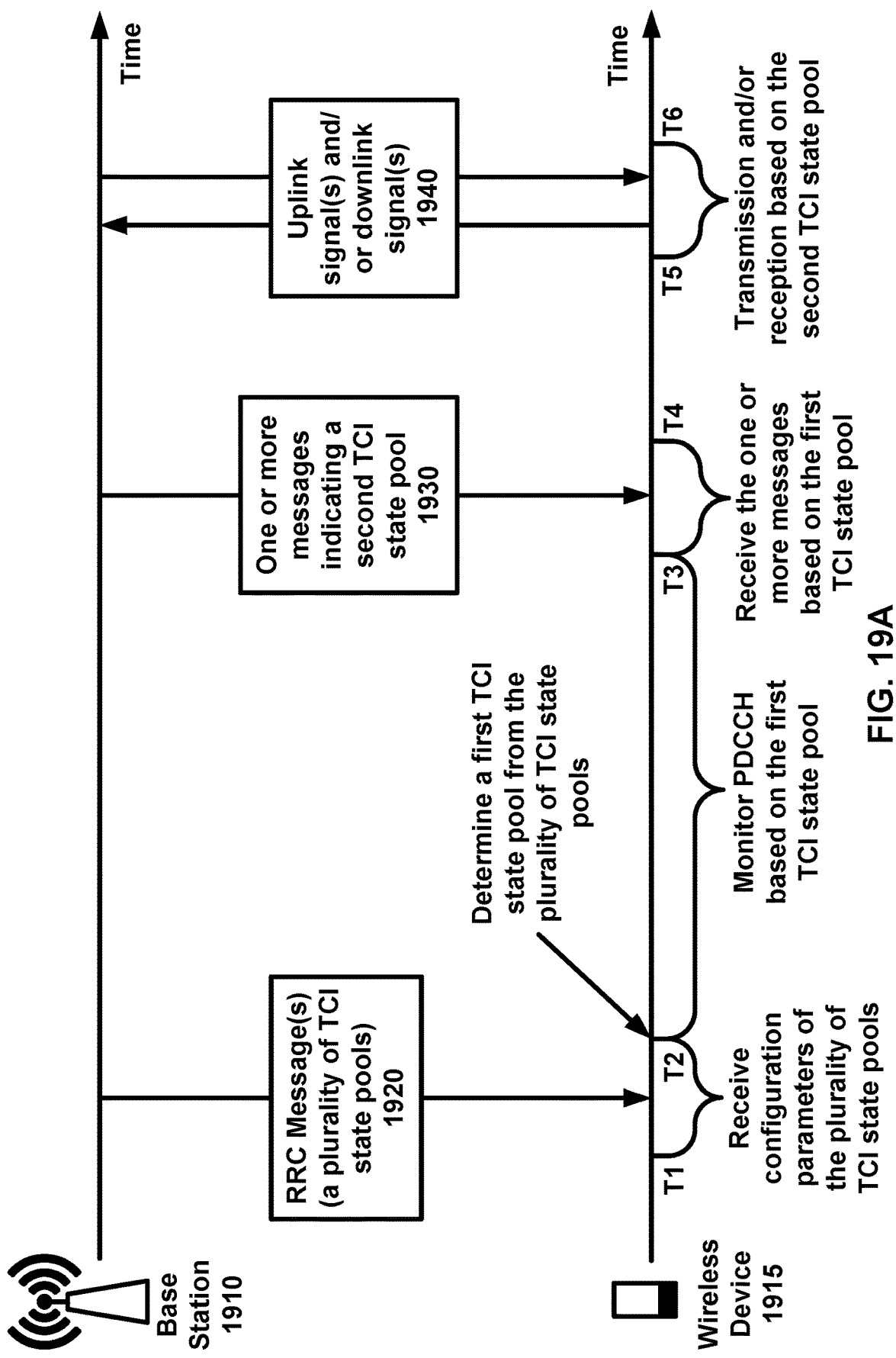
FIG. 19A shows a determination procedure of TCI state pool(s).

FIG. 19A shows a determination procedure of TCI state pool(s). A wireless device (e.g., wireless device 1915) may receive, from a base station (e.g., base station 1910), one or more RRC messages (e.g., one or more RRC messages 1920) comprising configuration parameters (e.g., between time T1 and T2, as shown in FIG. 19). The configuration parameters may indicate a plurality of TCI state pools. The configuration parameters may indicate a plurality of TCI state pools for a plurality of cells. The plurality of TCI state pools may comprise: one or more joint TCI state pools; one or more DL TCI state pools; and/or one or more UL TCI state pools.

A TCI state (e.g., each TCI state of the one or more joint TCI states) may be used, by the wireless device, for example, to determine a downlink spatial domain transmission filter of a reception of downlink signals (e.g., PDCCH, PDSCH, and/or CSI-RS). Additionally or alternatively, a joint TCI state (e.g., each joint TCI state of the one or more joint TCI states) may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools and/or one or more downlink (DL) TCI state pools. A UL TCI state pool may comprise one or more UL TCI states. A UL TCI state (e.g., each UL TCI state of the one or more UL TCI states) may be used, by the wireless device, for example, to determine an uplink spatial domain transmission filter of a transmission of uplink signals (e.g., PUCCH, PUSCH, and/or SRS). A DL TCI state pool may comprise, for example, one or more DL TCI states. A DL TCI state (e.g., each DL TCI state of the one or more DL TCI states) may be used, by the wireless device, for example, to determine a downlink spatial domain transmission filter of a reception for downlink signals (e.g., PDCCH, PDSCH, and/or CSI-RS). At least one TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

The wireless device may determine a first TCI state pool from the plurality of TCI state pools (e.g., at time T2, as shown in FIG. 19). The wireless device may determine a first TCI state pool, of a cell, from the plurality of TCI state pools for a plurality of cells. The first TCI state pool may be a default TCI state pool, an initial TCI state pool, or a starting TCI state pool. The first TCI state pool may be used by the wireless device before receiving an activation (and/or enabling) of a TCI state pool. The first TCI state pool may be used by the wireless device, for example, before receiving an activation (and/or enabling) of any one of the plurality of TCI state pools (e.g., except for the first TCI state pool). The first TCI state pool may be used by the wireless device before receiving an indication of one or more TCI states of the plurality of TCI state pools (e.g., except for the first TCI state pool). The wireless device may determine the first TCI state pool. The wireless device may determine the first TCI state pool, for example, based on the configuration parameters. The configuration parameters may indicate the first TCI state pool from the plurality of TCI state pools. The wireless device may determine the first TCI state pool, for example, based on an index of the first TCI state pool. The configuration parameters may indicate an index for a TCI state pool. The configuration parameters may indicate, for example, a respective index for at least one TCI state pool (e.g., each TCI state pool) of the plurality TCI state pools. The wireless device may determine the first TCI state pool with the lowest TCI state pool index in the plurality of TCI state pools. The wireless device may determine the first TCI state pool with the highest TCI state pool index in the plurality of TCI state pools.

The wireless device may determine, based on an TCI state pool type, the first TCI state pool from the plurality of TCI state pools. The configuration parameters may indicate an TCI state pool type. The configuration parameters may indicate a TCI state pool type for at least one TCI state pool (e.g., each TCI state pool) of the plurality of TCI state pools. The TCI state pool type may comprise: a joint TCI state pool type; or a separate TCI state pool type. The joint TCI state pool type may comprise one or more joint TCI state pools. The separate TCI state pool type may comprise: one or more DL TCI state pools; and/or one or more UL TCI state pools. The wireless device may determine the first TCI state pool, for example, as a joint TCI state pool of the plurality of TCI state pools. The joint TCI state pool may be a TCI state pool with the lowest joint TCI state pool index in the plurality of TCI state pools. The joint TCI state pool may be a TCI state pool with the highest joint TCI state pool index in the plurality of TCI state pools. The wireless device may determine the first TCI state pool, for example, as a separate TCI state pool of the plurality of TCI state pools. The first TCI state pool may be a TCI state pool pair comprising a first DL TCI state pool and a first UL TCI state pool. The first TCI state pool may be a TCI state pool pair based on (e.g., in response to) the determining the first TCI state pool as a separate TCI state pool. The first DL TCI state pool may be a TCI state pool with the lowest DL TCI state pool index in the plurality of TCI state pools. The first DL TCI state pool may be a TCI state pool with the highest DL TCI state pool index in the plurality of TCI state pools. The first UL TCI state pool may be a TCI state pool with the lowest UL TCI state pool index in the plurality of TCI state pools. The first UL TCI state pool may be a TCI state pool with the highest UL TCI state pool index in the plurality of TCI state pools.

The wireless device may monitor PDCCH, for example, between times T2 and T3, as shown in FIG. 19A. The wireless device may monitor PDCCH based on the first TCI state pool (e.g., from T2 to T3). The wireless device may monitor the PDCCH based on one or more first TCI states of the first TCI state pool. The wireless device may determine one or more spatial domain filters used for monitoring (and/or receiving) the PDCCH. The wireless device may determine, for example, based on the one or more first TCI states, one or more spatial domain filters used for monitoring (and/or receiving) the PDCCH. The wireless device may receive one or more messages (e.g., one or more messages 1930) from the base station, for example, between times T3 and T4, as shown in FIG. 19A. The wireless device may receive, based on the first TCI state pool, one or more messages from the base station (e.g., in duration from T3 to T4). The one or more messages may indicate a second TCI state pool from the plurality of TCI state pools. The second TCI state pool may be a joint TCI state pool. The second TCI state pool may be a DL TCI state pool, and/or a UL TCI state pool. The one or more messages may comprise: an RRC message; a MAC CE; and/or DCI. The DCI may comprise a wireless device dedicated DCI or a group common PDCCH. The wireless device may receive the one or more messages based on one or more first TCI states of the first TCI state pool. The wireless device may determine one or more spatial domain filters used for the reception of the one or more messages. The wireless device may determine, for example, based on the one or more first TCI states, one or more spatial domain filters used for the reception of the one or more messages.

The wireless device may send (e.g., transmit) one or more uplink signals to the base station, for example, between times T5 and T6, as shown in FIG. 19A at element 1940. The wireless device may send (e.g., transmit), based on the second TCI state pool, one or more uplink signals to the base station (e.g., between time T5 and T6). The wireless device may send (e.g., transmit), based on one or more second TCI states of the second TCI state pool, the one or more uplink signals to the base station. The wireless device may determine one or more spatial domain filters used for the transmission of the one or more uplink signals. The wireless device may determine, for example, based on the one or more second TCI states, one or more spatial domain filters used for the transmission of the one or more uplink signals. The wireless device may receive DCI indicating the one or more second TCI states. The wireless device may receive DCI indicating the one or more second TCI states, for example, before sending (e.g., transmitting) the one or more uplink signals. The one or more uplink signals may comprise: a PUCCH, a PUSCH, a PRACH, and/or an SRS. The wireless device may receive one or more downlink signals from the base station, for example, between times T5 and T6, as shown in FIG. 19A at element 1940. The wireless device may receive, for example, based on the second TCI state pool, one or more downlink signals from the base station (e.g., between time T5 and T6). The wireless device may receive, based on the one or more second TCI states of the second TCI state pool, the one or more downlink signals from the base station. The wireless device may determine one or more spatial domain filters used for the reception of the one or more downlink signals. The wireless device may determine, for example, based on the one or more second TCI states, one or more spatial domain filters used for the reception of the one or more downlink signals. The wireless device may receive the DCI indicating the one or more second TCI states. The wireless device may receive the DCI indicating the one or more second TCI states, for example, before receiving the one or more downlink signals. The one or more downlink signals may comprise: a PDCCH, a PDSCH, and/or a CSI-RS.

Figure 19B:
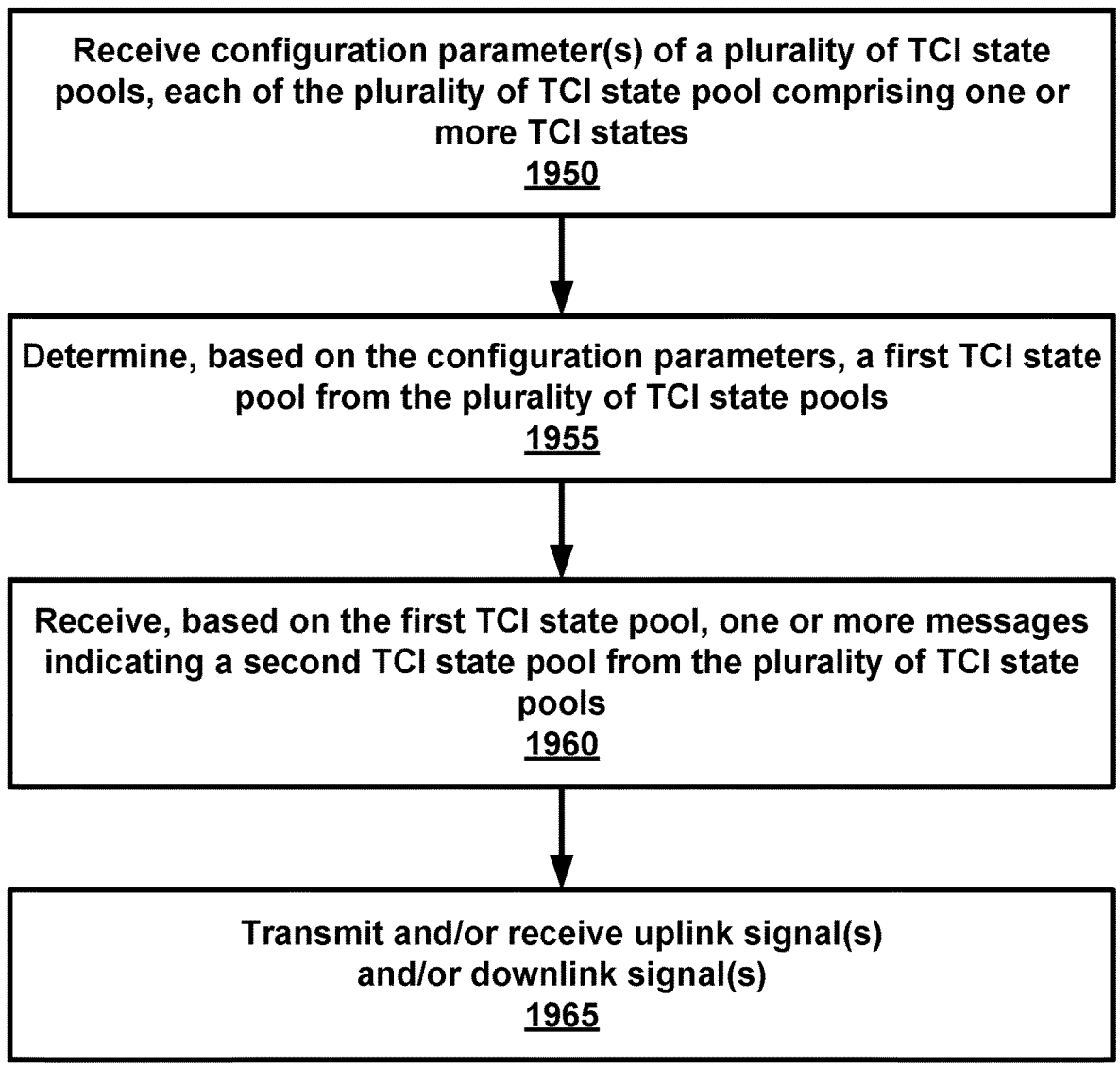
FIG. 19B and FIG. 19C show example methods of determining TCI state pool(s).
Figure 19C:
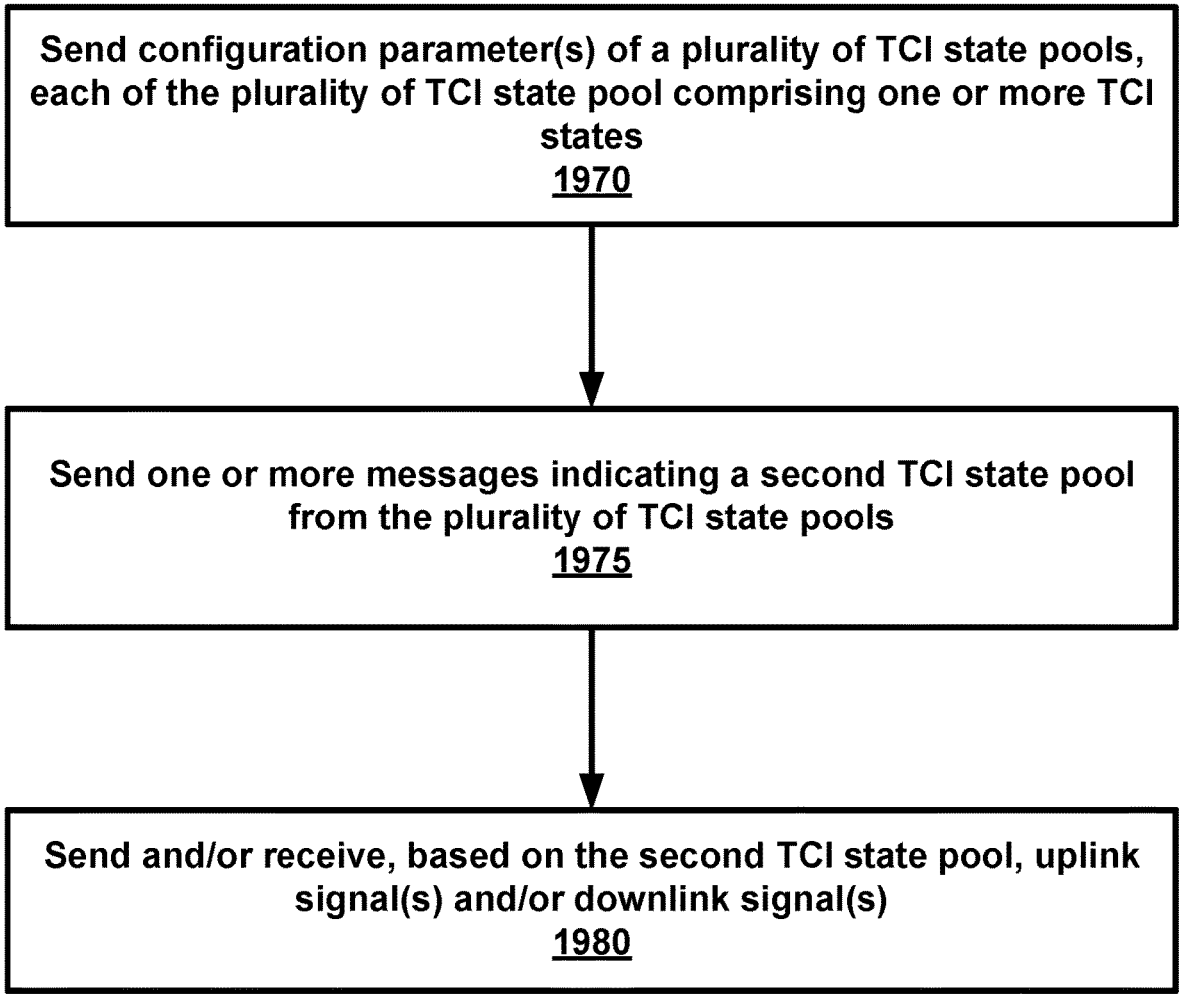

FIG. 19B and FIG. 19C show example methods of determining TCI state pool(s). A wireless device may receive one or more RRC messages comprising configuration parameters from a base station (e.g., at step 1950 as shown in FIG. 19B). A device (e.g., the base station, a relay, another wireless device, etc.) may send (e.g., transmit) the one or more configuration parameters (e.g., at step 1970 as shown in FIG. 19C). The configuration parameters may indicate a plurality of TCI state pools. At least one TCI state pool (e.g., each TCI state pool), of the plurality of TCI state pools, may comprise one or more TCI states. At least one TCI state pool (e.g., each TCI state pool) may comprise a plurality of TCI states. The wireless device may determine a first TCI state pool from the plurality of TCI state pools. The wireless device may determine, based on the configuration parameters, a first TCI state pool from the plurality of TCI state pools (e.g., at step 1955 as shown in FIG. 19B). The wireless device may receive one or more messages indicating a second TCI state pool from the plurality of TCI state pools. The wireless device may receive, based on the first TCI state pool, one or more messages indicating a second TCI state pool from the plurality of TCI state pools (e.g., at step 1960 as shown in FIG. 19B). The base station may send (e.g., transmit) one or more messages indicating a second TCI state pool from the plurality of TCI state pools (e.g., at step 1975 as shown in FIG. 19C). The wireless device may send (e.g., transmit) one or more uplink signals. The wireless device may send (e.g., transmit) one or more uplink signals based on the second TCI state pool (e.g., at step 1965 as shown in FIG. 19B). The base station may receive one or more uplink signals based on the second TCI state pool (e.g., at step 1980 as shown in FIG. 19C). The wireless device may receive one or more downlink signals. The wireless device may receive one or more downlink signals based on the second TCI state pool. The base station may send (e.g., transmit) one or more downlink signals based on the second TCI state pool.

A wireless device may receive, from a base station, one or more RRC messages comprising configuration parameters. The configuration parameters may indicate a plurality of TCI state pools. At least one TCI state pool (e.g., each TCI state pool), of the plurality of TCI state pools, may comprise one or more TCI states. At least one TCI state pool (e.g., each TCI state pool) may comprise a plurality of TCI states. The wireless device may determine, based on the configuration parameters, a first TCI state pool from the plurality of TCI state pools. The wireless device may receive, based on the first TCI state pool and from the base station, one or more messages indicating a second TCI state pool from the plurality of TCI state pools. The wireless device may send (e.g., transmit), to the base station, one or more uplink signals based on the second TCI state pool. The wireless device may receive, from the base station, one or more downlink signals based on the second TCI state pool.

The wireless device may determine that the first TCI state pool is used for receiving the one or more messages. The wireless device may determine that the first TCI state pool is used before an applicable time point of any TCI state, of the second TCI state pool, indicated by DCI or a MAC CE. The first TCI state pool may comprise one or more TCI states. The one or more messages may comprise at least one of: a MAC CE; DCI; or a radio resource control (RRC) message. The wireless device may receive one or more downlink signals based on the second TCI state pool. The wireless device may receive the one or more downlink signals, for example, based on one or more TCI states of the second TCI state pool. The one or more downlink signals may comprise at least one of: a physical downlink control channel (PDCCH); a physical downlink shared channel (PDSCH); or a channel state information reference signal (CSI-RS). The wireless device may send (e.g., transmit) the one or more uplink signals based on the second TCI state pool, for example, by sending (e.g., transmitting) the one or more uplink signals based on one or more TCI states of the second TCI state pool.

The one or more uplink signals may comprise at least one of: a physical uplink control channel (PUCCH); a physical uplink shared channel (PUSCH); a physical random access channel (PRACH); or a sounding reference signal (SRS). The wireless device may receive, based on the first TCI state pool, the one or more messages, for example, by receiving, based on one or more first TCI states of the first TCI state pool, the one or more messages. The one or more first TCI states may comprise one or more default TCI states. The configuration parameters may indicate a respective index for at least one TCI state pool (e.g., each TCI state pool) of the plurality of TCI state pools. The wireless device may determine the first TCI state pool, for example, by determining the first TCI state pool based on a first index of the first TCI state pool. The first index of the first TCI state pool may comprise a lowest index of a TCI state pool in the plurality of TCI state pools. The first index of the first TCI state pool may comprise a highest index of a TCI state pool in the plurality of TCI state pools. The configuration parameters may indicate a respective priority value for at least one TCI state pool (e.g., each TCI state pool) of the plurality of TCI state pools. The wireless device may determine the first TCI state pool, for example, by determining the first TCI state pool based on a priority value of the first TCI state pool. The priority value may comprise a lowest priority value in the plurality of TCI state pools. The priority value may comprise a highest priority value in the plurality of TCI state pools.

The configuration parameters may indicate a pool type for a TCI state pool. The configuration parameters may indicate a pool type for at least one TCI state pool (e.g., each TCI state pool) of the plurality of TCI state pools. The wireless device may determine the first TCI state pool, for example, by determining the first TCI state pool based on a first type of the first TCI state pool. The first type of the first TCI state pool may comprise a joint TCI state pool type or a separate TCI state pool type. The wireless device may determine the first TCI state pool, for example, by determining the first TCI state pool based on receiving a MAC CE indicating the first TCI state pool. The wireless device may determine the first TCI state pool, for example, by determining the first TCI state pool based on receiving DCI indicating the first TCI state pool. The wireless device may determine the first TCI state pool, for example, by determining the first TCI state pool based on a random access procedure.

The wireless device may receive a command indicating the first TCI state pool. The wireless device may receive the command indicating the first TCI state pool, for example, during the random access procedure. The configuration parameters may indicate an association between the first TCI state pool and the random access procedure. The association may comprise an association relationship between the first TCI state pool and a random access resource of the random access procedure. The random access resource may comprise at least one of: a random access preamble; or a random access channel occasion. The command may comprise a random access response message. The plurality of TCI state pools may comprise at least one of: one or more downlink TCI state pools; one or more uplink TCI state pools; or one or more joint TCI state pools. A downlink TCI state pool may comprise one or more downlink TCI states. For example, at least one downlink TCI state pool (e.g., each downlink TCI state pool), of the one or more downlink TCI state pools, may comprise one or more downlink TCI states. An uplink TCI state pool may comprise one or more uplink TCI states. For example, at least one uplink TCI state pool (e.g., each uplink TCI state pool), of the one or more uplink TCI state pools, may comprise one or more uplink TCI states. A joint TCI state pool may comprise one or more joint TCI states. For example, at least one joint TCI state pool (e.g., each joint TCI state pool), of the one or more joint TCI state pools, may comprise one or more joint TCI states.

Figure 20A:
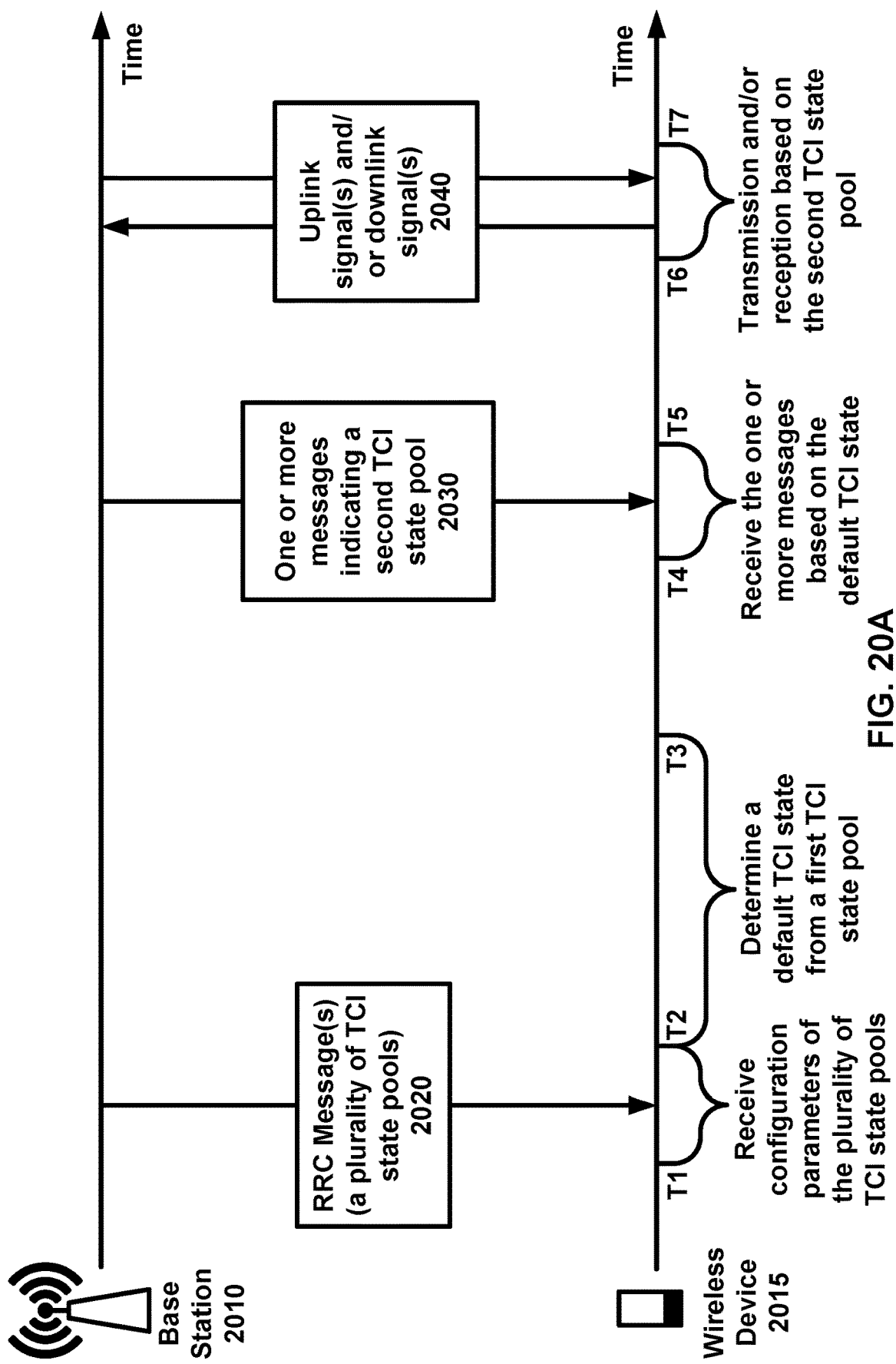
FIG. 20A shows a determination procedure of a default TCI state.

FIG. 20A shows a determination procedure of a default TCI state. A wireless device (e.g., wireless device 2015) may receive, from a base station (e.g., base station 2010), one or more RRC messages (e.g., one or more RRC messages 2020) comprising configuration parameters. The wireless device may receive the one or more RRC messages comprising configuration parameters, for example, between times T1 and T2, as shown in FIG. 19A. The base station may send (e.g., transmit) the one or more RRC messages comprising configuration parameters. The configuration parameters may indicate a plurality of TCI state pools. The configuration parameters may indicate a plurality of TCI state pools for a plurality of cells. The plurality of TCI state pools may comprise: one or more joint TCI state pools; one or more DL TCI state pools; and/or one or more UL TCI state pools.

A joint TCI state (e.g., each joint TCI state of the one or more joint TCI states) may be used, by the wireless device, for example, to determine a downlink spatial domain transmission filter of a reception of downlink signals (e.g., PDCCH, PDSCH, and/or CSI-RS). Additionally or alternatively, a joint TCI state (e.g., each joint TCI state of the one or more joint TCI states) may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools and/or one or more downlink (DL) TCI state pools. A UL TCI state pool may comprise one or more UL TCI states. A UL TCI state (e.g., each UL TCI state of the one or more UL TCI states) may be used, by the wireless device, for example, to determine an uplink spatial domain transmission filter of a transmission of uplink signals (e.g., PUCCH, PUSCH, and/or SRS). A DL TCI state pool may comprise, for example, one or more DL TCI states. A DL TCI state (e.g., each DL TCI state of the one or more DL TCI states) may be used, by the wireless device, for example, to determine a downlink spatial domain transmission filter of a reception for downlink signals (e.g., PDCCH, PDSCH, and/or CSI-RS). At least one TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

The wireless device may determine a first TCI state pool (e.g., as shown in FIG. 19A). The wireless device may determine a first TCI state pool for a cell. The wireless device may determine a default TCI state (or an initial TCI state or a starting TCI state). The wireless device may determine a default TCI state from the first TCI state pool, for example, between time T2 and T3, as shown in FIG. 20A. The default TCI state may be a TCI state with the lowest TCI state index in the first TCI state pool. The default TCI state may be a TCI state with the highest TCI state index in the first TCI state pool. The wireless device may select the default TCI state from the first TCI state pool based on a rule. The rule may comprise, for example, a random selection of the default TCI state from the first TCI state pool. The rule may comprise, for example, a selection of the default TCI state from the first TCI state pool based on a priority value. The configuration parameters may indicate a priority value for at least one TCI state (e.g., each TCI state) of the first TCI state pool.

The wireless device may determine the default TCI state as a TCI state with the lowest priority value in the first TCI state pool. The wireless device may determine the default TCI state as a TCI state with the highest priority value in the first TCI state pool. The default TCI state may be the one or more first TCI states (e.g., as described in FIG. 19A) of the first TCI state pool. The wireless device may receive the one or more messages (e.g., one or more messages 2030) indicating the second TCI state pool. The wireless device may receive, based on the default TCI state, the one or more messages indicating the second TCI state pool, for example, as shown in FIG. 19A between time T4 and T5. The wireless device may send (e.g., transmit), based on the second TCI state pool, the one or more uplink signals to the base station, for example, as shown in FIG. 20A at element 2040 between time T6 and T7. The wireless device may receive, based on the second TCI state pool, the one or more downlink signals from the base station, for example, as shown in FIG. 20A between time T6 and T7. The wireless device may send (e.g., transmit), based on the first TCI state pool, the one or more uplink signals to the base station, for example, as shown in FIG. 20A between time T6 and T7. The wireless device may receive, based on the first TCI state pool, the one or more downlink signals from the base station, for example, as shown in FIG. 20A between time T6 and T7. The wireless device may send (e.g., transmit), based on the default TCI state, the one or more uplink signals to the base station, for example, between time T6 and T7. The wireless device may receive, based on the default TCI state, the one or more downlink signals from the base station, for example, between time T6 and T7.

Figure 20B:
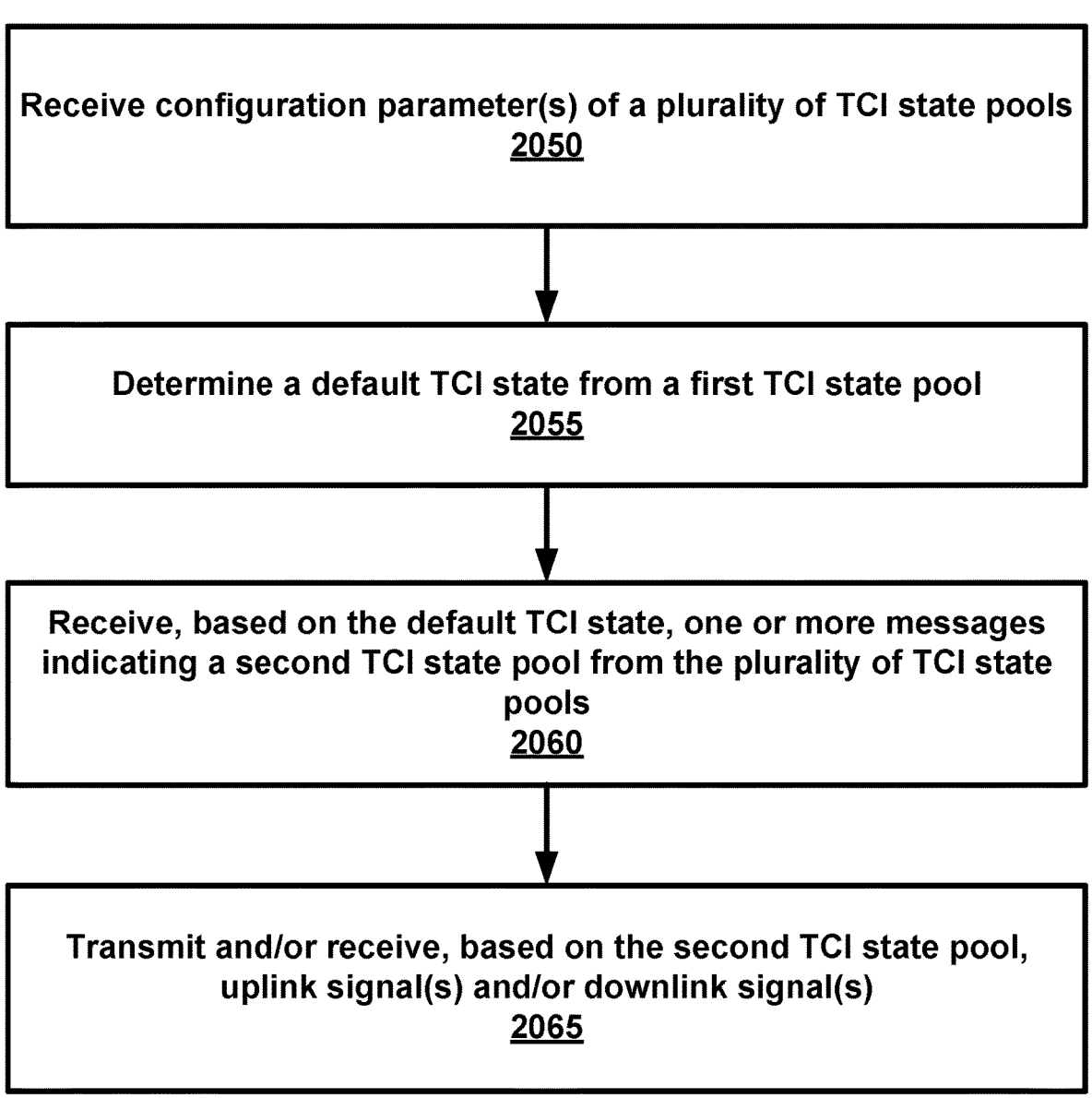
FIG. 20B and FIG. 20C show example methods of determining a default TCI state.
Figure 20C:
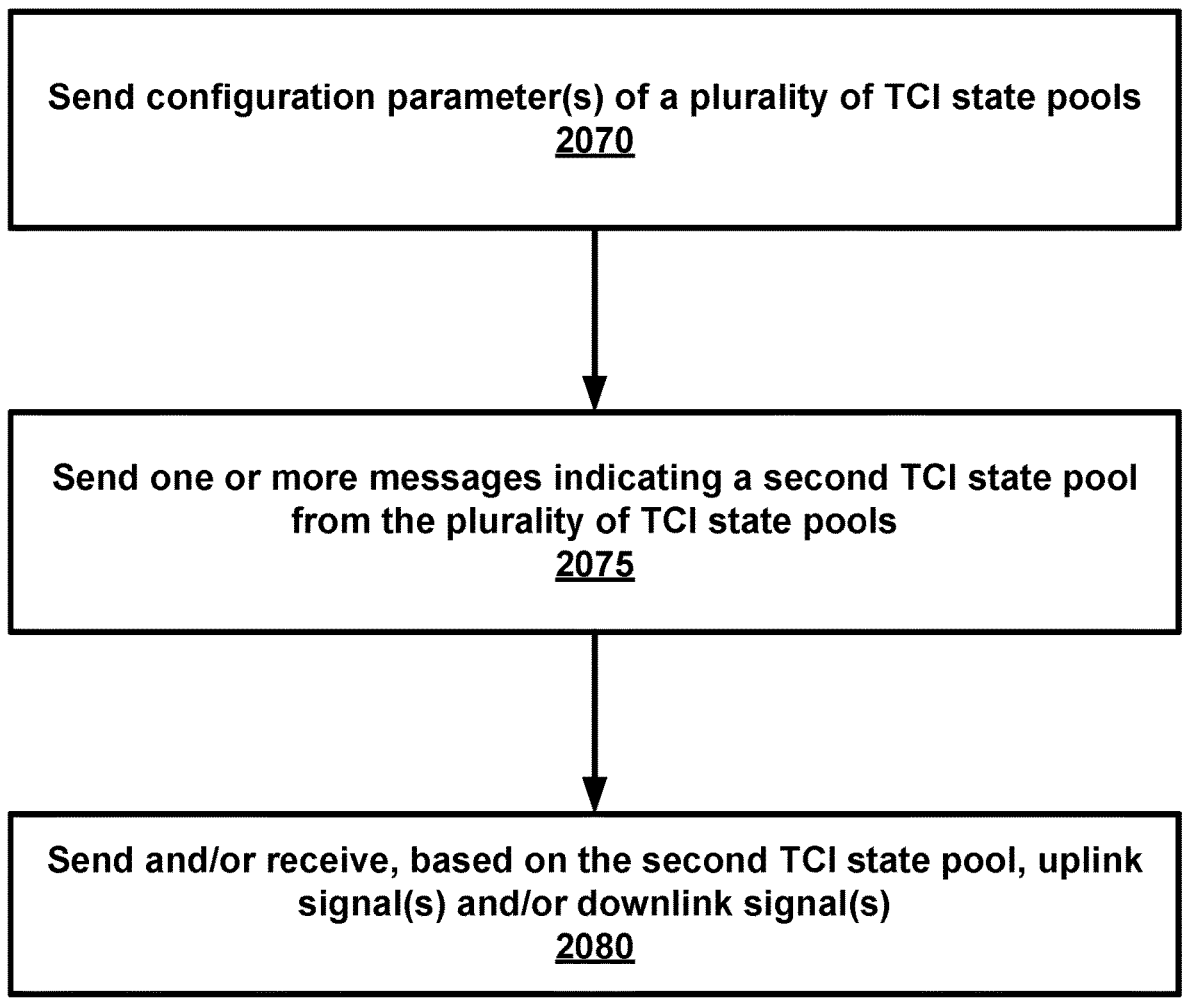

FIG. 20B and FIG. 20C show example methods of determining a default TCI state. A wireless device may receive one or more RRC messages comprising configuration parameters from a base station (e.g., at step 2050 as shown in FIG. 20B). A device (e.g., the base station, a relay, another wireless device, etc.) may send (e.g., transmit) the one or more configuration parameters (e.g., at step 2070 as shown in FIG. 20C). The configuration parameters may indicate a plurality of TCI state pools. A TCI state pool (e.g., each TCI state pool of the plurality of TCI state pools) may comprise one or more TCI states. At least one TCI state pool (e.g., each TCI state pool) of the plurality of TCI state pools may comprise a plurality of TCI states. The wireless device may determine a first TCI state pool from the plurality of TCI state pools. The wireless device may determine, based on the configuration parameters, a first TCI state pool from the plurality of TCI state pools. The wireless device may determine a default TCI state (or an initial TCI state or a starting TCI state) from a first TCI state pool (e.g., at step 2055 as shown in FIG. 20B). The wireless device may determine a default TCI state, for example, from the first TCI state pool from the plurality of TCI state pools. The wireless device may receive one or more messages indicating a second TCI state pool from the plurality of TCI state pools. The wireless device may receive, based on the first TCI state pool, one or more messages indicating a second TCI state pool from the plurality of TCI state pools. The wireless device may receive, based on the default TCI state, one or more messages indicating a second TCI state pool from the plurality of TCI state pools (e.g., at step 2060 as shown in FIG. 20B). The base station may send (e.g., transmit) one or more messages indicating a second TCI state pool from the plurality of TCI state pools. (e.g., at step 2075 as shown in FIG. 20C). The wireless device may send (e.g., transmit) one or more uplink signals. The wireless device may send (e.g., transmit) one or more uplink signals based on the second TCI state pool (e.g., at step 2065 as shown in FIG. 20B). The base station may receive one or more uplink signals based on the second TCI state pool (e.g., at step 2080 as shown in FIG. 20C). The wireless device may receive one or more downlink signals. The wireless device may receive one or more downlink signals based on the second TCI state pool (e.g., at step 2065 as shown in FIG. 20B). The base station may send (e.g., transmit) one or more downlink signals based on the second TCI state pool (e.g., at step 2080 as shown in FIG. 20C).

Figure 21A:
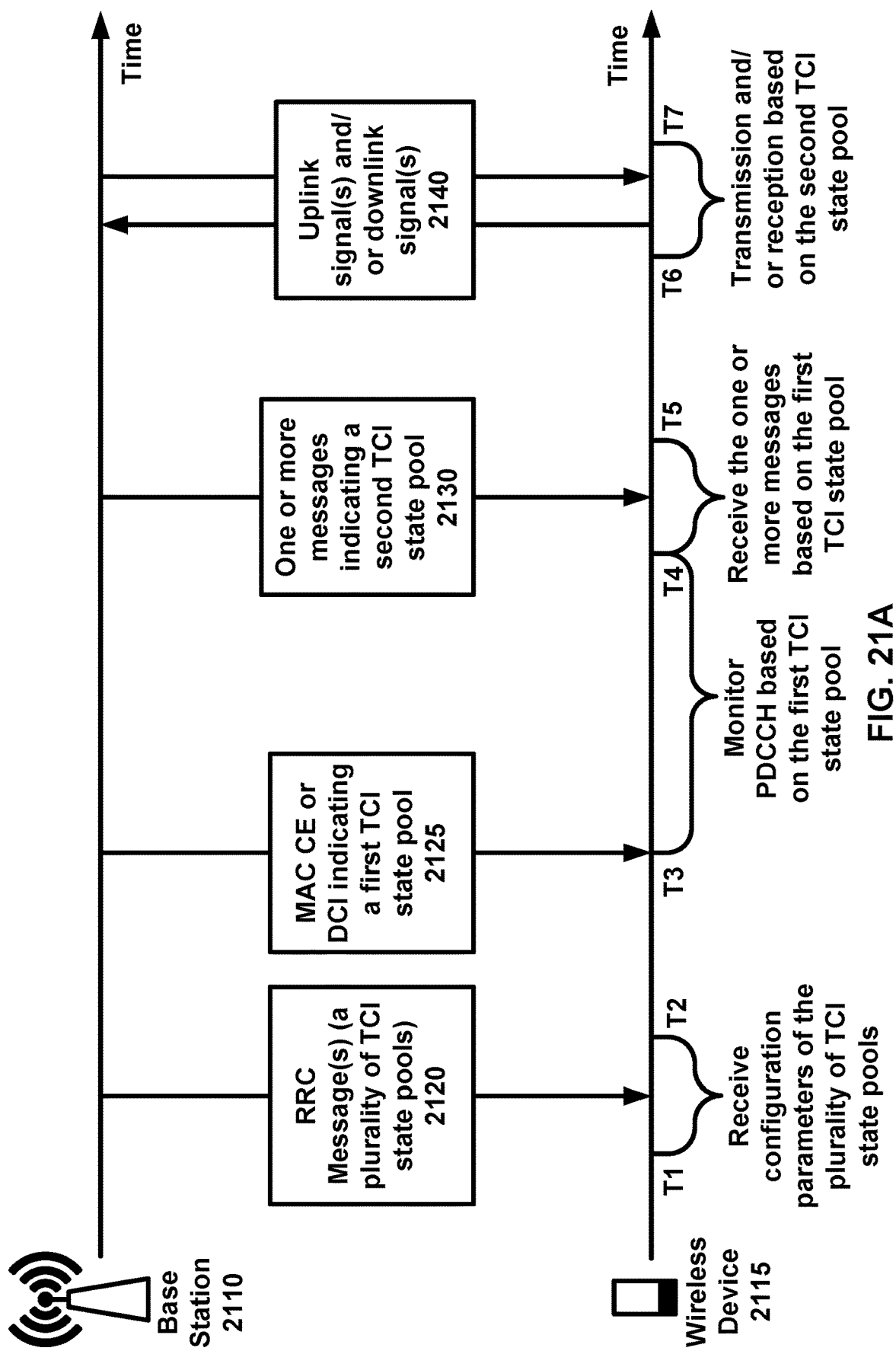
FIG. 21A shows a determination procedure of TCI state pool(s).

FIG. 21A shows a determination procedure of TCI state pool(s). A wireless device (e.g., wireless device 2115) may receive, from a base station (e.g., base station 2110), one or more RRC messages (e.g., one or more RRC messages 2120) comprising configuration parameters (e.g., between time T1 and T2, as shown in FIG. 21A). The base station may send (e.g., transmit), to the wireless device, one or more RRC messages comprising configuration parameters. The configuration parameters may indicate a plurality of TCI state pools. The configuration parameters may indicate a plurality of TCI state pools for a plurality of cells. The plurality of TCI state pools may comprise: one or more joint TCI state pools; one or more DL TCI state pools; and/or one or more UL TCI state pools.

A joint TCI state (e.g., each of the one or more joint TCI states) may be used, by the wireless device, for example, to determine a downlink spatial domain transmission filter of a reception of downlink signals (e.g., PDCCH, PDSCH, and/or CSI-RS). Additionally or alternatively, a joint TCI state (e.g., each of the one or more joint TCI states) may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools and/or one or more downlink (DL) TCI state pools. A UL TCI state pool may comprise one or more UL TCI states. A UL TCI state (e.g., each of the one or more UL TCI states) may be used, by the wireless device, for example, to determine an uplink spatial domain transmission filter of a transmission of uplink signals (e.g., PUCCH, PUSCH, and/or SRS). A DL TCI state pool may comprise, for example, one or more DL TCI states. A DL TCI state (e.g., each of the one or more DL TCI states) may be used, by the wireless device, for example, to determine a downlink spatial domain transmission filter of a reception for downlink signals (e.g., PDCCH, PDSCH, and/or CSI-RS). At least one TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

The wireless device may receive a message (e.g., a MAC CE and/or DCI) indicating a first TCI state pool for a cell. The wireless device may receive a MAC CE or DCI indicating the first TCI state pool, for example, at time T3 as shown in FIG. 21A at element 2125). The base station may send (e.g., transmit), to the wireless device, a MAC CE or DCI indicating the first TCI state pool. The wireless device may determine a downlink beam or a spatial domain filter used for receiving the MAC CE or the DCI. The wireless device may determine a downlink beam or a spatial domain filter used for receiving the MAC CE or the DCI, for example, based on a random access procedure or an initial random access procedure. The wireless device may determine the downlink beam or the spatial domain filter, for example, based on a reference signal received power (RSRP) value of the downlink beam. The wireless device may determine the downlink beam or the spatial domain filter, for example, based on an RSRP value of an RS being equal to or greater than a RSRP threshold. The configuration parameters may indicate the RSRP threshold. The wireless device may determine the downlink beam or the spatial domain filter, for example, during the random access procedure or the initial random access procedure. The DCI, received by the wireless device, may comprise a wireless device dedicated DCI. The DCI, received by the wireless device, may comprise a group common PDCCH. The first TCI state pool may be the default TCI state pool used, by the wireless device, to receive one or more messages indicating the second TCI state pool (e.g., between time T4 and T5, as shown in FIG. 21A at element 2130). The wireless device may monitor PDCCH based on the first TCI state pool, for example, between time T3 and T4, as shown in FIG. 21A. The wireless device may monitor the PDCCH based on the one or more first TCI states of the first TCI state pool (e.g., between time T2 and T3 as shown in FIG. 19A; between time T3 and T4, as shown in FIG. 21A). The default TCI state (e.g., as illustrated in FIG. 20A) may be the one or more first TCI states of the first TCI state pool.

The wireless device may monitor the PDCCH based on the default TCI state of the first TCI state pool. The base station may send (e.g., transmit) one or more messages indicating a second TCI state pool of the plurality of TCI state pools, for example, between time T4 and T5 as shown in FIG. 21A. The wireless device may receive one or more messages (e.g., one or more messages 2130) indicating a second TCI state pool of the plurality of TCI state pools. The wireless device may receive, based on the first TCI state pool, the one or more messages indicating a second TCI state pool of the plurality of TCI state pools, for example, between time T4 and T5, as shown in FIG. 21A. The wireless device may receive, based on the default TCI state of the first TCI state pool, the one or more messages indicating a second TCI state pool of the plurality of TCI state pools (e.g., between time T4 and T5). The wireless device may send (e.g., transmit) one or more uplink signals to the base station (e.g., at element 2140 as shown in FIG. 21A). The wireless device may send (e.g., transmit), based on the second TCI state pool, the one or more uplink signals to the base station (e.g., between time T6 and T7, as shown in FIG. 21A). The base station may receive the one or more uplink signals from the wireless device. The wireless device may send (e.g., transmit), based on the first TCI state pool, the one or more uplink signals to the base station (e.g., between Time T6 and T7, as shown in FIG. 20A). The wireless device may send (e.g., transmit), based on the default TCI state, the one or more uplink signals to the base station (e.g., between time T6 and T7, as shown in FIG. 20A and e.g., between time T6 and T7). The wireless device may receive one or more downlink signals from the base station. The wireless device may receive, based on the second TCI state pool, the one or more downlink signals from the base station (e.g., between time T6 and T7, as shown in FIG. 20A). The base station may send (e.g., transmit) the one or more downlink signals to the wireless device. The wireless device may receive, based on the first TCI state pool, the one or more downlink signals from the base station (e.g., between time T6 and T7, as shown in FIG. 20A). The wireless device may receive, based on the default TCI state, the one or more downlink signals from the base station (e.g., between time T6 and T7, as shown in FIG. 20A).

Figure 21B:
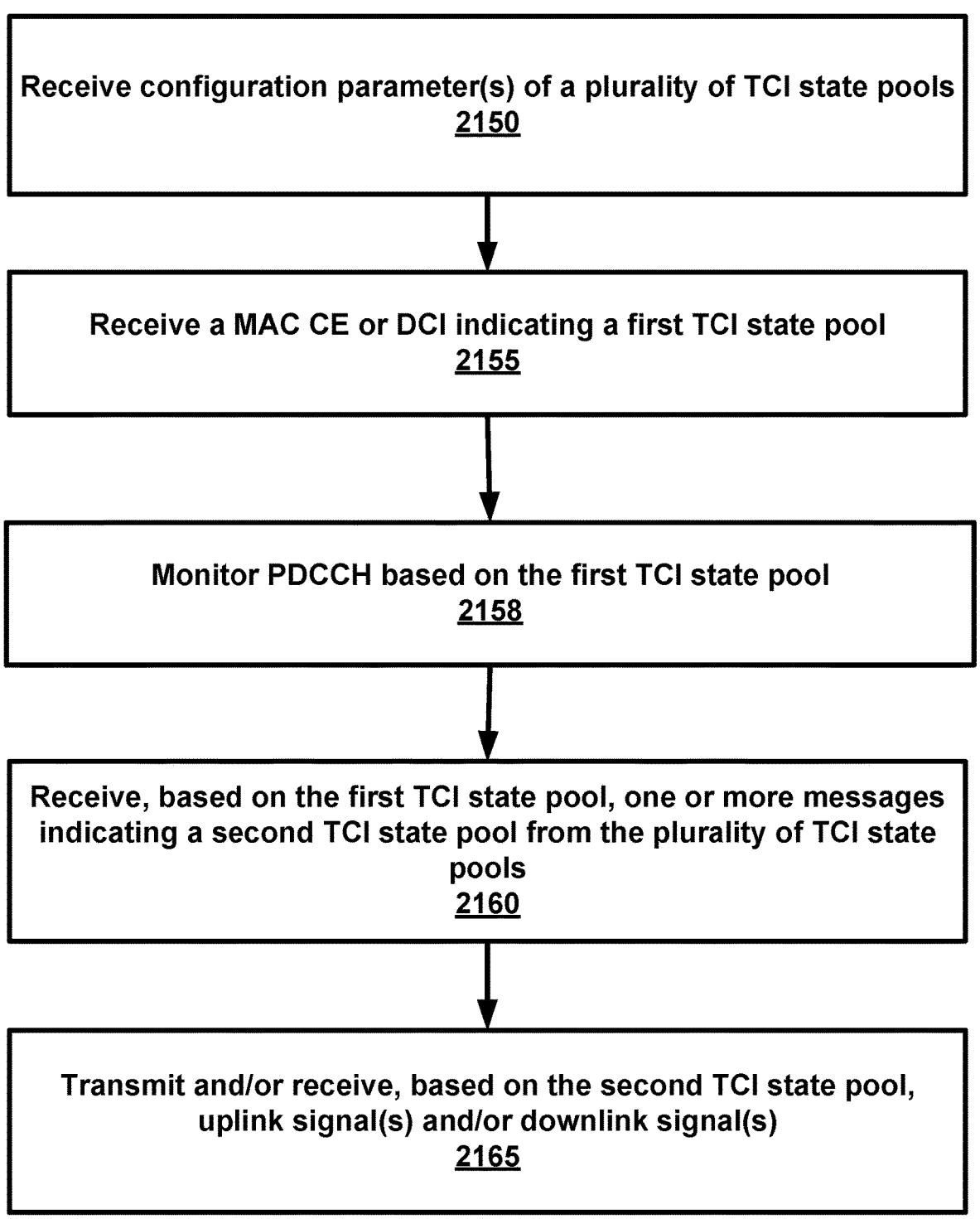
FIG. 21B and FIG. 21C show example methods of determining TCI state pool(s).
Figure 21C:
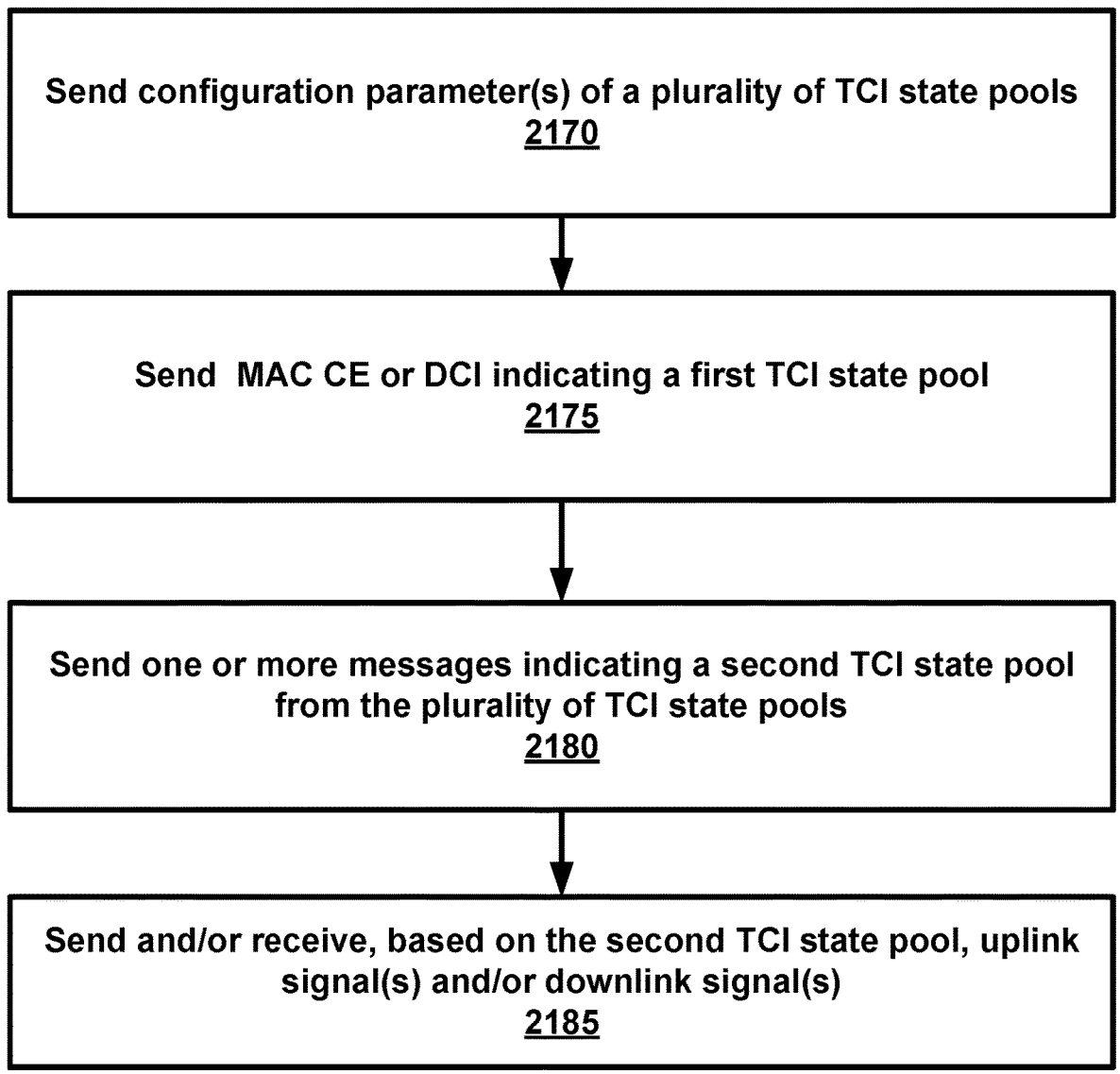

FIG. 21B and FIG. 21C show example methods of determining TCI state pool(s). A wireless device may receive one or more RRC messages comprising configuration parameters from a base station (e.g., at step 2150 as shown in FIG. 21B). A device (e.g., the base station, a relay, another wireless device, etc.) may send (e.g., transmit) the one or more configuration parameters (e.g., at step 2170 as shown in FIG. 21C). The configuration parameters may indicate a plurality of TCI state pools. A TCI state pool (e.g., each of the plurality of TCI state pools) may comprise one or more TCI states. A TCI state pool (e.g., each TCI state of the plurality of TCI state pools) may comprise a plurality of TCI states. The wireless device may determine a first TCI state pool from the plurality of TCI state pools. The base station may send (e.g., transmit) a MAC CE or DCI indicating a first TCI state pool from the plurality of TCI state pools (e.g., at step 2175 as shown in FIG. 21C). The wireless device may receive a MAC CE or DCI indicating the first TCI state pool from the plurality of TCI state pools (e.g., at step 2155 as shown in FIG. 21B). The wireless device may determine, based on receiving a MAC CE or DCI, a first TCI state pool from the plurality of TCI state pools. The wireless device may monitor PDCCH based on the first TCI state pool (e.g., at step 2158 as shown in FIG. 21B). The wireless device may monitor PDCCH based on one or more first TCI states of the first TCI state pool. The wireless device may determine a default TCI state (or an initial TCI state or a starting TCI state) from the first TCI state pool. The wireless device may monitor the PDCCH based on the default TCI state of the first TCI state pool. The base station may send (e.g., transmit) one or more messages indicating a second TCI state pool from the plurality of TCI state pools (e.g., at step 2180 as shown in FIG. 21C). The wireless device may receive one or more messages indicating a second TCI state pool from the plurality of TCI state pools. The wireless device may receive, based on the first TCI state pool, one or more messages indicating a second TCI state pool from the plurality of TCI state pools (e.g., at step 2160 as shown in FIG. 21B). The wireless device may receive, based on the default TCI state, one or more messages indicating a second TCI state pool from the plurality of TCI state pools. The wireless device may send (e.g., transmit) one or more uplink signals. The wireless device may send (e.g., transmit) one or more uplink signals based on the second TCI state pool (e.g., at step 2165 as shown in FIG. 21B). The base station may receive one or more uplink signals based on the second TCI state pool (e.g., at step 2185 as shown in FIG. 21C). The wireless device may receive one or more downlink signals. The wireless device may receive one or more downlink signals based on the second TCI state pool (e.g., at step 2165 as shown in FIG. 21B). The base station may send (e.g., transmit) one or more downlink signals based on the second TCI state pool (e.g., at step 2185 as shown in FIG. 21C).

Figure 22A:
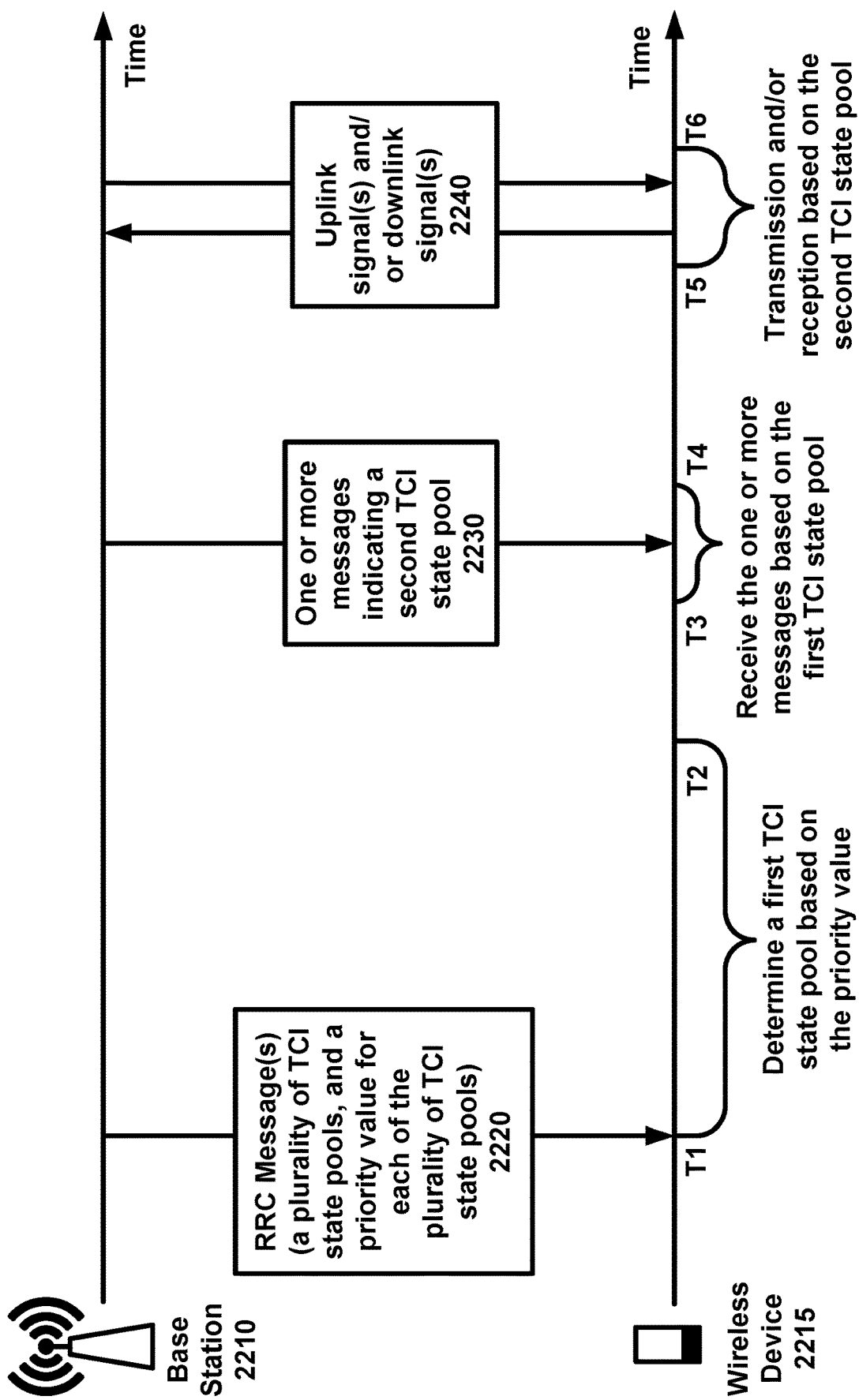
FIG. 22A shows a determination procedure of TCI state pool(s).

FIG. 22A shows a determination procedure of TCI state pool(s). A wireless device (e.g., wireless device 2215) may receive, from a base station (e.g., base station 2210), one or more RRC messages (e.g., one or more RRC messages 2220) comprising configuration parameters (e.g., at time T1, as shown in FIG. 22A). A base station may send (e.g., transmit), to the wireless device, one or more RRC messages comprising configuration parameters. The configuration parameters may indicate a plurality of TCI state pools. The configuration parameters may indicate a plurality of TCI state pools for a plurality of cells. The configuration parameters may indicate a priority value for a TCI state pool. The plurality of TCI state pools may comprise: one or more joint TCI state pools; one or more DL TCI state pools; and/or one or more UL TCI state pools. The configuration parameters may indicate a respective priority value for a TCI state pool (e.g., each of the plurality of TCI state pools).

A joint TCI state (e.g., each of the one or more joint TCI states) may be used, by the wireless device, for example, to determine a downlink spatial domain transmission filter of a reception of downlink signals (e.g., PDCCH, PDSCH, and/or CSI-RS). Additionally or alternatively, a joint TCI state (e.g., each of the one or more joint TCI states) may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools and/or one or more downlink (DL) TCI state pools. A UL TCI state pool may comprise one or more UL TCI states. A UL TCI state (e.g., each of the one or more UL TCI states) may be used, by the wireless device, for example, to determine an uplink spatial domain transmission filter of a transmission of uplink signals (e.g., PUCCH, PUSCH, and/or SRS). A DL TCI state pool may comprise, for example, one or more DL TCI states. A DL TCI state (e.g., each of the one or more DL TCI states) may be used, by the wireless device, for example, to determine a downlink spatial domain transmission filter of a reception for downlink signals (e.g., PDCCH, PDSCH, and/or CSI-RS). At least one TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

The wireless device may determine a first TCI state pool for a cell. The wireless device may determine a first TCI state pool, for example, based on the priority value of the first TCI state pool (e.g., between time T1 and T2 as shown in FIG. 22A). The wireless device may determine the first TCI state pool as a TCI state pool with the lowest priority value in the plurality of TCI state pools. The wireless device may determine the first TCI state pool as a TCI state pool with the highest priority value in the plurality of TCI state pools.

The wireless device may receive one or more messages indicating the second TCI state pool (e.g., as shown in FIG. 22A at element 2230). The base station may send (e.g., transmit) one or more messages indicating the second TCI state pool. The wireless device may receive the one or more messages based on the first TCI state pool (e.g., between time T3 and T4, as shown in FIG. 22A). The base station may receive one or more uplink signals based on the second TCI state pool (e.g., between time T5 and T6 as shown in FIG. 22A at element 2240). The wireless device may send (e.g., transmit) the one or more uplink signals based on the second TCI state pool (e.g., between time T5 and T6 as shown in FIG. 22A). The wireless device may send (e.g., transmit), based on the first TCI state pool, the one or more uplink signals to the base station. The wireless device may send (e.g., transmit), based on one or more TCI states of the first TCI state pool, the one or more uplink signals to the base station. The base station may send (e.g., transmit) one or more downlink signals based on the second TCI state pool (e.g., between time T5 and T6 as shown in FIG. 22A). The wireless device may receive the one or more downlink signals based on the second TCI state pool (e.g., between time T5 and T6 as shown in FIG. 22A). The wireless device may receive, based on the first TCI state pool, the one or more downlink signals from the base station. The wireless device may receive, based on one or more TCI states of the first TCI state pool, the one or more downlink signals from the base station.

Figure 22C:
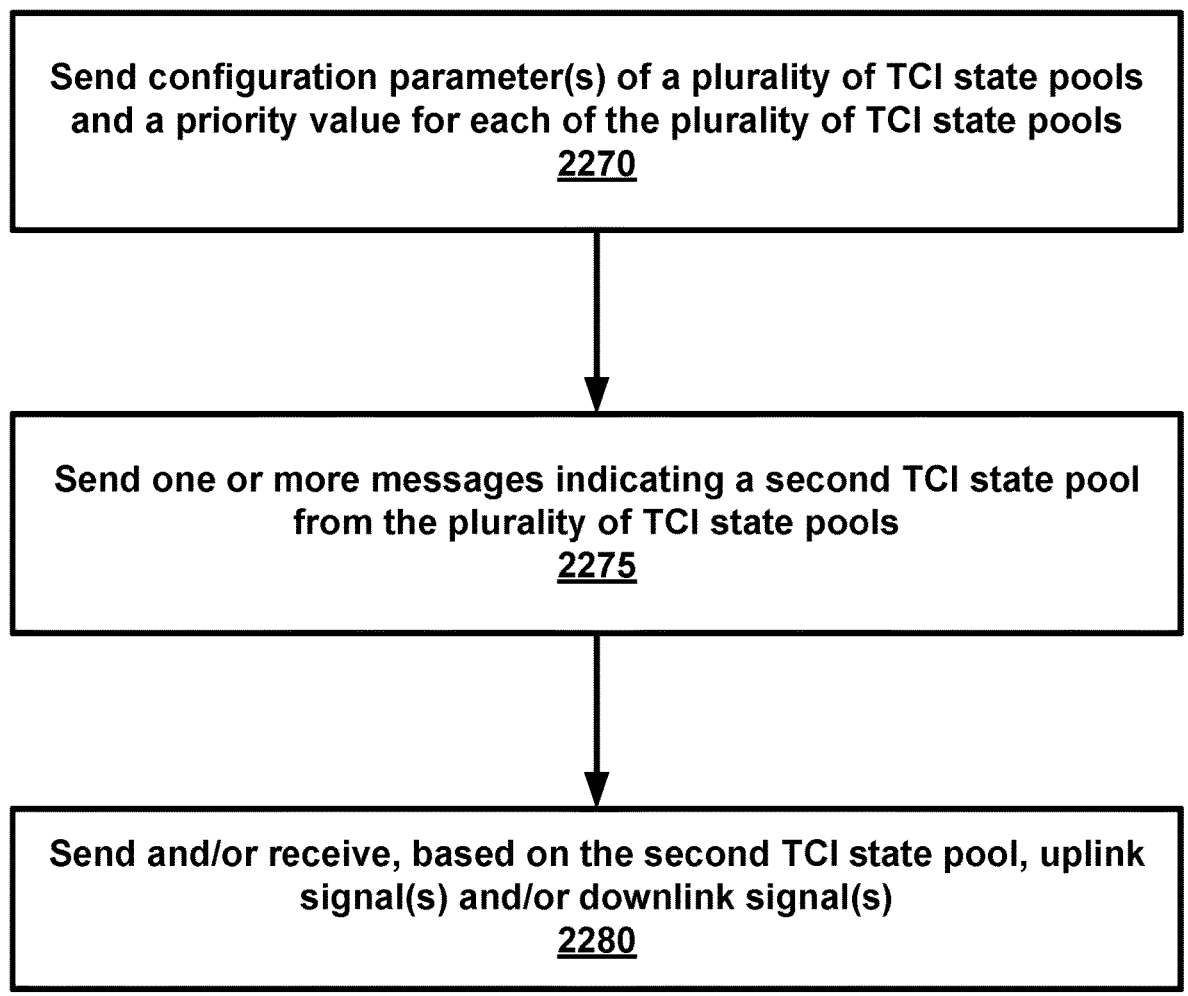

FIG. 22B and FIG. 22C show example methods of determining TCI state pool(s). A wireless device may receive one or more RRC messages comprising configuration parameters from a base station (e.g., at step 1250 as shown in FIG. 22B). A device (e.g., the base station, a relay, another wireless device, etc.) may send (e.g., transmit) the one or more configuration parameters (e.g., at step 2270 as shown in FIG. 22C). The configuration parameters may indicate a plurality of TCI state pools. The configuration parameters may indicate a priority value for a TCI state pool. The configuration parameters may indicate a plurality of TCI state pools and a respective priority value for a TCI state pool (e.g., each of the plurality of TCI state pools). The wireless device may determine a first TCI state pool from the plurality of TCI state pools. The wireless device may determine, based on the configuration parameters, a first TCI state pool from the plurality of TCI state pools. The wireless device may determine a first TCI state pool, from the plurality of TCI state pools, based on the priority value of the first TCI state pool (e.g., at step 2255 as shown in FIG. 22B).

The wireless device may receive one or more messages indicating a second TCI state pool from the plurality of TCI state pools. The wireless device may receive, based on the first TCI state pool, the one or more messages indicating a second TCI state pool from the plurality of TCI state pools (e.g., at step 2260 as shown in FIG. 22B). The base station may send (e.g., transmit) one or more messages indicating a second TCI state pool from the plurality of TCI state pools (e.g., at step 2275 as shown in FIG. 22C). The wireless device may send (e.g., transmit) one or more uplink signals. The wireless device may send (e.g., transmit) one or more uplink signals based on the second TCI state pool (e.g., at step 2265 as shown in FIG. 22B). The base station may receive one or more uplink signals based on the second TCI state pool (e.g., at step 2280 as shown in FIG. 22C). The wireless device may receive one or more downlink signals. The wireless device may receive one or more downlink signals based on the second TCI state pool (e.g., at step 2265 as shown in FIG. 22B). The base station may send (e.g., transmit) one or more downlink signals based on the second TCI state pool (e.g., at step 2280 as shown in FIG. 22C).

Figure 23A:
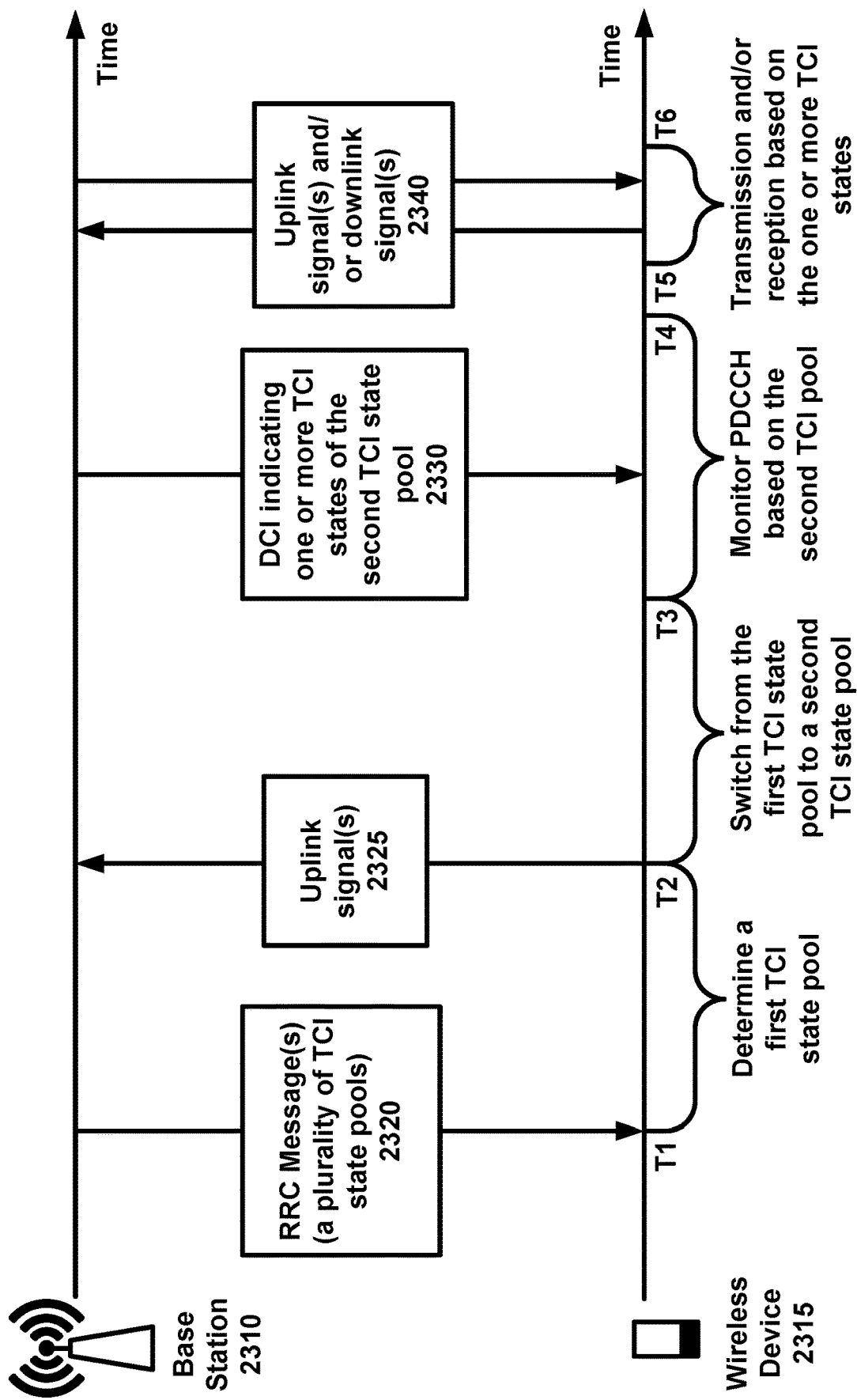
FIG. 23A shows a switching procedure for TCI state pools.

FIG. 23A shows a switching procedure for TCI state pools. A wireless device (e.g., wireless device 2315) may receive, from a base station (e.g., base station 2310), one or more RRC messages (e.g., one or more RRC messages 2320) comprising configuration parameters (e.g., at time T1, as shown in FIG. 23A). The configuration parameters may indicate a plurality of TCI state pools. The configuration parameters may indicate a plurality of TCI state pools for a plurality of cells. The plurality of TCI state pools may comprise: one or more joint TCI state pools; one or more DL TCI state pools; and/or one or more UL TCI state pools.

A joint TCI state (e.g., each of the one or more joint TCI states may be used, by the wireless device, for example, to determine a downlink spatial domain transmission filter of a reception of downlink signals (e.g., PDCCH, PDSCH, and/or CSI-RS). Additionally or alternatively, a joint TCI state (e.g., each of the one or more joint TCI states) may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools and/or one or more downlink (DL) TCI state pools. A UL TCI state pool may comprise one or more UL TCI states. A UL TCI state (e.g. each of the one or more UL TCI states) may be used, by the wireless device, for example, to determine an uplink spatial domain transmission filter of a transmission of uplink signals (e.g., PUCCH, PUSCH, and/or SRS). A DL TCI state pool may comprise, for example, one or more DL TCI states. A DL TCI state (e.g., each of the one or more DL TCI states) may be used, by the wireless device, for example, to determine a downlink spatial domain transmission filter of a reception for downlink signals (e.g., PDCCH, PDSCH, and/or CSI-RS). At least one TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

The wireless device may determine a first TCI state pool, for a cell, from the plurality of TCI state pools for the plurality of cells. The wireless device may determine a first TCI state pool from the plurality of TCI state pools (e.g., as shown in FIG. 19A, FIG. 20A, or FIG. 21A). The wireless device may determine a first TCI state pool from the plurality of TCI state pools, for example, between time T1 and T2, as shown in FIG. 23A. The wireless device may receive one or more messages comprising an RRC message, a MAC CE and/or DCI (e.g., as shown in FIG. 19A, FIG. 20A, or FIG. 21A) indicating the first TCI state pool. The wireless device may determine the first TCI state pool based on the one or more messages. The first TCI state pool may be a joint TCI state pool of the plurality of TCI state pools. The first TCI state pool may be a separate TCI state pool of the plurality of TCI state pools. The separate TCI state pool may comprise, for example, a downlink (DL) TCI state pool and/or an uplink (UL) TCI state pool.

The wireless device may send (e.g., transmit) one or more uplink signals (e.g., uplink signals 2325) to the base station (e.g., at time T2 as shown in FIG. 23A). The base station may receive one or more uplink signals from the wireless device. The one or more uplink signals may comprise PUSCH, PUCCH, PRACH, and/or an SRS. The one or more uplink signals may comprise a MAC CE via PUSCH. The one or more uplink signals may comprise a channel state information (CSI) report via PUSCH or PUCCH. The one or more uplink signals may comprise a scheduling request via PUCCH. The one or more uplink signals may comprise a preamble via PRACH. The one or more uplink signals may comprise an indication of transmission power reduction of the wireless device via PUSCH. The indication of transmission power reduction of the wireless device may be a power headroom report (PHR) MAC CE via PUSCH. The one or more uplink signals may comprise maximum permissible exposure (MPE) indication of the wireless device via PUSCH. The MPE indication may comprise a MPE issue happening indication. The MPE indication may comprise a MPE issue recovery indication. The MPE issue recovery may comprise a status of the MPE issue not existing for the wireless device. The wireless device may switch from the first TCI state pool to a second TCI state pool of the plurality TCI state pools. The wireless device may switch from the first TCI state pool to a second TCI state pool of the plurality TCI state pools, for example, between time T2 and T3 as shown in FIG. 23A. The first TCI state pool may be a joint TCI state pool. The second TCI state pool may be a separate TCI state pool comprising a DL TCI state pool and/or a UL TCI state pool. The first TCI state pool may be a separate TCI state pool comprising a DL TCI state pool and/or a UL TCI state pool. The second TCI state pool may be a joint TCI state pool. The switching from the first TCI state pool to the second TCI state pool may comprise a switching from a joint TCI state pool to a separate TCI state pool. The switching from the first TCI state pool to the second TCI state pool may comprise a switching from a separate TCI state pool to a joint TCI state pool.

The switching from the first TCI state pool to the second TCI state pool may comprise a switching from a first joint TCI state pool to a second joint TCI state pool. The switching from the first TCI state pool to the second TCI state pool may comprise a switching from a first separate TCI state pool to a second separate TCI state pool. The wireless device may switch from the first TCI state pool to the second TCI state pool based on (e.g., in response to) the sending (e.g., transmitting) the one or more uplink signals. The wireless device may monitor PDCCH based on the second TCI state pool (e.g., between time T3 and T4, as shown in FIG. 23A). The wireless device may monitor PDCCH based on the first TCI state pool. The wireless device may monitor PDCCH based on one or more TCI states of the second TCI state pool (or the first TCI state pool), for example, between time T3 and T4. The wireless device may monitor PDCCH based on one or more TCI states of the first TCI state pool. The wireless device may receive, from the base station, DCI (e.g., DCI 2330) indicating one or more TCI states. The wireless device may receive, from the base station, DCI indicating one or more TCI states of the second TCI state pool (e.g., between time T3 and T4, as shown in FIG. 23A. The base station may send (e.g., transmit), to the wireless device, DCI indicating the one or more TCI states. The wireless device may send (e.g., transmit) one or more uplink signals (e.g., as shown in FIG. 23A at element 2340) based on the one or more TCI states of the second TCI state pool (e.g., between time T5 and T6). The wireless device may receive the one or more downlink signals (e.g., as shown in FIG. 23A) based on the one or more TCI states of the second TCI state pool (e.g., between time T5 and T6). The base station may send (e.g., transmit) the one or more downlink signals based on the one or more TCI states of the second TCI state pool. The base station may receive the one or more uplink signals based on the one or more TCI states of the second TCI state pool.

Figure 23C:
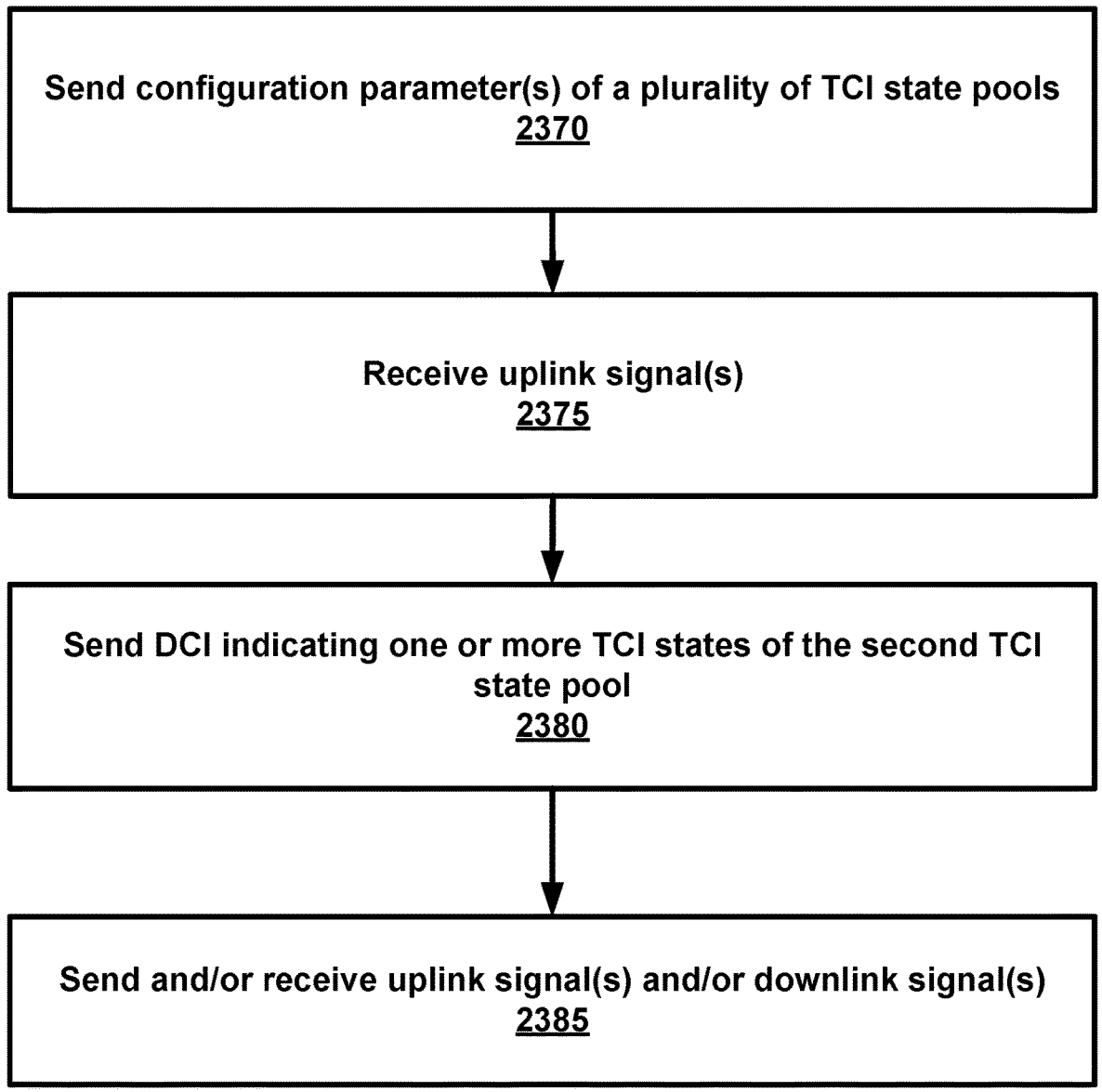

FIG. 23B and FIG. 23C show example methods of switching procedures for TCI state pools. A wireless device may receive one or more RRC messages comprising configuration parameters from a base station (e.g., at step 2350 as shown in FIG. 23B). A device (e.g., the base station, a relay, another wireless device, etc.) may send (e.g., transmit) the one or more configuration parameters (e.g., at step 2370 as shown in FIG. 23C). The configuration parameters may indicate a plurality of TCI state pools. A TCI state pool (e.g., each of the plurality of TCI state pools) may comprise one or more TCI states. At least one TCI state pool (e.g., each TCI state pool) may comprise a plurality of TCI states. The wireless device may determine a first TCI state pool from the plurality of TCI state pools (e.g., at step 2352 as shown in FIG. 23B). The wireless device may determine a first TCI state pool from the plurality of TCI state pools, for example, as shown in FIG. 19A, FIG. 20A, and FIG. 22A. The wireless device may send (e.g., transmit) one or more uplink signals to the base station (e.g., at step 2354 as shown in FIG. 23B). The base station may receive one or more uplink signals from the wireless device (e.g., at step 2375 as shown in FIG. 23C). The wireless device may switch from the first TCI state pool to a second TCI state pool of the plurality TCI state pools (e.g., at step 2356 as shown in FIG. 23B). The wireless device may switch from the first TCI state pool to the second TCI state pool based on the sending (e.g., transmitting) the one or more uplink signals.

The wireless device may monitor PDCCH based on the second TCI state pool (e.g., at step 2358 as shown in FIG. 23B). The wireless device may monitor PDCCH based on one or more TCI states of the second TCI state pool. The base station may send (e.g., transmit), to the wireless device, DCI indicating one or more TCI states of the second TCI state pool (e.g., at step 2380 as shown in FIG. 23C). The wireless device may receive, from the base station, DCI indicating one or more TCI states of the second TCI state pool (e.g., at step 2360 as shown in FIG. 23B). The wireless device may send (e.g., transmit) one or more uplink signals based on the one or more TCI states (e.g., at step 2365 as shown in FIG. 23B). The wireless device may send (e.g., transmit) one or more uplink signals based on the one or more TCI states of the second TCI state pool. The base station may receive one or more uplink signals from the wireless device (e.g., at step 2385 as shown in FIG. 23C). The base station may receive the one or more uplink signals based on the second TCI state pool. The base station may receive the one or more uplink signals based on the one or more TCI states of second TCI state pool. The wireless device may receive one or more downlink signals based on the one or more TCI states (e.g., at step 2365 as shown in FIG. 23B). The wireless device may receive, from the base station, the one or more downlink signals based on the one or more TCI states of the second TCI state pool. The base station may send (e.g., transmit) one or more downlink signals (e.g., at step 2385 as shown in FIG. 23C). The base station may send (e.g., transmit) one or more downlink signals based on the second TCI state pool.

Figure 24A:
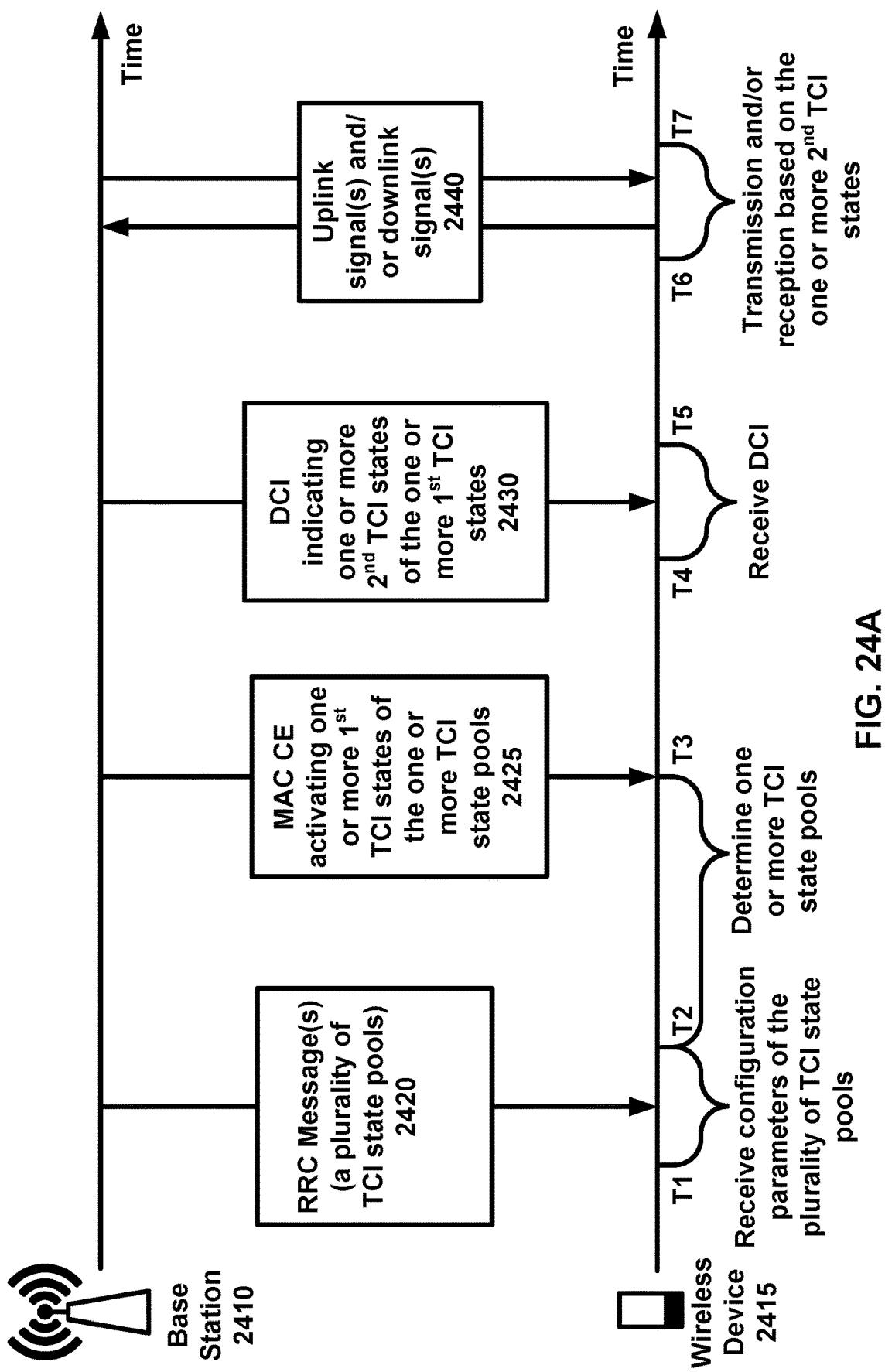
FIG. 24A shows an activation procedure for one or more TCI states.

FIG. 24A shows an activation procedure for one or more TCI states. A wireless device (e.g., wireless device 2415) may receive, from a base station (e.g., base station 2410), one or more RRC messages (e.g., one or more RRC messages 2420) comprising configuration parameters (e.g., between time T1 and T2, as shown in FIG. 24A). The configuration parameters may indicate a plurality of TCI state pools. The configuration parameters may indicate a plurality of TCI state pools for a plurality of cells. The plurality of TCI state pools may comprise: one or more joint TCI state pools; one or more DL TCI state pools; and/or one or more UL TCI state pools.

A joint TCI state (e.g., each of the one or more joint TCI states) may be used, by the wireless device, for example, to determine a downlink spatial domain transmission filter of a reception of downlink signals (e.g., PDCCH, PDSCH, and/or CSI-RS). Additionally or alternatively, a joint TCI state (e.g., each of the one or more joint TCI states) may be used, by a wireless device, for example, to determine an uplink spatial domain transmission filter of a transmission of uplink signals (e.g., PUCCH, PUSCH, and/or SRS). The separate TCI state pools may comprise one or more uplink (UL) TCI state pools and/or one or more downlink (DL) TCI state pools. A UL TCI state pool may comprise one or more UL TCI states. A UL TCI state (e.g., each of the one or more UL TCI states) may be used, by the wireless device, for example, to determine an uplink spatial domain transmission filter of a transmission of uplink signals (e.g., PUCCH, PUSCH, and/or SRS). A DL TCI state pool may comprise, for example, one or more DL TCI states. A DL TCI state pool (e.g., each of the one or more DL TCI states) may be used, by the wireless device, for example, to determine a downlink spatial domain transmission filter of a reception for downlink signals (e.g., PDCCH, PDSCH, and/or CSI-RS). At least one TCI state (e.g., each TCI state) of the joint TCI state pool may be used, for example, for the receptions, by the wireless device, via PDCCH, PDSCH, and/or CSI-RS. At least one TCI state (e.g., each TCI state) of the joint TCI state pool may be used, for example, for the transmissions via PUCCH, PUSCH, PRACH, and/or sounding channel (e.g., SRS transmission). At least one TCI state (e.g., each TCI state) of the DL TCI state pool may be used, for example, for the receptions, by the wireless device, via PDCCH, PDSCH, and/or CSI-RS. At least one TCI state (e.g., each TCI state) of the UL TCI state pool may be used, for example, for the transmissions, by the wireless device, via PUCCH, PUSCH, PRACH, and/or sounding channel (e.g., SRS transmission).

The wireless device may determine one or more TCI state pools of the plurality of TCI state pools (e.g., between time T2 and T3, as shown on FIG. 24A). The wireless device may determine one or more TCI state pools, for one or more cells, of the plurality of TCI state pools for the plurality of cells. The one or more TCI state pools may be active TCI state pools of the plurality of TCI state pools. The configuration parameters may indicate (and/or may enable) the one or more TCI state pools. The wireless device may receive a MAC CE (e.g., MAC CE 2425) activating one or more first TCI states of the one or more TCI state pools of the plurality of TCI state pools (e.g., at time T3, as shown in FIG. 24A). The base station may send (e.g., transmit) a MAC CE activating one or more first TCI states of the one or more TCI state pools. The MAC CE may activate (and/or may enable) the one or more TCI state pools of the plurality of TCI state pools. A second MAC CE may activate (and/or may enable) the one or more TCI state pools. The second MAC CE may be different from the MAC CE. The wireless device may send (e.g., transmit) the one or more uplink signals (e.g., as shown in FIG. 24A at element 2440) based on the one or more second TCI states (e.g., between time T6 and T7). The wireless device may receive the one or more downlink signals (e.g., as shown in FIG. 24A) based on the one or more second TCI states (e.g., between time T6 and T7). The base station may send (e.g., transmit) the one or more downlink signals (e.g., between time T6 and T7). The base station may receive the one or more uplink signals (e.g., between time T6 and T7).

Figure 24B:
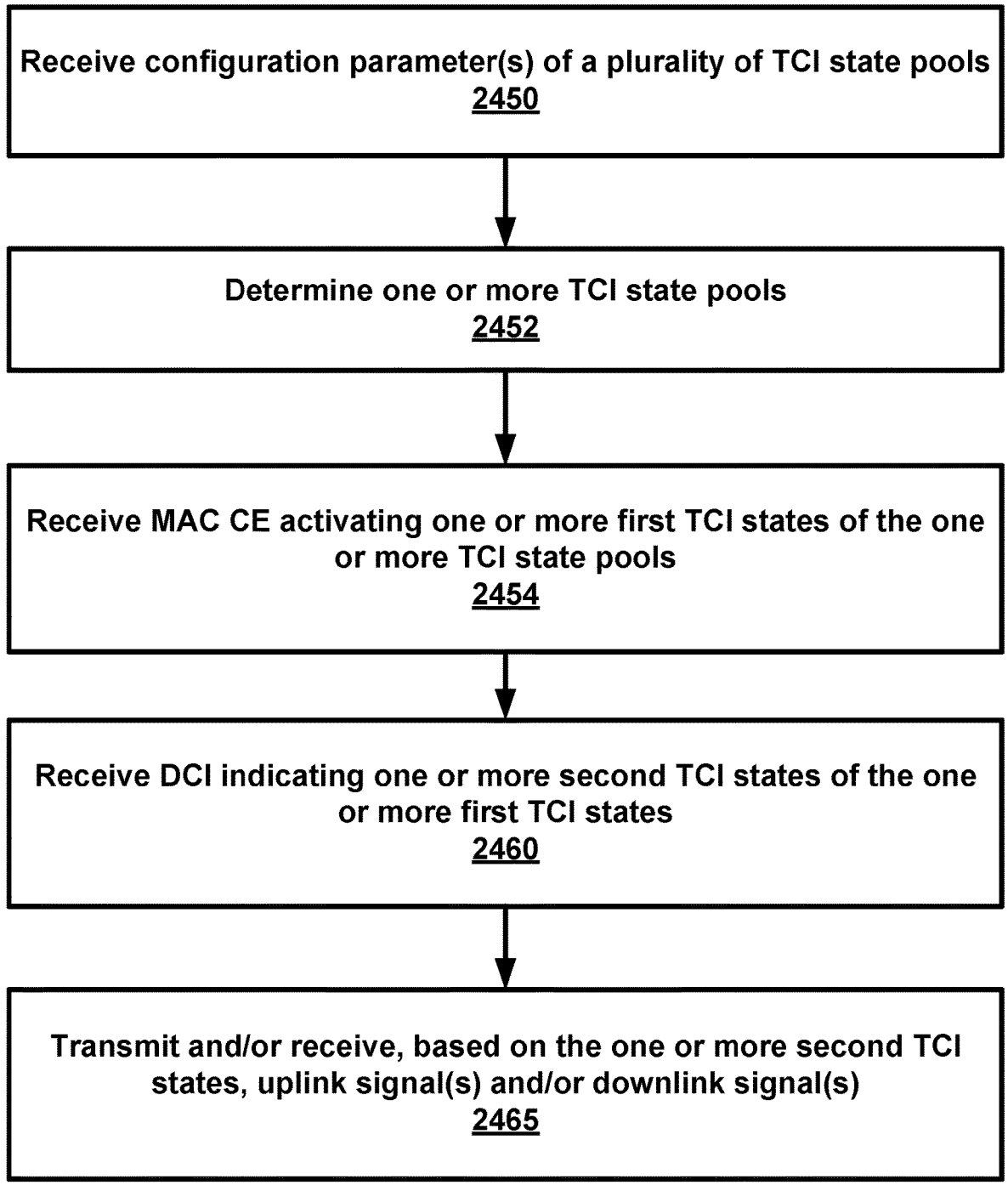
FIG. 24B and FIG. 24C show example methods of activation procedures for one or more TCI states.
Figure 24C:
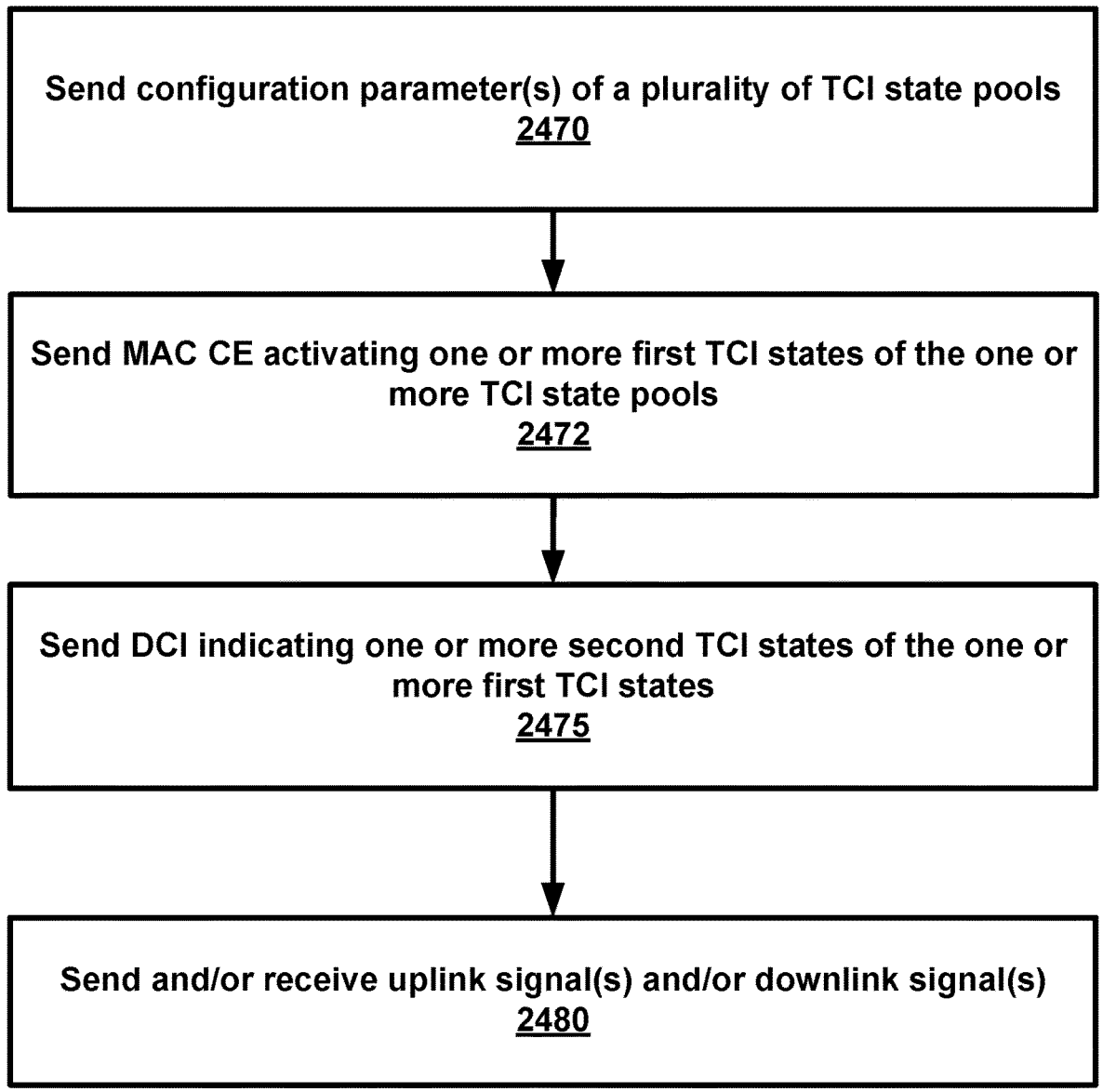

FIG. 24B and FIG. 24C show example methods of activation procedures for one or more TCI states. A wireless device may receive one or more RRC messages comprising configuration parameters from a base station (e.g., at step 2450 as shown in FIG. 24B). A device (e.g., the base station, a relay, another wireless device, etc.) may send (e.g., transmit) the one or more configuration parameters (e.g., at step 2470 as shown in FIG. 24C). The configuration parameters may indicate a plurality of TCI state pools. A TCI state pool (e.g., each of the plurality of TCI state pools) may comprise one or more TCI states. The wireless device may determine one or more TCI state pools from the plurality of TCI state pools (e.g., at step 2452 as shown in FIG. 24B). The one or more TCI state pools may be active TCI state pools of the plurality of TCI state pools. The configuration parameters may indicate (and/or may enable) the one or more TCI state pools. The base station may send (e.g., transmit) a MAC CE activating one or more first TCI states of the one or more TCI state pools (e.g., at step 2472 as shown in FIG. 24C). The wireless device may receive a MAC CE activating one or more first TCI states of the one or more TCI state pools (e.g., at step 2454 as shown in FIG. 24B).

The base station may send (e.g., transmit) DCI indicating one or more second TCI states of the one or more first TCI states (e.g., at step 2475 as shown in FIG. 21C). The wireless device may receive DCI indicating one or more second TCI states of the one or more first TCI states (e.g., at step 2460 as shown in FIG. 24B). The DCI may indicate (or activate or enable) the one or more TCI state pools of the plurality of TCI state pools. The wireless device may send (e.g., transmit) one or more uplink signals. The wireless device may send (e.g., transmit) one or more uplink signals based on the one or more second TCI states (e.g., at step 2465 as shown in FIG. 24B). The base station may receive one or more uplink signals based on the one or more second TCI states (e.g., at step 2480 as shown in FIG. 24C). The wireless device may receive one or more downlink signals. The wireless device may receive one or more downlink signals based on the one or more second TCI states (e.g., at step 2465 as shown in FIG. 24B). The base station may send (e.g., transmit) one or more downlink signals based on the one or more second TCI states (e.g., at step 2480 as shown in FIG. 24C).

Figure 25:
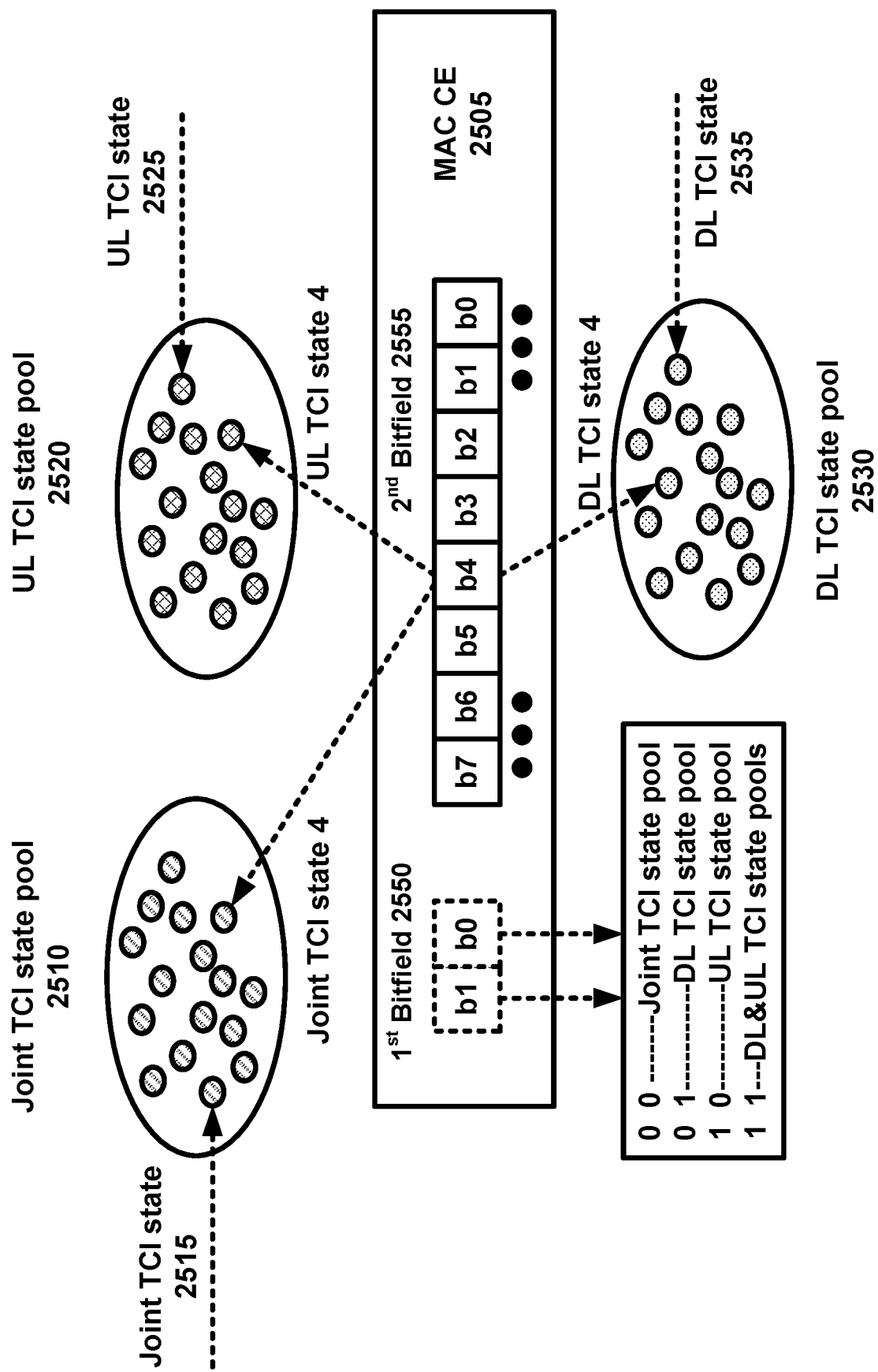
FIG. 25 shows an example MAC CE structure for TCI state activation.

FIG. 25 shows an example MAC CE structure for TCI state activation. A MAC CE (e.g., MAC CE 2505) may be the MAC CE activating the one or more first TCI states, for example, as shown in FIG. 24A at time T3. The MAC CE may comprise: a first bit field (e.g., bit field 2550); and/or a second bitfield (e.g., bit field 2555). The first bitfield may indicate one or more TCI state pools of the plurality of TCI state pools. The first bitfield may activate (and/or may enable) one or more TCI state pools of the plurality of TCI state pools (e.g., as described concerning FIG. 24A). The first bitfield may comprise two bits (e.g., bit b1 and bit b0). The first bitfield may indicate a joint TCI state pool (e.g., joint TCI state pool 2510) of the plurality of TCI state pools, for example, based on (e.g., in response to) the first bitfield being set to 00. The first bitfield may be set to 00 by setting bit b1 to "0" and setting bit b0 to "0." The first bitfield may activate (and/or may enable) a joint TCI state pool, of the plurality of TCI state pools, based on (e.g., in response to) the first bitfield being set to 00. The first bitfield may indicate (and/or may activate or may enable) a downlink (DL) TCI state pool (e.g., DL TCI state pool 2530) of the plurality of TCI state pools, for example, based on (e.g., in response to) the first bitfield being set to 01. The first bitfield may be set to 01 by setting bit b1 to "0" and setting bit b0 to "1." The first bitfield may indicate (or may activate or may enable) an uplink (UL) TCI state pool (e.g., UL TCI state pool 2520) of the plurality of TCI state pools, for example, based on (e.g., in response to) the first bitfield being set to 10. The first bitfield may be set to 10 by setting bit b1 to "1" and setting bit b0 to "0." The first bitfield may indicate (or may activate or may enable) a DL TCI state pool and a UL TCI state pool of the plurality of TCI state pools, for example, based on (e.g., in response to) the first bitfield being set to 11. The first bitfield may be set to 11 by setting bit b1 to "1" and setting bit b0 to "1." The configuration parameters may activate (and/or may enable) the one or more TCI state pools of the plurality of TCI state pools.

The second bitfield may comprise eight bits (e.g., b0, b1, b2, b3, b4, b5, b6, and b7). The second bitfield may activate the one or more first TCI states, of the one or more TCI state pools, activated by (and/or enabled by) the MAC CE or the configuration parameters (e.g., as shown in FIG. 24A at time T3). At least one bit of the second bitfield (e.g., each bit of the second bitfield) may be associated with a quantity of TCI states. The wireless device may determine the quantity of TCI states based on a quantity of the one or more TCI state pools activated by (and/or enabled by) the MAC CE or the configuration parameters. At least one bit of the second bitfield (e.g., each bit of the second bitfield) may be associated with: a joint TCI state (e.g., joint TCI state 2515) of a joint TCI state pool, a UL TCI state (e.g., UL TCI state 2525) of a UL TCI state pool, and a DL TCI state (e.g., DL TCI state 2535) of a DL TCI state pool. At least one bit of the second bitfield (e.g., each bit of the second bitfield) may be associated with: a joint TCI state, a UL TCI state, and a DL TCI state for example, if the joint TCI state pool, the UL TCI state pool and the DL TCI state pool are activated by (and/or enabled by) the MAC CE or the configuration parameters. As shown in FIG. 25, bit b4, for example, may be associated with joint TCI state 4, UL TCI state 4, and DL TCI state 4. The joint TCI state, the UL TCI state, and the DL TCI state may be deactivated. The joint TCI state, the UL TCI state, and the DL TCI state may be deactivated, for example, if the bit (e.g., the bit associated with the joint TCI state, the UL TCI state, and the DL TCI state) is set to zero Referring to FIG. 25, the joint TCI state 4, the UL TCI state 4, and the DL TCI state 4 may be deactivated, for example, if bit b4 is set to zero. The joint TCI state, the UL TCI state, and the DL TCI state may be activated. The joint TCI state, the UL TCI state, and the DL TCI state may be activated, for example, if the bit (e.g., the bit associated with the joint TCI state, the UL TCI state, and the DL TCI state) is set to one. Referring to FIG. 25, the joint TCI state 4, UL TCI state 4, and DL TCI state 4 may be activated, for example, if bit b4 is set to one.

At least one bit of the second bitfield (e.g., each bit of the second bitfield) may be associated with: a UL TCI state of a UL TCI state pool, and a DL TCI state of a DL TCI state pool, for example, if the UL TCI state pool and the DL TCI state pool are activated by (and/or enabled by) the MAC CE or the configuration parameters. Referring to FIG. 25, bit b4 may be associated with UL TCI state 4 and DL TCI state 4. The UL TCI state and the DL TCI state may be deactivated, for example, if the bit (e.g., the bit associated with the UL TCI state and the DL TCI state) is set to zero. Referring to FIG. 25, the UL TCI state 4 and DL TCI state 4 may be deactivated, for example, if b4 is set to zero. The UL TCI state and the DL TCI state may be activated, for example if the bit (e.g., the bit associated with the UL TCI state and the DL TCI state) is set to one. Referring to FIG. 25, the UL TCI state 4 and DL TCI state 4 may be activated, for example, if b4 is set to one.

At least one bit of the second bitfield (e.g., each bit of the second bitfield) may be associated with one TCI state from a TCI state pool activated (and/or enabled) by the MAC CE or the configuration parameters. At least one bit of the second bitfield (e.g., each bit of the second bitfield) may be associated with one TCI state from a TCI state pool activated (and/or enabled) by the MAC CE or the configuration parameters, for example, if one of a joint TCI state pool, a UL TCI state pool and/or a DL TCI state pool is activated by (and/or enabled by) the MAC CE or the configuration parameters. A joint TCI state of a joint TCI state pool, a UL TCI state of a UL TCI state pool, or a DL TCI state of a DL TCI state pool may be associated with a bit, for example, if one of the joint TCI state pool, the UL TCI state pool and/or the DL TCI state pool is activated by (and/or enabled by) the MAC CE or the configuration parameters. The one TCI state, associated with the bit, may be deactivated, for example, if the bit (e.g., the bit associated with the one TCI state) is set to zero. The one TCI state, associated with the bit, may be activated, for example, if the bit (e.g., the bit associated with the one TCI state) is set to one.

The MAC CE or the configuration parameters may activate (and/or enable), for example, multiple TCI state pools of the plurality of TCI state pools. The first bitfield of the DCI (e.g., the DCI 2430 as shown in FIG. 24A) may indicate one of the multiple TCI state pools activated by the MAC CE or the configuration parameters. A codepoint of the second bitfield, of the DCI, may indicate one or more second TCI states of one or more first TCI states, activated by the MAC CE, of the one TCI state pool of the multiple TCI state pools. The wireless device may send (e.g., transmit) the one or more uplink signals (e.g., as shown in FIG. 19A, FIG. 23A, FIG. 24A) based on the one or more second TCI states. The wireless device may receive the one or more downlink signals (e.g., as shown in FIG. 19A, FIG. 23A, FIG. 24A) based on the one or more second TCI states.

The MAC CE or the configuration parameters may activate (and/or enable) multiple TCI state pools of the plurality of TCI state pools. A codepoint of the second bitfield of the DCI may indicate multiple second TCI states of one or more first TCI states. For example, each codepoint of the second bitfield of the DCI (e.g., the DCI 2430 as shown in FIG. 24A) may indicate multiple second TCI states of one or more first TCI states, activated by the MAC CE, of the multiple TCI state pools. A second TCI state (e.g., Each of the multiple second TCI states) may be from a respective TCI state pool of the multiple TCI state pools. A second TCI state (e.g., each of the multiple second TCI states) may have a same TCI state index from the respective TCI state pool of the multiple TCI state pools. The wireless device may send (e.g., transmit) the one or more uplink signals (e.g., as shown in FIG. 19A, FIG. 23A, FIG. 24A) based on the multiple second TCI states. The wireless device may receive the one or more downlink signals (e.g., as shown in FIG. 19A, FIG. 23A, FIG. 24A) based on the multiple second TCI states.

Figure 26:
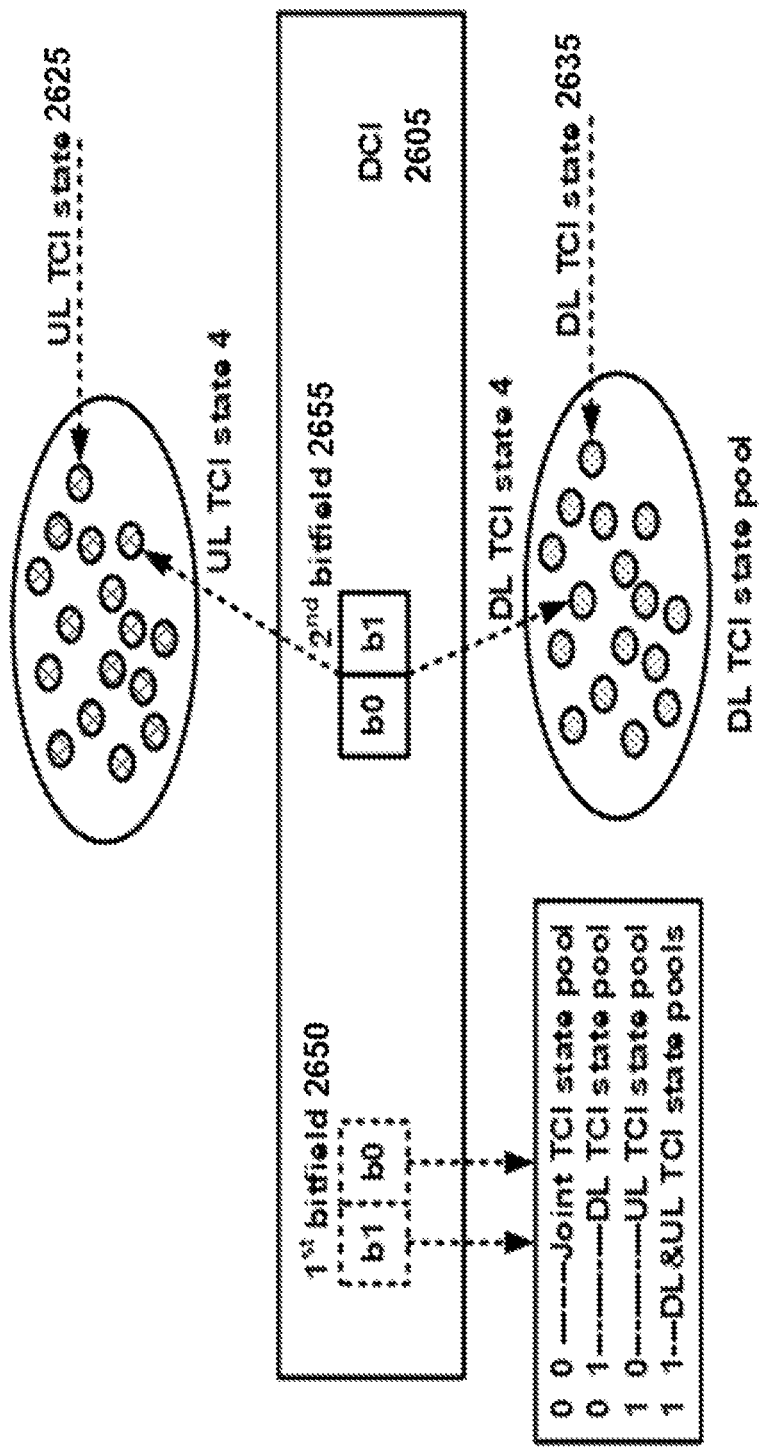
FIG. 26 shows an example DCI structure for TCI state indication.

FIG. 26 shows an example DCI structure for TCI state indication. A wireless device may receive DCI (e.g., DCI 2605) indicating one or more second TCI states of one or more first TCI states associated with one or more TCI state pools. As described with respect to FIG. 24A, the wireless device may receive DCI (e.g., DCI 2430) indicating one or more second TCI states of the one or more first TCI states (e.g., between time T4 and T5, as shown in FIG. 24A). As shown in FIG. 24A, the base station may send (e.g., transmit) DCI indicating one or more second TCI states of the one or more first TCI states. Referring to FIG. 26, the DCI (e.g., DCI 2605) may indicate the one or more TCI state pools of the plurality of TCI state pools. The DCI may activate (and/or enable) the one or more TCI state pools of the plurality of TCI state pools. The DCI may indicate one TCI state pool of the one or more TCI state pools of the plurality of TCI state pools. The DCI may comprise, for example, a first bitfield (e.g., bitfield 2650), and/or a second bitfield (e.g., bitfield 2655). The first bitfield of the DCI may indicate the one or more TCI state pools of the plurality of TCI state pools. The first bitfield of the DCI may indicate the one TCI state pool of the one or more TCI state pools. The first bitfield of the DCI may indicate, for example, the one TCI state pool, of the one or more TCI state pools, activated by (and/or enabled by) the MAC CE, the second MAC CE, or the configuration parameters. As described with respect to FIG. 25 and the first bitfield 2550, the first bitfield of the DCI (e.g., first bitfield 2650 in FIG. 26 may comprise two bits (e.g., bit b1 and bit b0). As described with respect to FIG. 25 and the first bitfield 2550, the first bitfield 2650 in FIG. 26 may indicate a joint TCI state pool of the plurality of TCI state pools, for example, based on (e.g., in response to) the first bitfield being set to 00. As described with respect to FIG. 25 and the first bitfield 2550, the first bitfield 2650 in FIG. 26 may indicate a downlink (DL) TCI state pool of the plurality of TCI state pools, for example, based on (e.g., in response to) the first bitfield being set to 01. As described with respect to FIG. 25 and the first bitfield 2550, the first bitfield 2650 in FIG. 26 may indicate an uplink (UL) TCI state pool of the plurality of TCI state pools, for example, based on (e.g., in response to) the first bitfield being set to 10. As described with respect to FIG. 25 and the first bitfield 2550, the first bitfield 2650 in FIG. 26 may indicate a DL TCI state pool and a UL TCI state pool of the plurality of TCI state pools, for example, based on (e.g., in response to) the first bitfield being set to 11.

As described with respect to FIG. 25 and the second bitfield 2555, the second bitfield 2655 in FIG. 26 may comprise multiple bits (e.g., b0, b1). The second bitfield 2655 of the DCI in FIG. 26 may indicate one or more second TCI states of the one or more first TCI states (e.g., the one or more first TCI states activated by the MAC CE or the configuration parameters, as shown in FIG. 24A at time T3). As described above with respect to FIG. 25 and the second bitfield of DCI, a codepoint of the second bitfield 2655 of the DCI may indicate multiple TCI states, for instance, multiple second TCI states of one or more first TCI states. A codepoint value may indicate a number of bits of the second bitfield of the DCI. For example, a codepoint value of "1" may indicate that the second bitfield of the DCI comprises "1 bit; a codepoint value of "01" or "10" may indicate that the second bitfield of the DCI comprises 2 bits; and a codepoint value of "001" (or other three-digit iterations) may indicate that the second bitfield of the DCI comprises 3 bits. Each codepoint (e.g., codepoint value) of the second bitfield 2655 of the DCI may indicate multiple TCI states, for example a DL TCI state and a UL TCI state. Each codepoint (e.g., codepoint value) of the second bitfield 2655 of the DCI may indicate multiple second TCI states. The one of the one or more TCI state pools may comprise the one or more second TCI states. As described with respect to FIG. 25 and the second bitfield 2555, at least one bit of the second bitfield 2655 in FIG. 26 (e.g., each bit of the second bitfield) may be associated with a quantity of second TCI states. The wireless device may determine the quantity of second TCI states based on a quantity of the one or more TCI state pools activated by (and/or enabled by) the MAC CE or the configuration parameters. As described with respect to FIG. 25 and the second bitfield 2555, at least one bit of the second bitfield 2655 in FIG. 26 (e.g., each bit of the second bitfield) may be associated with: a UL TCI state (e.g., UL TCI state 2625) and a DL TCI state (e.g., DL TCI state 2635). As described with respect to FIG. 25 and the second bitfield 2555, at least one bit of the second bitfield 2655 in FIG. 26 (e.g., each bit of the second bitfield) may be associated with: a UL TCI state and a DL TCI state for example, if the UL TCI state pool and the DL TCI state pool are activated by (and/or enabled by) the MAC CE or the configuration parameters. As described with respect to FIG. 25 and bit b4 of the second bitfield 2555, a bit (e.g., b0) of the second bitfield 2655 in FIG. 26, for example, may be associated with UL TCI state 4 and DL TCI state 4. As described with respect to FIG. 25 and the UL TCI state 2525 and the DL TCI 2535, the UL TCI state 2625 and the DL TCI state 2635 shown in FIG. 26 may be deactivated. The UL TCI state and the DL TCI state may be deactivated, for example, if the bit (e.g., the bit associated with the UL TCI state and the DL TCI state) is set to zero. As described with respect to FIG. 25 and the UL TCI state 2525 and the DL TCI 2535, the UL TCI state 2625 and the DL TCI state 2635 in FIG. 26 may be activated. The UL TCI state and the DL TCI state may be activated, for example, if the bit (e.g., the bit associated with the UL TCI state and the DL TCI state) is set to one. As described with respect to FIG. 25 and a bit of the second bitfield 2555, at least one bit of the second bit field (e.g., one or more bits with a codepoint value of the second bitfield) 2655 in FIG. 26 may be associated with a TCI state. The at least one bit of the second bit field 2655 in FIG. 26 may be associated with one TCI state (e.g., a second TCI state of the one or more first TCI states) from a TCI state pool activated (and/or enabled) by the MAC CE or the configuration parameters. As described with respect to FIG. 25 and a bit of the second bitfield 2555, at least one bit of the second bit field (e.g., each bit of the second bitfield) 2655 in FIG. 26 may be associated with one TCI state from a TCI state pool activated (and/or enabled) by the MAC CE or the configuration parameters, for example, if one of a UL TCI state pool and/or a DL TCI state pool is activated by (and/or enabled by) the MAC CE or the configuration parameters. As described with respect to FIG. 25 and the second bitfield 2555, a UL TCI state of a UL TCI state pool or a DL TCI state of a DL TCI state pool in FIG. 26 may be associated with a bit of the second bitfield 2655, for example, if one of the UL TCI state pool and/or the DL TCI state pool is activated by (and/or enabled by) the MAC CE or the configuration parameters. As described with respect to FIG. 25 and a bit of the second bitfield 2555, the one TCI state, associated with the bit of the second bitfield 2655 in FIG. 26 may be deactivated, for example, if the bit (e.g., the bit associated with the one TCI state) is set to zero. The one TCI state, associated with the bit, may be activated, for example, if the bit (e.g., the bit associated with the one TCI state) is set to one.

A wireless device may perform a method comprising multiple operations. The wireless device may receive, from a base station, one or more RRC messages comprising configuration parameters. The configuration parameters may indicate a plurality of transmission configuration indicator (TCI) state pools. The plurality of TCI state pools may comprise at least one of: one or more downlink TCI state pools, one or more uplink TCI state pools, or one or more joint TCI state pools. Each of the one or more downlink TCI state pools may comprise one or more downlink TCI states. Each of the one or more uplink TCI state pools may comprise one or more uplink TCI states. Each of the one or more joint TCI state pools may comprise one or more joint TCI states. The plurality of TCI state pools may comprise one or more common TCI state pools. Each TCI state of the one or more common TCI state pools may be used for at least one of sending multiple uplink signals or receiving multiple downlink signals. A TCI state pool (e.g., each of the plurality of TCI state pools) may comprise one or more TCI states. The wireless device may determine, for a cell of the plurality of cells, a first TCI state pool. The cell, of the plurality of cells, may comprise a primary cell or a secondary cell. The wireless device may determine the first TCI state pool based on the configuration parameters. The configuration parameters may indicate the first TCI state pool as a default TCI state pool of the cell of the plurality of cells. The wireless device may receive, based on the first TCI state pool and from the base station, one or more messages indicating a second TCI state pool from the plurality of TCI state pools. The default TCI state pool of the cell may comprise a TCI state pool used by the wireless device for the cell before receiving second messages indicating the TCI state pool. The second messages may comprise one or more of: one or more second radio resource control messages, one or more medium access control control elements (MAC CEs), or one or more downlink control information (DCI). The wireless device may determine the first TCI state pool as a default TCI state pool from the plurality of TCI state pools. The wireless device may send (e.g., transmit) at least one uplink signal via the cell. The wireless device may send (e.g., transmit), to the base station, one or more uplink signals based on the default TCI state pool. The wireless device may send (e.g., transmit) one or more uplink signals based on the default TCI state pool. The one or more uplink signals may comprise at least one of: a physical uplink control channel (PUCCH), a physical uplink shared channel (PUSCH), a physical random access channel (PRACH), or a sounding reference signal (SRS). The wireless device may send (e.g., transmit) the one or more uplink signals by sending (e.g., transmitting) the one or more uplink signals based on one or more TCI states of the default TCI state pool. The wireless device may determine that the default TCI state pool is used before an applicable time point of any TCI state indicated by downlink control information (DCI). The wireless device may determine that the default TCI state pool is used before an applicable time point of any TCI state indicated by a medium access control control element (MAC CE). The wireless device may determine a spatial domain filter based on a TCI state of the default TCI state pool. The wireless device may determine that the spatial domain filter is used for reception of a quasi collocated reference signal of the TCI state of the default TCI state pool. The wireless device may receive at least one downlink signal via the cell. The wireless device may receive, from the base station, one or more downlink signals based on the default TCI state pool. The wireless device may receive the one or more downlink signals via the cell with the spatial domain filter. The wireless device may receive the one or more downlink signals based on the default TCI state pool. The one or more downlink signal may comprise at least one of: a physical downlink control channel (PDCCH), a physical downlink shared channel (PDSCH), a synchronization signal block (SSB), or a channel state information reference signal (CSI-RS). The wireless device may receive, based on the default TCI state pool, the at least one downlink signal by receiving the at least one downlink signal based on one or more TCI states of the default TCI state pool. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive, from a base station, one or more RRC messages comprising configuration parameters. The configuration parameters may indicate a plurality of TCI state pools. A TCI state pool (e.g., each of the plurality of TCI state pools) may comprise one or more TCI states. The wireless device may receive, from the base station, a medium access control control element (MAC CE) indicating a first TCI state pool from the plurality of TCI state pools. The wireless device may receive one or more messages indicating a second TCI state pool from the plurality of TCI state pools. The wireless device may receive the one or more messages indicating the second TCI state pool based on the first TCI state pool. The wireless device may send (e.g., transmit), to the base station, one or more uplink signals based on the second TCI state pool. The wireless device may receive, from the base station, one or more downlink signals based on the second TCI state pool. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive, from a base station, one or more RRC messages comprising configuration parameters. The configuration parameters may indicate a plurality of TCI state pools. A TCI state pool (e.g., each of the plurality of TCI state pools) may comprise one or more TCI states. The wireless device may receive, from the base station, DCI indicating a first TCI state pool from the plurality of TCI state pools. The wireless device may receive one or more messages indicating a second TCI state pool from the plurality of TCI state pools. The wireless device may receive, based on the first TCI state pool and from the base station, one or more messages indicating a second TCI state pool from the plurality of TCI state pools. The wireless device may send (e.g., transmit), to the base station, one or more uplink signals based on the second TCI state pool. The wireless device may receive, from the base station, one or more downlink signals based on the second TCI state pool. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive, from a base station, one or more RRC messages comprising configuration parameters. The configuration parameters may indicate a plurality of TCI state pools. A TCI state pool (e.g., each of the plurality of TCI state pools) may comprise one or more TCI states. The wireless device may receive configuration parameters indicating a priority value for at least one TCI state pool (e.g., each of the plurality of TCI state pools). The wireless device may determine a first TCI state pool from the plurality of TCI state pools. The wireless device may determine the first TCI state pool based on the priority value of the first TCI state pool. The wireless device may receive one or more messages indicating a second TCI state pool from the plurality of TCI state pools. The wireless device may receive, based on the first TCI state pool and from the base station, one or more messages indicating a second TCI state pool from the plurality of TCI state pools. The wireless device may receive the one or more messages indicating the second TCI state based on the first TCI state pool. The wireless device may send (e.g., transmit), to the base station, one or more uplink signals based on the second TCI state pool. The wireless device may receive, from the base station, one or more downlink signals based on the second TCI state pool. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive, from a base station, one or more RRC messages comprising configuration parameters. The configuration parameters may indicate a plurality of TCI state pools. A TCI state pool (e.g., each of the plurality of TCI state pools) may comprise one or more TCI states. The wireless device may determine a first TCI state pool from the plurality of TCI state pools. The wireless device may determine, based on the configuration parameters, a first TCI state pool from the plurality of TCI state pools. The wireless device may send (e.g., transmit) an uplink signal comprising a MAC CE. The wireless device may send (e.g., transmit) an uplink signal comprising a channel state information report. The wireless device may switch from the first TCI state pool to a second TCI state pool of the plurality of TCI state pools. The wireless device may switch from the first TCI state pool to a second TCI state pool of the plurality of TCI state pools based on (e.g., after or in response to) sending (e.g., transmitting) the uplink signal. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may receive, from a base station, one or more RRC messages comprising configuration parameters. The configuration parameters may indicate a plurality of TCI state pools. A TCI state pool (e.g., each of the plurality of TCI state pools) may comprise one or more TCI states. One or more TCI state pools, of the plurality of TCI state pools, may be associated with a plurality of cells. The plurality of TCI state pools may comprise one or more separate TCI state pools. The wireless device may determine, based on the configuration parameters, a first TCI state pool. The wireless device may determine the first TCI state pool for a cell of the plurality of cells. The wireless device may determine, based on the configuration parameters, the first TCI state pool, as a default TCI state pool, from the one or more TCI state pools. The wireless device may receive one or more downlink signals based on the default TCI state pool. The configuration parameters may indicate a priority value for one or more TCI state pools (e.g., each of the one or more TCI state pools). The wireless device may determine the first default TCI state pool, from the one or more TCI state pools, based on the priority value of the first TCI state pool. The one or more TCI state pools may comprise one or more common TCI state pools. Each TCI state of the one or more common TCI state pools may be configured for at least one of sending multiple uplink signals or receiving multiple downlink signals. A TCI state pool (e.g., each of the one or more TCI state pools) may comprise one or more TCI states. The wireless device may receive a medium access control element (MAC CE) activating a plurality of TCI states from the one or more TCI state pools. The activated plurality of TCI states, from the one or more TCI state pools, may comprise a TCI state pair. The TCI state pair may comprise a downlink TCI state and an uplink TCI state. The one or more separate TCI state pools, of the plurality of TCI state pools, may comprise the downlink TCI state and the uplink TCI state. The wireless device may receive downlink control information (DCI) comprising an indication of the pair of the downlink TCI state and the uplink TCI state. The wireless device may receive downlink control information (DCI) comprising a bitfield with a codepoint. The indication of the pair of the downlink TCI state and the uplink TCI state may comprise a bitfield with a codepoint. The codepoint may correspond to a value of the bitfield. The codepoint may indicate the pair of the downlink TCI state and the uplink TCI state. The codepoint may indicate the pair of the downlink TCI state and the uplink TCI state by indicating a same TCI index for the downlink TCI state and the uplink TCI state with the codepoint. The bitfield may activate one or more first TCI states. At least one bit of the bitfield (e.g., each bit of the bitfield) may indicate one or more second TCI states, of the one or more first TCI states, from one or more TCI state pools of the plurality of TCI state pools. The wireless device may receive an RRC message, the MAC CE (or a second MAC CE), and/or DCI activating (and/or enabling) the one or more TCI state pools. The MAC CE may comprise a first field indicating one or more second TCI state pools of the one or more TCI state pools. The one or more second TCI state pools may comprise a downlink TCI state pool and an uplink TCI state pool. The downlink TCI state may be from the downlink TCI state pool, and the uplink TCI state may be from the uplink TCI state pool. The MAC CE may comprise a second field activating the TCI states comprising the pair of the downlink TCI state and the uplink TCI state. The DCI may comprise a second bitfield indicating a TCI state pool of the one or more TCI state pools. The wireless device may receive, from the base station, a second DCI indicating one or more third TCI states of the one or more first TCI states. The wireless device may determine a downlink spatial domain filter based on the downlink TCI state. The wireless device may determine an uplink spatial domain filter based on the uplink TCI state. The wireless device may send (e.g., transmit), to the base station, at least one uplink signal based on the one or more third TCI states. The wireless device may send, based on the uplink TCI state, at least one uplink signal. The at least one uplink signal may comprise at least one of: a physical uplink control channel (PUCCH), a physical uplink shared channel (PUSCH), a physical random access channel (PRACH), or a sounding reference signal (SRS). The wireless device may send (e.g., transmit) at least one uplink signal with the uplink spatial domain filter. The wireless device may receive, from the base station, at least one downlink signal based on the one or more third TCI states. The wireless device may receive, based on the downlink TCI state, at least one downlink signal. The at least one downlink signal may comprise at least one of: a physical downlink control channel (PDCCH), a physical downlink shared channel (PDSCH), a synchronization signal block (SSB), or a channel state information reference signal (CSI-RS). The wireless device may receive at least one downlink signal with the downlink spatial domain filter. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

A wireless device may perform a method comprising multiple operations. The wireless device may receive configuration parameters indicating a plurality of transmission configuration indicator (TCI) state pools. Each of the plurality of TCI state pools may comprise one or more TCI states. The wireless device may receive a medium access control element (MAC CE) comprising a bitfield activating one or more first TCI states. Each bit of the bitfield may indicate one or more second TCI states, of the one or more first TCI states, from one or more TCI state pools of the plurality of TCI state pools. The wireless device may receive downlink control information (DCI) indicating one or more third TCI states of the one or more first TCI states. The wireless device may send (e.g., transmit) at least one uplink signal based on the one or more third TCI states. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the at least one resource assignment. A computer-readable medium may store instructions that, when executed, cause performance of the described method, additional operations and/or include the additional elements. A base station may perform a corresponding method comprising multiple operations. The base station may perform a corresponding method, for example, by sending one or more messages received by the wireless device and/or receiving one or more messages sent by the wireless device.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, a command indicating a plurality of transmission configuration indicator (TCI) states mapped to one or more TCI codepoints, wherein at least one TCI codepoint, of the one or more TCI codepoints, indicates:
      a downlink TCI state of a downlink TCI state list; and
      an uplink TCI state of an uplink TCI state list;
   receiving downlink control information (DCI) indicating a TCI codepoint of the at least one TCI codepoint;
   receiving, based on the downlink TCI state, at least one downlink signal; and
   sending, based on the uplink TCI state, at least one uplink signal.

2. The method of claim 1, further comprising:
   receiving, by the wireless device, configuration parameters of a plurality of TCI state lists comprising the uplink TCI state list and the downlink TCI state list, wherein the plurality of TCI state lists are associated with a plurality of cells;
   determining, for a cell of the plurality of cells and based on the configuration parameters, a first TCI state list, as a default TCI state list, from the plurality of TCI state lists; and
   receiving, based on the default TCI state list, one or more downlink signals via the cell.

3. The method of claim 2, wherein the configuration parameters indicate a priority value for each of the plurality of TCI state lists, and wherein the determining the first TCI state list comprises:
   determining the first TCI state list, from the plurality of TCI state lists, based on the priority value of the first TCI state list.

4. The method of claim 2, wherein the plurality of TCI state lists comprise one or more common TCI state lists, and wherein each TCI state of the one or more common TCI state lists is configured for at least one of:
   transmission of multiple uplink signals; or
   reception of multiple downlink signals.

5. The method of claim 1, wherein the at least one uplink signal comprises at least one of:
   a physical uplink control channel (PUCCH) transmission;
   a physical uplink shared channel (PUSCH) transmission;
   a physical random access channel (PRACH) transmission; or
   a sounding reference signal (SRS) transmission.

6. The method of claim 1, wherein the at least one downlink signal comprises at least one of:
   a physical downlink control channel (PDCCH) transmission;
   a physical downlink shared channel (PDSCH) transmission;
   a synchronization signal block (SSB) transmission; or
   a channel state information reference signal (CSI-RS) transmission.

7. The method of claim 1, wherein:
   the command comprises a first field indicating a plurality of TCI state lists, wherein the plurality of TCI state lists comprise a downlink TCI state list and an uplink TCI state list; and
   the command comprises a second field activating the TCI states comprising the downlink TCI state and the uplink TCI state.

8. The method of claim 7, wherein the downlink TCI state list comprises the downlink TCI state, and wherein the uplink TCI state list comprises the uplink TCI state.

9. The method of claim 1, further comprising:
   receiving, by the wireless device, configuration parameters of a plurality of TCI state lists, wherein the DCI further comprises a bitfield, and wherein the bitfield comprises a codepoint indicating a TCI state list of the plurality of TCI state lists.

10. The method of claim 1, wherein the DCI further comprises a bitfield, and wherein the TCI codepoint corresponds to a value of the bitfield.

11. The method of claim 1, wherein the command comprises a medium access control control element (MAC CE).

12. A method comprising:
    sending, by a base station, a command indicating a plurality of transmission configuration indicator (TCI) states mapped to one of more TCI codepoints, wherein at least one TCI code point, of the one or more TCI codepoints, indicates:
       a downlink TCI state of a downlink TCI state list; and
       an uplink TCI state of an uplink TCI state list;
    sending downlink control information (DCI) indicating a TCI codepoint of the at least one TCI codepoint;
    sending, based on the downlink TCI state, at least one downlink signal; and
    receiving, based on the uplink TCI state, at least one uplink signal.

13. The method of claim 12, further comprising:
sending, by the base station, configuration parameters of a plurality of TCI state lists associated with a plurality of cells; and
sending, based on a default TCI state list, at least one downlink signal.

14. The method of claim 12, wherein the DCI further comprises a bitfield, and wherein the TCI codepoint corresponds to a value of the bitfield.

15. The method of claim 12, further comprising:
sending, by the base station, configuration parameters of a plurality of TCI state lists, wherein the DCI further comprises a bitfield, and wherein the bitfield comprises a codepoint indicating a TCI state list of the plurality of TCI state lists.

16. The method of claim 12, wherein the command comprises a medium access control control element (MAC CE).

17. The method of claim 12, wherein the downlink TCI state and the uplink TCI state are associated with a same TCI index.

18. The method of claim 12, further comprising:
sending, by the base station, configuration parameters of a plurality of TCI state lists comprising the uplink TCI state list and the downlink TCI state list, wherein the plurality of TCI state lists are associated with a plurality of cells.

19. The method of claim 18, wherein the plurality of TCI state lists comprise one or more common TCI state lists, and wherein each TCI state of the one or more common TCI state lists is configured for at least one of:
reception of multiple uplink signals; or
transmission of multiple downlink signals.

20. The method of claim 12, wherein:
the command comprises a first field indicating a plurality of TCI state lists, wherein the plurality of TCI state lists comprise a downlink TCI state list and an uplink TCI state list; and
the command comprises a second field activating the TCI states comprising the downlink TCI state and the uplink TCI state.

21. The method of claim 20, wherein the downlink TCI state list comprises the downlink TCI state, and wherein the uplink TCI state list comprises the uplink TCI state.

22. A wireless device comprising:
one or more processors; and
memory storing instructions that, when executed by the one or more processors, cause the wireless device to:
receive a command indicating a plurality of transmission configuration indicator (TCI) states mapped to one or more TCI codepoints, wherein at least one TCI codepoint, of the one or more TCI codepoints, indicates:
a downlink TCI state of a downlink TCI state list; and
an uplink TCI state of an uplink TCI state list;
receive downlink control information (DCI) indicating a TCI codepoint of the at least one TCI codepoint;
receive, based on the downlink TCI state, at least one downlink signal; and
send, based on the uplink TCI state, at least one uplink signal.

23. The wireless device of claim 22, wherein the instructions, when executed by the one or more processors, further cause the wireless device to:
receive configuration parameters of a plurality of TCI state lists comprising the uplink TCI state list and the downlink TCI state list, wherein the plurality of TCI state lists are associated with a plurality of cells;
determine, for a cell of the plurality of cells and based on the configuration parameters, a first TCI state list, as a default TCI state list, from the plurality of TCI state lists; and
receive, based on the default TCI state list, one or more downlink signals via the cell.

24. The wireless device of claim 23, wherein the configuration parameters indicate a priority value for each of the plurality of TCI state lists, and wherein the instructions, when executed by the one or more processors, further cause the wireless device to determine the first TCI state list by causing:
determining the first TCI state list, from the plurality of TCI state lists, based on the priority value of the first TCI state list.

25. The wireless device of claim 23, wherein the plurality of TCI state lists comprise one or more common TCI state lists, and wherein each TCI state of the one or more common TCI state lists is configured for at least one of:
transmission of multiple uplink signals; or
reception of multiple downlink signals.

26. The wireless device of claim 22, wherein the at least one uplink signal comprises at least one of:
a physical uplink control channel (PUCCH) transmission;
a physical uplink shared channel (PUSCH) transmission;
a physical random access channel (PRACH) transmission; or
a sounding reference signal (SRS) transmission.

27. The wireless device of claim 22, wherein the at least one downlink signal comprises at least one of:
a physical downlink control channel (PDCCH) transmission;
a physical downlink shared channel (PDSCH) transmission;
a synchronization signal block (SSB) transmission; or
a channel state information reference signal (CSI-RS) transmission.

28. The wireless device of claim 22, wherein:
the command comprises a first field indicating a plurality of TCI state lists, wherein the plurality of TCI state lists comprise a downlink TCI state list and an uplink TCI state list; and
the command comprises a second field activating the TCI states comprising the downlink TCI state and the uplink TCI state.

29. The wireless device of claim 28, wherein the downlink TCI state list comprises the downlink TCI state, and wherein the uplink TCI state list comprises the uplink TCI state.

30. The wireless device of claim 22, wherein the instructions, when executed by the one or more processors, further cause the wireless device to:
receive configuration parameters of a plurality of TCI state lists, wherein the DCI further comprises a bitfield, and wherein the bitfield comprises a codepoint indicating a TCI state list of the plurality of TCI state lists.

31. The wireless device of claim 22, wherein the DCI further comprises a bitfield, and wherein the TCI codepoint corresponds to a value of the bitfield.

32. The wireless device of claim 22, wherein the command comprises a medium access control control element (MAC CE).

33. A base station comprising:
one or more processors; and
memory storing instructions that, when executed by the one or more processors, cause the base station to:

send, to a wireless device, a command indicating a plurality of transmission configuration indicator (TCI) states mapped to one of more TCI codepoints, wherein at least one TCI code point, of the one or more TCI codepoints, indicates:
- a downlink TCI state of a downlink TCI state list; and
- an uplink TCI state of an uplink TCI state list;

send downlink control information (DCI) indicating a TCI codepoint of the at least one TCI codepoint;
send, based on the downlink TCI state, at least one downlink signal; and
receive, based on the uplink TCI state, at least one uplink signal.

34. The base station of claim 33, wherein the instructions, when executed by the one or more processors, further cause the base station to:
send configuration parameters of a plurality of TCI state lists associated with a plurality of cells; and
send, based on a default TCI state list, at least one downlink signal.

35. The base station of claim 33, wherein the DCI further comprises a bitfield, and wherein the TCI codepoint corresponds to a value of the bitfield.

36. The base station of claim 33, wherein the instructions, when executed by the one or more processors, further cause the base station to:
send configuration parameters of a plurality of TCI state lists, wherein the DCI further comprises a bitfield, and wherein the bitfield comprises a codepoint indicating a TCI state list of the plurality of TCI state lists.

37. The base station of claim 33, wherein the command comprises a medium access control control element (MAC CE).

38. The base station of claim 33, wherein the downlink TCI state and the uplink TCI state are associated with a same TCI index.

39. The base station of claim 33, wherein the instructions, when executed by the one or more processors, further cause the base station to:
send configuration parameters of a plurality of TCI state lists comprising the uplink TCI state list and the downlink TCI state list, wherein the plurality of TCI state lists are associated with a plurality of cells.

40. The base station of claim 39, wherein the plurality of TCI state lists comprise one or more common TCI state lists, and wherein each TCI state of the one or more common TCI state lists is configured for at least one of:
reception of multiple uplink signals; or
transmission of multiple downlink signals.

41. The base station of claim 33, wherein:
the command comprises a first field indicating a plurality of TCI state lists, wherein the plurality of TCI state lists comprise a downlink TCI state list and an uplink TCI state list; and
the command comprises a second field activating the TCI states comprising the downlink TCI state and the uplink TCI state.

42. The base station of claim 41, wherein the downlink TCI state list comprises the downlink TCI state, and wherein the uplink TCI state list comprises the uplink TCI state.

43. One or more non-transitory computer readable media storing instructions that, when executed cause:
receiving a command indicating a plurality of transmission configuration indicator (TCI) states mapped to one or more TCI codepoints, wherein at least one TCI codepoint, of the one or more TCI codepoints, indicates:
- a downlink TCI state of a downlink TCI state list; and
- an uplink TCI state of an uplink TCI state list;

receiving downlink control information (DCI) indicating a TCI codepoint of the at least one TCI codepoint;
receiving, based on the downlink TCI state, at least one downlink signal; and
sending, based on the uplink TCI state, at least one uplink signal.

44. The one or more non-transitory computer readable media of claim 43, wherein the instructions, when executed, further cause:
receiving configuration parameters of a plurality of TCI state lists comprising the uplink TCI state list and the downlink TCI state list, wherein the plurality of TCI state lists are associated with a plurality of cells;
determining, for a cell of the plurality of cells and based on the configuration parameters, a first TCI state list, as a default TCI state list, from the plurality of TCI state lists; and
receiving, based on the default TCI state list, one or more downlink signals via the cell.

45. The one or more non-transitory computer readable media of claim 44, wherein the configuration parameters indicate a priority value for each of the plurality of TCI state lists, and wherein the instructions, when executed, further cause determining the first TCI state list by causing:
determining the first TCI state list, from the plurality of TCI state lists, based on the priority value of the first TCI state list.

46. The one or more non-transitory computer readable media of claim 44, wherein the plurality of TCI state lists comprise one or more common TCI state lists, and wherein each TCI state of the one or more common TCI state lists is configured for at least one of:
transmission of multiple uplink signals; or
reception of multiple downlink signals.

47. The one or more non-transitory computer readable media of claim 43, wherein the instructions, when executed, further cause:
receiving configuration parameters of a plurality of TCI state lists, wherein the DCI further comprises a bitfield, and wherein the bitfield comprises a codepoint indicating a TCI state list of the plurality of TCI state lists.

48. The one or more non-transitory computer readable media of claim 43, wherein the DCI further comprises a bitfield, and wherein the TCI codepoint corresponds to a value of the bitfield.

49. The one or more non-transitory computer readable media of claim 43, wherein the command comprises a medium access control control element (MAC CE).

50. One or more non-transitory computer readable media storing instructions that, when executed cause:
sending a command indicating a plurality of transmission configuration indicator (TCI) states mapped to one of more TCI codepoints, wherein at least one TCI code point, of the one or more TCI codepoints, indicates:
- a downlink TCI state of a downlink TCI state list; and
- an uplink TCI state of an uplink TCI state list;

sending downlink control information (DCI) indicating a TCI codepoint of the at least one TCI codepoint;
sending, based on the downlink TCI state, at least one downlink signal; and
receiving, based on the uplink TCI state, at least one uplink signal.

51. The one or more non-transitory computer readable media of claim 50, wherein the instructions, when executed, further cause:
sending configuration parameters of a plurality of TCI state lists associated with a plurality of cells; and
sending, based on a default TCI state list, at least one downlink signal.

52. The one or more non-transitory computer readable media of claim 50, wherein the DCI further comprises a bitfield, and wherein the TCI codepoint corresponds to a value of the bitfield.

53. The one or more non-transitory computer readable media of claim 50, wherein the instructions, when executed, further cause:
sending configuration parameters of a plurality of TCI state lists, wherein the DCI further comprises a bitfield, and wherein the bitfield comprises a codepoint indicating a TCI state list of the plurality of TCI state lists.

54. The one or more non-transitory computer readable media of claim 50, wherein the command comprises a medium access control control element (MAC CE).

55. The one or more non-transitory computer readable media of claim 50, wherein the instructions, when executed, further cause:
sending configuration parameters of a plurality of TCI state lists comprising the uplink TCI state list and the downlink TCI state list, wherein the plurality of TCI state lists are associated with a plurality of cells.

56. A system comprising:
a wireless device comprising:
one or more processors; and
memory storing instructions that, when executed by the one or more processors of the wireless device, cause the wireless device to:
receive a command indicating a plurality of transmission configuration indicator (TCI) states mapped to one or more TCI codepoints, wherein at least one TCI codepoint, of the one or more TCI codepoints, indicates:
a downlink TCI state of a downlink TCI state list; and
an uplink TCI state of an uplink TCI state list;
receive downlink control information (DCI) indicating a TCI codepoint of the at least one TCI codepoint;
receive, based on the downlink TCI state, at least one downlink signal; and
send, based on the uplink TCI state, at least one uplink signal; and
a base station comprising:
one or more processors; and
memory storing instructions that, when executed by the one or more processors of the base station, cause the base station to:
send the DCI indicating the TCI codepoint of the at least one TCI codepoint.

57. The system of claim 56, wherein the instructions stored in the memory of the wireless device, when executed by the one or more processors of the wireless device, cause the wireless device to:
receive configuration parameters of a plurality of TCI state lists comprising the uplink TCI state list and the downlink TCI state list, wherein the plurality of TCI state lists are associated with a plurality of cells;
determine, for a cell of the plurality of cells and based on the configuration parameters, a first TCI state list, as a default TCI state list, from the plurality of TCI state lists; and
receive, based on the default TCI state list, one or more downlink signals via the cell.

58. The system of claim 57, wherein the configuration parameters indicate a priority value for each of the plurality of TCI state lists, and wherein the instructions stored in the memory of the wireless device, when executed by the one or more processors of the wireless device, cause the wireless device to:
determine the first TCI state list, from the plurality of TCI state lists, based on the priority value of the first TCI state list.

59. The system of claim 57, wherein the plurality of TCI state lists comprise one or more common TCI state lists, and wherein each TCI state of the one or more common TCI state lists is configured for at least one of:
transmission of multiple uplink signals; or
reception of multiple downlink signals.

60. The system of claim 56, wherein the instructions stored in the memory of the wireless device, when executed by the one or more processors of the wireless device, cause the wireless device to:
receive configuration parameters of a plurality of TCI state lists, wherein the DCI further comprises a bitfield, and wherein the bitfield comprises a codepoint indicating a TCI state list of the plurality of TCI state lists.

61. The system of claim 56, wherein the DCI further comprises a bitfield, and wherein the TCI codepoint corresponds to a value of the bitfield.

62. The system of claim 56, wherein the command comprises a medium access control control element (MAC CE).

* * * * *

UNITED STATES PATENT AND TRADEMARK OFFICE
CERTIFICATE OF CORRECTION

PATENT NO. : 12,250,045 B2  
APPLICATION NO. : 18/215643  
DATED : March 11, 2025  
INVENTOR(S) : Kai Xu et al.

Page 1 of 1

It is certified that error appears in the above-identified patent and that said Letters Patent is hereby corrected as shown below:

In the Specification

Detailed Description, Column 4, Line 16:  
Delete "(JAB)" and insert --(IAB)--

Detailed Description, Column 28, Line 45:  
Delete "abase" and insert --a base--

Detailed Description, Column 35, Line 50:  
Delete "0<s_id<14)," and insert --0≤s_id<14),--

Detailed Description, Column 35, Line 52:  
Delete "0<t_id<80)," and insert --0≤t_id<80),--

Detailed Description, Column 35, Line 54:  
Delete "0<f_id<8)," and insert --0≤f_id<8),--

Signed and Sealed this  
Tenth Day of February, 2026

John A. Squires  
*Director of the United States Patent and Trademark Office*